US008537173B2

(12) United States Patent
Uesaki

(10) Patent No.: US 8,537,173 B2
(45) Date of Patent: Sep. 17, 2013

(54) GRAPHICS RENDERING APPARATUS, GRAPHICS RENDERING METHOD, RECORDING MEDIUM HAVING RECORDED THEREIN GRAPHICS RENDERING PROGRAM, AND INTEGRATED CIRCUIT FOR RENDERING A HIGH-QUALITY IMAGE USING A SCALING COEFFICIENT

(75) Inventor: Akira Uesaki, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 13/058,894

(22) PCT Filed: Jun. 24, 2010

(86) PCT No.: PCT/JP2010/004195
§ 371 (c)(1),
(2), (4) Date: Feb. 14, 2011

(87) PCT Pub. No.: WO2010/150545
PCT Pub. Date: Dec. 29, 2010

(65) Prior Publication Data
US 2011/0134117 A1    Jun. 9, 2011

(30) Foreign Application Priority Data
Jun. 24, 2009    (JP) ................. 2009-149448

(51) Int. Cl.
*G09G 5/00*    (2006.01)
(52) U.S. Cl.
USPC .......................................... 345/582; 345/660
(58) Field of Classification Search
USPC ................................. 345/582, 660
See application file for complete search history.

(56) References Cited

U.S. PATENT DOCUMENTS

| 5,287,436 | A  | * | 2/1994  | Fischer et al. ................ 345/419 |
| 5,678,015 | A  |   | 10/1997 | Goh |
| 5,680,525 | A  |   | 10/1997 | Sakai et al. |
| 5,739,826 | A  | * | 4/1998  | Shiraishi et al. .............. 345/443 |
| 6,825,851 | B1 | * | 11/2004 | Leather ........................ 345/584 |
| 2002/0109680 | A1 | * | 8/2002 | Orbanes et al. ............... 345/418 |
| 2007/0046666 | A1 | * | 3/2007 | Kokojima et al. ............ 345/427 |
| 2007/0229506 | A1 | * | 10/2007 | Sugita et al. .................. 345/441 |
| 2008/0062180 | A1 | * | 3/2008 | Koyama ........................ 345/468 |
| 2008/0246760 | A1 | * | 10/2008 | Jeong et al. ................... 345/420 |
| 2010/0321399 | A1 | * | 12/2010 | Ellren et al. .................. 345/587 |

FOREIGN PATENT DOCUMENTS

| JP | 5-46775 | 2/1993 |
| JP | 2001-218979 | 8/2001 |
| JP | 2004-110519 | 4/2004 |

OTHER PUBLICATIONS

International Search Report issued Jul. 20, 2010 in International (PCT) Application No. PCT/JP2010/004195.

* cited by examiner

*Primary Examiner* — Kee M Tung
*Assistant Examiner* — Saptarshi Mazumder
(74) *Attorney, Agent, or Firm* — Wenderoth, Lind & Ponack, L.L.P.

(57) ABSTRACT

A graphics rendering apparatus including a scaling coefficient determination unit operable to determine, based on polygon data representing a polygon onto which a texture is to be mapped, a scaling coefficient that is a basis for scaling first vector data from which the texture is to be generated; a vector data conversion unit operable to generate second vector data by scaling the first vector data based on the scaling coefficient; a texture generation unit operable to generate a texture based on the second vector data; and a texture mapping unit operable to map the texture generated by the texture generation unit onto the polygon.

9 Claims, 36 Drawing Sheets

FIG. 1
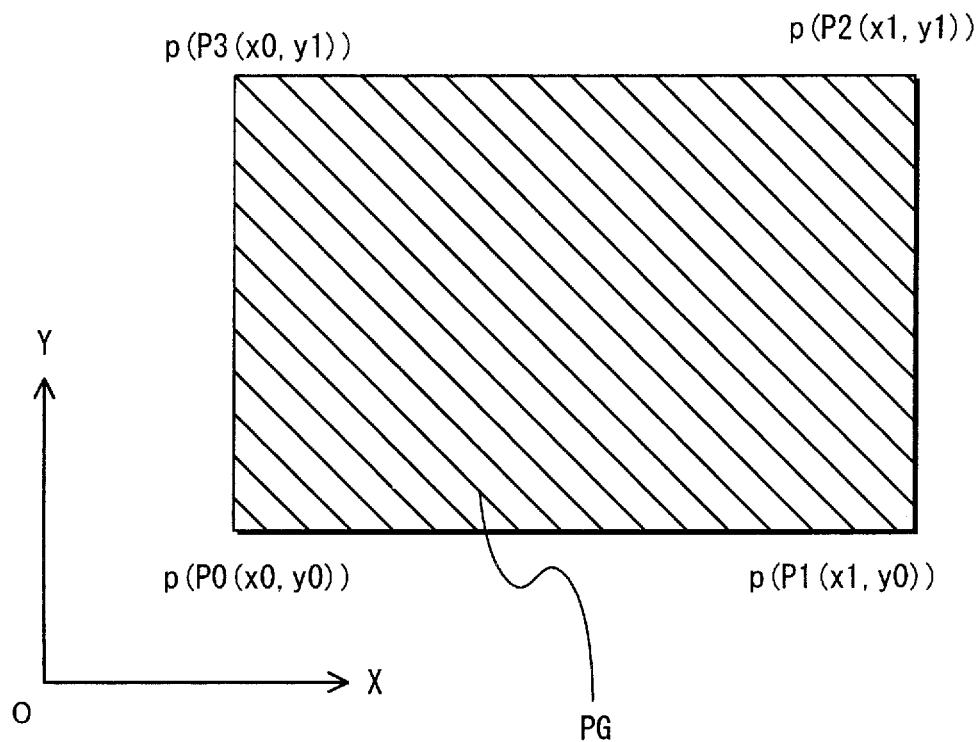
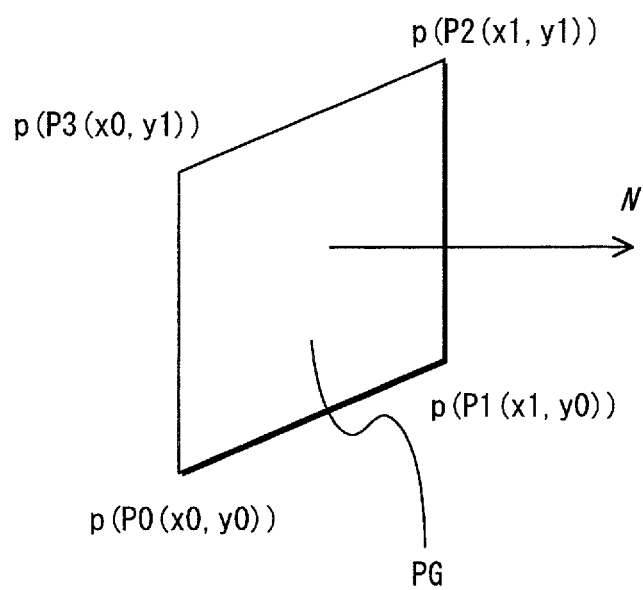

FIG. 4

Vector data
(VD1)

V0(x0, y0))
V1(x1, y1))
⋮
V44(x44, y44)
S0(x0, y0)
S1(x1, y1)
⋮
S42(x42, y42)
BD21

⬇ Convert into 3D coordinate system

Vector data
(VD2)

V0h(x0, y0, 1)
V1h(x1, y1, 1)
⋮
V44h(x44, y44, 1)
S0h(x0, y0, 1)
S1h(x1, y1, 1)
⋮
S42h(x42, y42, 1)
BD21

➡ Scaling

Vector data
(VD3)

| ID | Scaling value $\alpha$ |
|---|---|
| 0 | 0.1 |
| 1 | 0.5 |
| 2 | 1.0 |
| 3 | 1.5 |
| 4 | 2.0 |
| 5 | 2.5 |
| 6 | 3.0 |
| 7 | 5.0 |
| 8 | 10.0 |
| 9 | 20.0 |
| 10 | 30.0 |
| 11 | 50.0 |
| 12 | 100.0 |

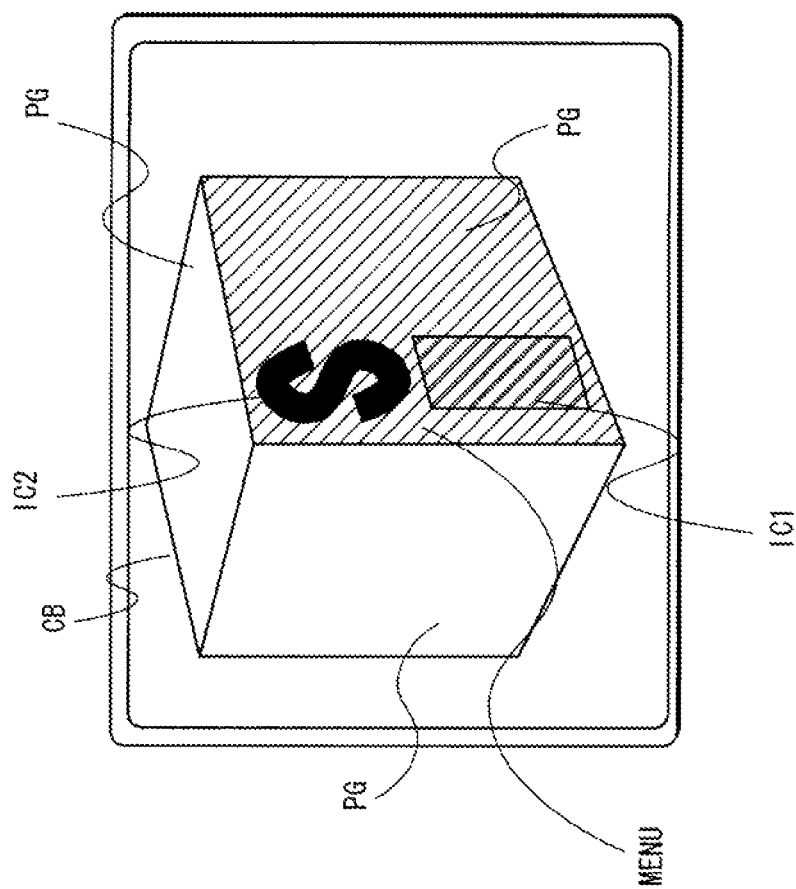

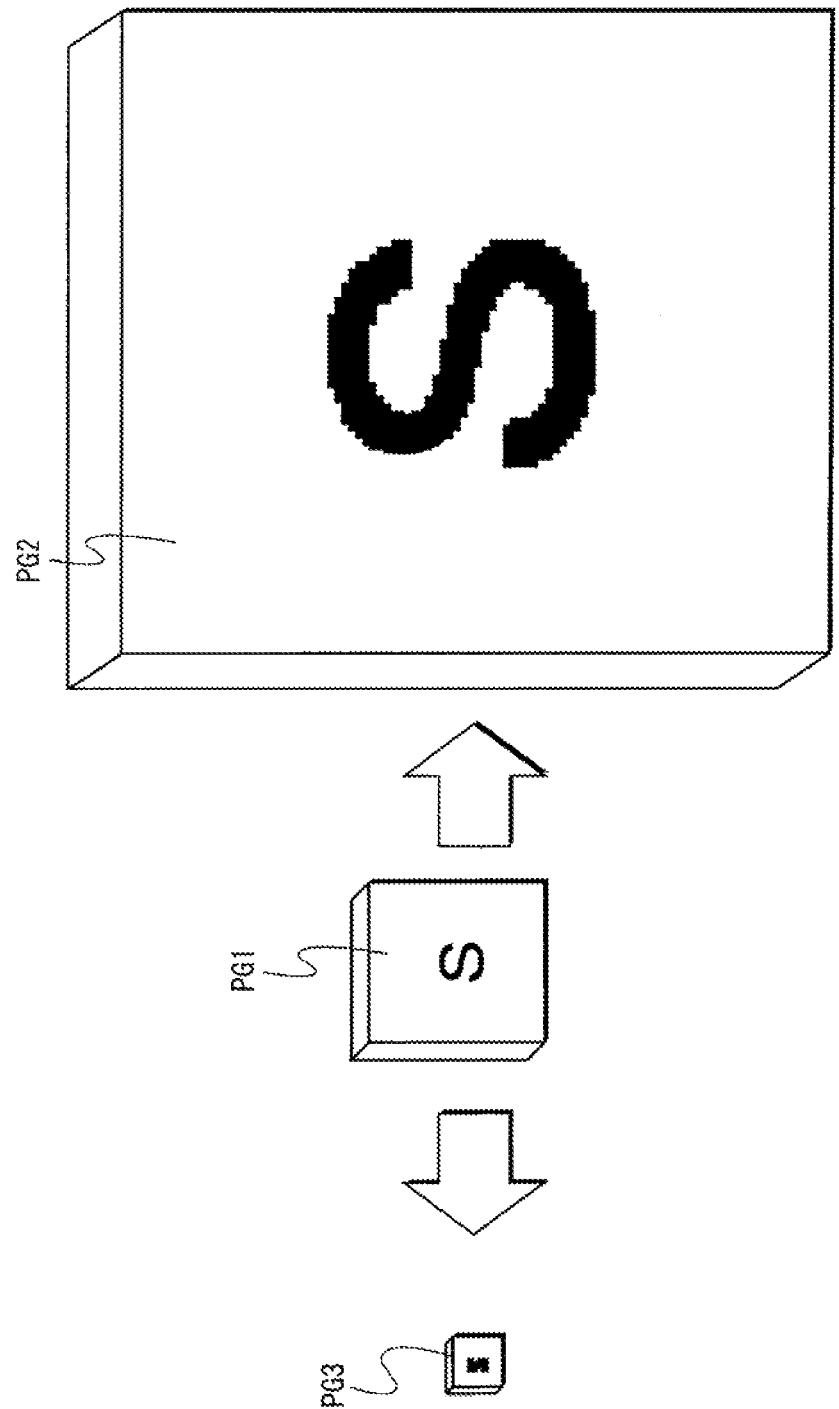

GRAPHICS RENDERING APPARATUS, GRAPHICS RENDERING METHOD, RECORDING MEDIUM HAVING RECORDED THEREIN GRAPHICS RENDERING PROGRAM, AND INTEGRATED CIRCUIT FOR RENDERING A HIGH-QUALITY IMAGE USING A SCALING COEFFICIENT

BACKGROUND OF INVENTION

1. Technical Field

The present invention relates to a graphics rendering technique using polygon data and vector data.

2. Background Art

Graphical user interfaces (hereinafter, "GUIs") originally developed for OS of personal computers have been now installed on digital TVs, portable telephones, and the like. There have been widespread GUIs.

Also, in recent years, there have become available many GUIs for displaying 3D images (hereinafter, "3D-GUIs"), as disclosed in Patent Literature 1.

As shown in FIG. 34, a 3D-GUI disclosed in the Patent Literature 1 displays, on a screen, a cubic CB and a menu screen (also referred to as "window" or "work space") MENU, which is composed of an icon IC1, a character IC2, and so on, that is pasted onto each surface (polygon) PG of the cubic CB.

As shown in FIG. 35, there is an expectancy for a 3D-GUI that displays a plurality of cubes CB1, CB2, . . . , CB7, and zooms in the cube CB1 that is selected by a user for display, and zooms out the other remaining cubes CB2, CB3, . . . , CB7 around the cube CB1 for display.

By the way, as this type of 3D-GUI, it is general to use a graphics rendering apparatus that stores a character font of a menu screen as vector data (outline data).

This type of graphics rendering apparatus, which has been conventionally used, performs processing roughly in accordance with a flow shown below.

Firstly, a character texture having an appropriate size is generated based on vector data (PG1 shown in FIG. 36). Next, the character texture is scaled in accordance with the size of a polygon PG (PG2 or PG3 shown in FIG. 36). Then, the scaled character texture is mapped onto the polygon PG.

CITATION LIST

Patent Literature

[Patent Literature 1] U.S. Pat. No. 5,678,015

SUMMARY OF INVENTION

However, according to a conventional graphics rendering apparatus, when the cubes CB1, CB2, . . . , CB7 are zoomed out for example, the polygon PG onto which the character texture has been mapped is accordingly zoomed out. This has sometimes crushed the character texture to be unreadable, such as the case of the PG3 shown in FIG. 36. On the contrary when the cubes CB1, CB2, . . . , CB7 are zoomed in, the polygon PG onto which the character texture has been mapped is accordingly zoomed in. This has sometimes caused aliasing on a contour of a character, such as the case of the PG2 shown in FIG. 36. That is, zoom-in and zoom-out of a 3D image including a polygon PG has might decrease the quality of the 3D image.

The present invention was made in view of the above problem, and aims to provide a graphics rendering apparatus capable of displaying a high-quality 3D image.

In order to achieve the above aim, the graphics rendering apparatus relating to the present invention is a graphics rendering apparatus comprising: a scaling coefficient determination unit operable to determine, based on polygon data representing a polygon onto which a texture is to be mapped, a scaling coefficient that is a basis for scaling first vector data from which the texture is to be generated; a vector data conversion unit operable to generate second vector data by scaling the first vector data based on the scaling coefficient; a texture generation unit operable to generate a texture based on the second vector data; and a texture mapping unit operable to map the texture generated by the texture generation unit onto the polygon.

With this structure, first vector data is scaled based on the scaling coefficient. Then, a texture, which is generated using second vector data obtained by scaling the first vector data, is mapped onto a polygon. Accordingly, it is possible to prevent occurrence of crush of a character texture and aliasing caused by texture scaling. This enables display of a high-quality 3D image.

Also, the graphics rendering apparatus relating to the present invention may further comprise a virtual plate generation unit operable to generate, based on the polygon data and the first vector data, virtual plate data representing a virtual plate that includes a vector image represented by the first vector data, wherein the vector data conversion unit performs the scaling based on the virtual plate data.

With this structure, the vector data conversion unit performs scaling based on the virtual plate data in addition to the scaling coefficient, thereby realizing optimal scaling on the vector data. This enables display of a high-quality 3D image.

Also, in the graphics rendering apparatus relating to the present invention, the polygon may be rectangular, and may have a first side of one pair of opposite sides having a length Lx and a second side of the other pair of opposite sides having a length Ly, the scaling coefficient determination unit determines, as the scaling coefficient, a first scaling coefficient scx that corresponds to scaling in a direction along the first side and a second scaling coefficient scy that corresponds to scaling in a direction along the second side, such that expressions 1 and 2 are satisfied, respectively, $$scx = C1 * Lx \, (0 < C1) \quad \text{[Expression 1]}$$

$$scy = C2 * Ly \, (0 < C2) \quad \text{[Expression 2]}$$

the virtual plate is rectangular, and has a third side of one pair of opposite sides having a length Lplatex and a fourth side of the other pair of opposite sides having a length Lplatey, and $$scalex = scx / Lplatex \quad \text{[Expression 3]}$$

the vector data conversion unit performs the scaling, based on a first scaling rate scalex with respect to scaling in a direction along the third side that is determined such that an expression 3 is satisfied, $$scaley = scx / Lplatey \quad \text{[Expression 4]}$$

the vector data conversion unit performs the scaling, based on a second scaling rate scaley with respect to scaling in a direction along the fourth side that is determined such that an expression 4 is satisfied.

With this structure, it is possible to scale the virtual plate so as to completely coincide in shape with the polygon. This enables display of a higher-quality 3D image.

Also, in the graphics rendering apparatus relating to the present invention, when a rectangular bounding box including the vector image has one pair of opposite sides each having a length VBx and the other pair of opposite sides each having a length VBy, the following conditions may be satisfied, $$Lplatex = VBx(1+\phi)(0<\phi<1) \quad \text{[Expression 5]}$$

$$Lplatey = VBy(1+\psi)(0<\psi<1) \quad \text{[Expression 6]}$$

at least either of expressions 5 or 6 is satisfied, and $$\frac{Lplatex}{Lplatey} = \frac{Lx}{Ly} \quad \text{[Expression 7]}$$

an expression 7 is also satisfied.

With this structure, the virtual plate including the rectangular bounding box including the vector image resembles in shape the polygon. Accordingly, it is possible to perform optimal scaling by mapping onto the polygon. This enables display of a higher-quality 3D image.

Also, the graphics rendering apparatus relating to the present invention may further comprise a bounding box generation unit operable to generate a rectangular bounding box that includes the polygon based on the polygon data.

With this structure, even when the polygon is not rectangular, it is possible to perform scaling on the vector data, which is optimal to mapping onto the polygon. This enables display of a high-quality 3D image.

Also, in the graphics rendering apparatus relating to the present invention, when a rectangular bounding box including the bounding box has one pair of opposite sides each having a length PBx and the other pair of opposite sides each having a length PBy, the following conditions may be satisfied, $$Lplatex = VBx(1+\phi)(0<\phi<1) \quad \text{[Expression 8]}$$

$$Lplatey = VBy(1+\psi)(0<\psi<1) \quad \text{[Expression 9]}$$

at least either of expressions 8 or 9 is satisfied, and $$\frac{Lplatex}{Lplatey} = \frac{PBx}{PBy} \quad \text{[Expression 10]}$$

an expression 10 is also satisfied.

With this structure, the virtual plate resembles in shape the bounding box including the polygon. Accordingly, it is possible to perform optimal scaling by mapping onto the polygon. This enables display of a higher-quality 3D image.

Also, in the graphics rendering apparatus relating to the present invention, the virtual plate may include a plurality of rectangular bounding boxes each including a vector image.

With this structure, it is possible to collectively perform scaling processing on a plurality of vector data pieces, thereby improving the processing efficiency.

Also, the graphics rendering apparatus relating to the present invention may further comprise: a 3D image processing unit operable to process the input polygon data and including the scaling coefficient determination unit; a 2D image processing unit operable to process the input first vector data and including the vector data conversion unit; a data number counting unit operable to count the number of polygon data pieces input by the 3D image processing unit and the number of first vector data pieces input by the 2D image processing unit; and a processing method setup unit operable to cause the 3D image processing unit to perform processing that is to be performed by the 2D image processing unit, based on the number of polygon data pieces and the number of first vector data pieces counted by the data number counting unit.

With this structure, depending on the processing load on the 3D image processing apparatus and the processing load on the 2D image processing apparatus, the processing method setup unit causes the 3D image processing apparatus and the 2D image processing apparatus to share processing that is to be performed by the vector data conversion unit. This can improve the processing capacity.

Also, the graphics rendering method relating to the present invention is a graphics rendering method to be executed by a computer, the graphics rendering method comprising: a scaling coefficient determining step of determining, based on polygon data representing a polygon onto which a texture is to be mapped, a scaling coefficient that is a basis for scaling first vector data from which the texture is to be generated; a vector data converting step of generating second vector data by scaling the first vector data based on the scaling coefficient; a texture generating step of generating a texture based on the second vector data; and a texture mapping step of mapping the texture generated in the texture generating step onto the polygon.

Also, the graphics rendering program relating to the present invention is a graphics rendering program for causing a computer to execute graphics rendering processing, the graphics rendering processing comprising: a scaling coefficient determining step of determining, based on polygon data representing a polygon onto which a texture is to be mapped, a scaling coefficient that is a basis for scaling first vector data from which the texture is to be generated; a vector data converting step of generating second vector data by scaling the first vector data based on the scaling coefficient; a texture generating step of generating a texture based on the second vector data; and a texture mapping step of mapping the texture generated in the texture generating step onto the polygon.

Also, the recording medium relating to the present invention is a recording medium having recorded therein a graphic rendering program for causing a computer to execute graphics rendering processing, the graphics rendering processing comprising: a scaling coefficient determining step of determining, based on polygon data representing a polygon onto which a texture is to be mapped, a scaling coefficient that is a basis for scaling first vector data from which the texture is to be generated; a vector data converting step of generating second vector data by scaling the first vector data based on the scaling coefficient; a texture generating step of generating a texture based on the second vector data; and a texture mapping step of mapping the texture generated in the texture generating step onto the polygon.

Also, the integrated circuit relating to the present invention is an integrated circuit for graphics rendering comprising: a scaling coefficient determination unit operable to determine, based on polygon data representing a polygon onto which a texture is to be mapped, a scaling coefficient that is a basis for scaling first vector data from which the texture is to be generated; a vector data conversion unit operable to generate second vector data by scaling the first vector data based on the scaling coefficient; a texture generation unit operable to generate a texture based on the second vector data; and a texture mapping unit operable to map the texture generated by the texture generation unit onto the polygon.

With this structure, it is possible to reduce the size of the graphics rendering apparatus.

BRIEF DESCRIPTION OF DRAWINGS

FIG. 1 is a plane view showing a polygon relating to an Embodiment 1.

FIG. 4 shows vector data relating to the Embodiment 1.

FIG. 9 shows a conception of a scaling value table relating to the Embodiment 1.

FIG. 34 shows the outline of a conventional example.

FIG. 36 shows the outline of a conventional example.

DETAILED DESCRIPTION OF INVENTION

Embodiment 1

<1> Data

<1-1> Polygon Data

According to the present embodiment, as shown in FIG. 1, polygon data PD1 representing a shape of an object (hereinafter, "polygon") PG onto which a texture is mapped is used (see FIG. 2).

The polygon data PD1 is composed of coordinate data Pi (i=0, 1, 2, 3) representing four points on the 2D coordinate system (model coordinate system), as shown in FIG. 1. The coordinate data Pi (i=0, 1, 2, 3) is composed of an X component and a Y component, and represents four points p (P0(x0, y0)), p (P1(x1,y0)), p (P2(x1,y1)), and p (P4(x0,y1)), as shown in FIG. 1. In this case, the polygon data PD1 is a rectangular polygon PG as indicated by a hatched part in FIG. 1.

Also, the polygon data PD1 includes attribute information BD1 relating to a color value for determining a color of the polygon PG (such as a color value represented in hexadecimal notation) and attribute information BD2 relating to a planar normal vector N (see FIG. 1) including a polygon PG necessary for rendering.

Figure 2:
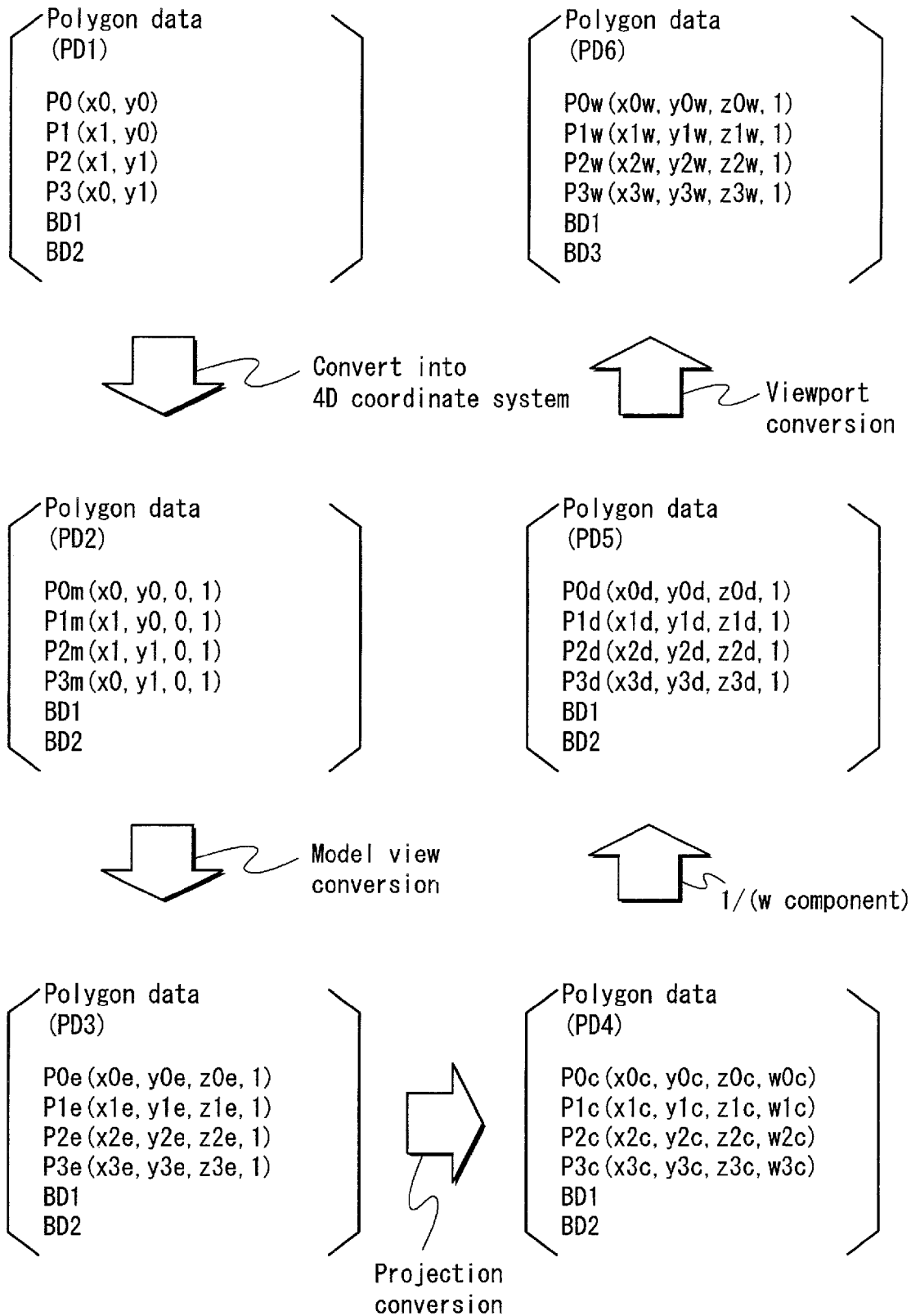
FIG. 2 shows polygon data relating to the Embodiment 1.

Note that polygon data PD2, PD3, PD4, PD5, and PD6 shown in FIG. 2 are described later.

<1-2> Vector Data

Figure 3A:
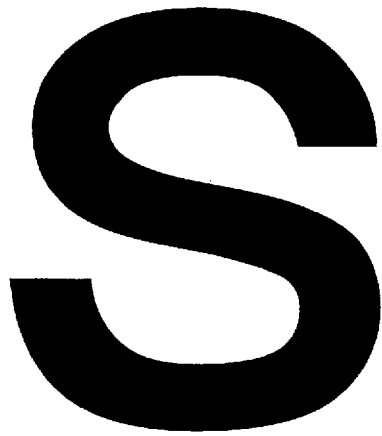
FIGS. 3A, 3B, and 3C show vector data relating to the Embodiment 1.
Figure 3C:
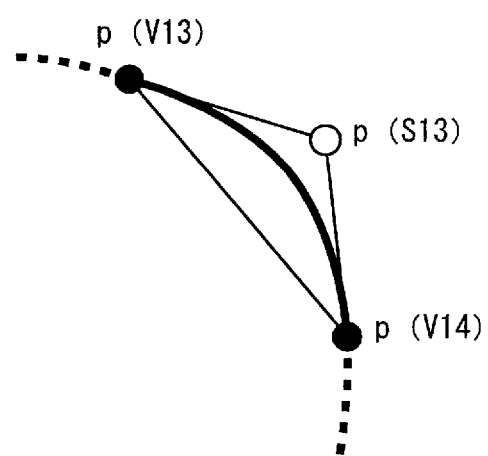
Figure 3B:
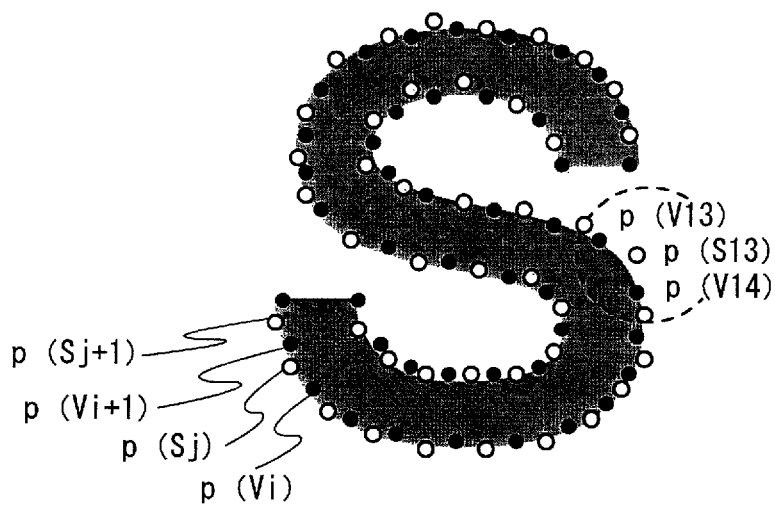

Vector data VD1 (first vector data) is data that defines a shape of a character rendered on a 2D surface as shown in FIG. 3A. As shown in FIG. 3B, the vector data VD1 is composed of coordinate data (hereinafter, "vertice data") Vi (xi, yi) (i=0, 1, . . . , 44) representing a plurality of vertices p(Vi) (45 vertices in the example shown in FIG. 3B) on a contour of the character and coordinate data (hereinafter, "control point data") Si(xi,yi) (i=0, 1, . . . , 42) representing a control point p(Si) that defines a curved line drawn between adjacent vertices p(Vi) and p(Vi+1) along the contour, as shown in FIG. 4.

The curved line drawn between adjacent vertices p(Vi) and p(Vi+1) along the contour of the character represented by the vector data VD1 is a Bezier curve. For example, as shown in FIG. 3C, a curved line drawn between vertices p(V13) and p(V14) that is inscribed in two sides of a rectangle having vertices p(V13) and p(V14) and a control point p(S13) as three vertices.

Also, the vector data VD1 includes attribute information BD21 relating to a color value designating a color for filling the inside of a character texture generated based on the vector data VD1, as shown in FIG. 4.

Note that vector data VD2 and VD3 shown in FIG. 4 are described later.

<2> Structure

Figure 5:
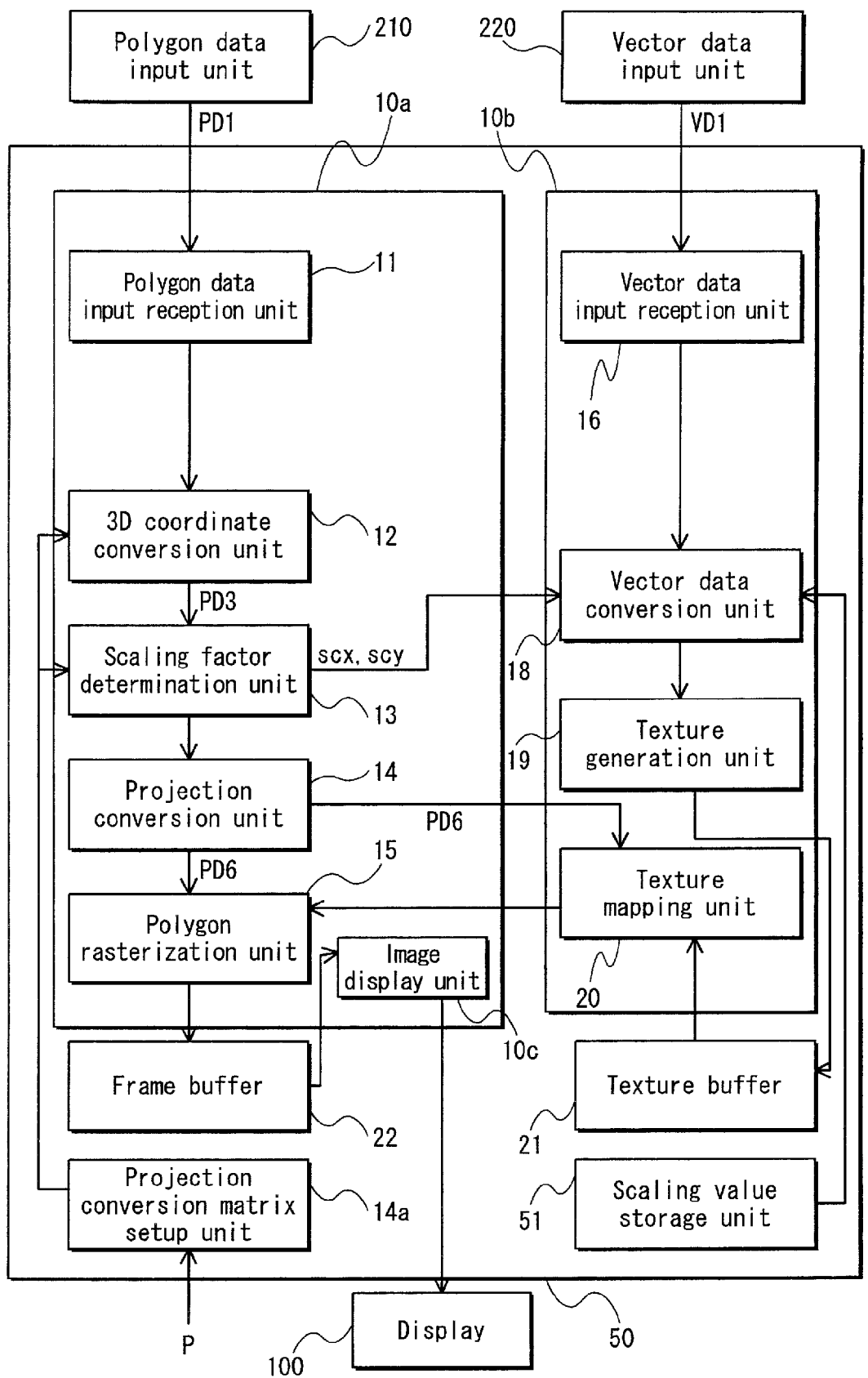
FIG. 5 shows the structure of a graphics rendering apparatus relating to the Embodiment 1.

A graphics rendering apparatus 10 relating to the present embodiment includes, as shown in FIG. 5, a 3D image processing apparatus 10a for processing polygon data PD1 input by a polygon data input unit 210, a 2D image processing apparatus 10b for processing vector data VD1 (first vector data) input by a vector data input unit 220, a frame buffer 22, a texture buffer 21, a projection conversion matrix setup unit 14a for setting up a parameter relating to a projection conversion matrix P for use by the 3D image processing apparatus 10a.

<2-1> 3D Image Processing Apparatus

The 3D image processing apparatus 10a includes a processor (not shown) and a memory (not shown). The processor appropriately reads and executes a program, thereby realizing a polygon data input reception unit 11, a 3D coordinate conversion unit 12, a scaling coefficient determination unit 13, a projection conversion unit 14, a polygon rasterization unit 15, and an image display unit 10c.

<2-1-1> Polygon Data Input Reception Unit

The polygon data input reception unit 11 receives the polygon data PD1 input by a user via the polygon data input unit 210.

Here, the polygon data input reception unit 11 re-arranges received data such that coordinate data having a smallest vertice on the X coordinate and the Y coordinate is P0 and vertices represented by coordinate data P1, P2, and P3 are arranged in a counterclockwise direction of the contour of the polygon PG. Note that FIG. 2 shows the polygon data PD1 after re-arrangement.

<2-1-2> 3D Image Conversion Unit

When the polygon data PD1 is input by the polygon data input reception unit 11, the 3D coordinate conversion unit 12 performs an operation for adding 0 as a Z component and 1 as a W component to the coordinate data Pi (i=0, 1, 2, 3) constituting the polygon data PD1. Then, the 3D coordinate conversion unit 12 converts the polygon data PD1 into four pieces of coordinate data represented by the 4D coordinate system, namely, P0m (x0,y0,0,1), P1m (x1,y0,0,1), P2m (x1,y1,0,1), and P3m (x0,y1,0,1) (polygon data PD2) (see FIG. 2).

In this way, the polygon data PD1 is converted into the polygon data PD2 represented by the 4D coordinate system. As a result, by performing multiplication of the polygon data PD2 by the matrix, it is possible to represent all of coordinate conversion for translating the polygon PG, coordinate conversion for scaling the polygon PG, and coordinate conversion for rotating the polygon PG.

Figure 6:
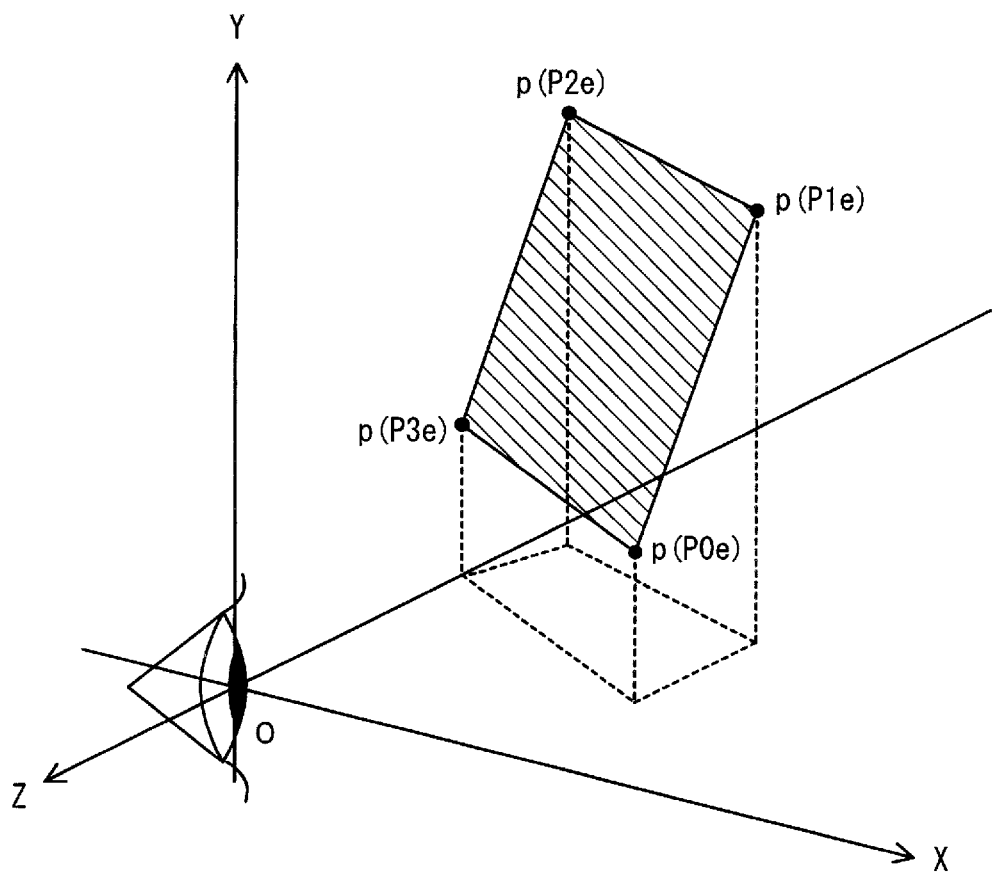
FIG. 6 shows model view conversion relating to the Embodiment 1.

The 3D coordinate conversion unit 12 performs an operation on coordinate data Pim (i=0, 1, 2, 3) constituting the polygon data PD2 based on an Expression (11) to appropriately perform translation conversion, scaling conversion, or rotation conversion (hereinafter, any combination of these conversions is referred to as "model view conversion"). This results in generation of coordinate data Pie (i=0, 1, 2, 3) representing four vertices of the polygon PG arranged on a 3D space having a view point as an original point (hereinafter, "view coordinate system") as shown in FIG. 6, namely, polygon data PD3 (see FIG. 2).

$$Pie = M*Pim \ (i=0,1,2,3) \qquad \text{[Expression 11]}$$

Here, the value "Pim" (i=0, 1, 2, 3) represents coordinate data constituting the polygon data PD2. The value "Pie" (i=0, 1, 2, 3) represents coordinate data constituting the polygon data PD3. The sign "M" represents a matrix (model view matrix) on which one of translation conversion, scaling conversion, and rotation conversion, or any combination of these conversions is to be performed. The sign "*" represents multiplication of a matrix by a vector.

Then, the 3D coordinate conversion unit 12 inputs the generated polygon data PD3 into the scaling coefficient determination unit 13.

<2-1-3> Scaling Coefficient Determination Unit

The scaling coefficient determination unit 13 calculates a first scaling coefficient scx and a second scaling coefficient scy that are necessary for calculating a scaling rate (scaling value) of the vector data VD1.

Here, based on information relating to a projection conversion matrix P (described later) input by the projection conversion matrix setup unit 14a, the scaling coefficient determination unit 13 judges whether the projection conversion matrix P is for perspective projection conversion or for parallel projection conversion. Based on a result of the judgment, the scaling coefficient determination unit 13 changes a calculation method of the first scaling coefficient scx and the second scaling coefficient scy. Note that the scaling coefficient determination unit 13 judges a type of the projection conversion matrix P based on whether the fourth row of the projection conversion matrix P is (0001) or not (see Expressions (16) and (17) shown later).

<2-1-3-1> Case where Projection Conversion Matrix P is for Perspective Projection Conversion The scaling coefficient determination unit 13 calculates, with respect to the polygon PG, a length Lx in the X direction (length of a first side) and a length Ly in the Y direction (length of a second side).

Here, the polygon data PD3 input by the scaling coefficient determination unit 13 is generated by the polygon input reception unit 11, based on the polygon data PD1 after data re-arrangement as shown in FIG. 1. Accordingly, the length Lx of the polygon PG in the X direction is a distance between a vertice p(P0e) and a vertice p(P1e) (or a distance between a vertice p(P2e) and a vertice p(P3e)). The length Ly of the polygon PG in the Y direction is a distance between the vertice p(P1e) and the vertice p(P2e) (or a distance between the vertice p(P0e) and the vertice p(P3e)).

Accordingly, the scaling coefficient determination unit 13 calculates, with respect to the polygon PG, the length Lx in the X direction and the length Ly in the Y direction based on Expressions (12) and (13).

$$Lx=\sqrt{(X0e-X1e)^2+(Y0e-Y1e)^2+(Z0e-Z1e)^2} \qquad \text{[Expression 12]}$$

$$Ly=\sqrt{(X1e-X2e)^2+(Y1e-Y2e)^2+(Z1e-Z2e)^2} \qquad \text{[Expression 13]}$$

Here, xie, yie, zie (i=0, 1, 2, 3) represent X, Y, and Z components of each vertice p(Pie) (i=0, 1, 2, 3), respectively.

Then, the scaling coefficient determination unit 13 perform operations based on Expressions (14) and (15) using the calculated lengths Lx and Ly of the polygon PG in the X direction and the Y direction, respectively, thereby calculating the first scaling coefficient scx and the second scaling coefficient scy.

$$scx=A*Lx/Zrep(0<A,Zrep) \qquad \text{[Expression 14]}$$

$$scy=B*Ly/Zrep(0<B,Zrep) \qquad \text{[Expression 15]}$$

Here, the value "A" represents a scaling value of the polygon PG in the X direction for performing viewport conversion. The value "B" represents a scaling value of the polygon PG in the Y direction for performing viewport conversion. The value "Zrep" represents a predetermined coefficient.

Also, according to the present embodiment, a value "|Z0|", which is an absolute value of the Z component of a vertice p(P0e) of the polygon PG, is used as Zrep.

<2-1-3-2> Case where Projection Conversion Matrix P is for Parallel Projection Conversion The scaling coefficient determination unit 13 performs operations based on Expressions (16) and (17) using the calculated lengths Lx and Ly of the polygon PG in the X direction and the Y direction, respectively, thereby calculating the first scaling coefficient scx and the second scaling coefficient scy.

$$scx = A * Lx (0 < A) \qquad \text{[Expression 16]}$$

$$scy = B * Ly (0 < B) \qquad \text{[Expression 17]}$$

Here, the value "A" represents a scaling value of the polygon PG in the X direction for performing viewport conversion. The value "B" represents a scaling value of the polygon PG in the Y direction for performing viewport conversion.

Note that the scaling values A and B are stored in the scaling coefficient determination unit 13.

<2-1-4> Projection Conversion Unit

The projection conversion unit 14 performs projection conversion on the coordinate data Pie constituting the polygon data PD3.

Here, based on the information relating to the projection conversion matrix projection P input by the projection conversion matrix setup unit 14a, the projection conversion unit 14 judges whether the projection conversion matrix P is for perspective projection conversion or for parallel projection conversion. Based on a result of the judgment, the projection conversion unit 14 changes the method of performing an operation on the polygon data PD3. Note that the projection conversion unit 14 judges a type of the projection conversion matrix P based on whether the fourth row of the projection conversion matrix P is (0001) or not (see the Expressions (16) and (17)).

Figure 7:
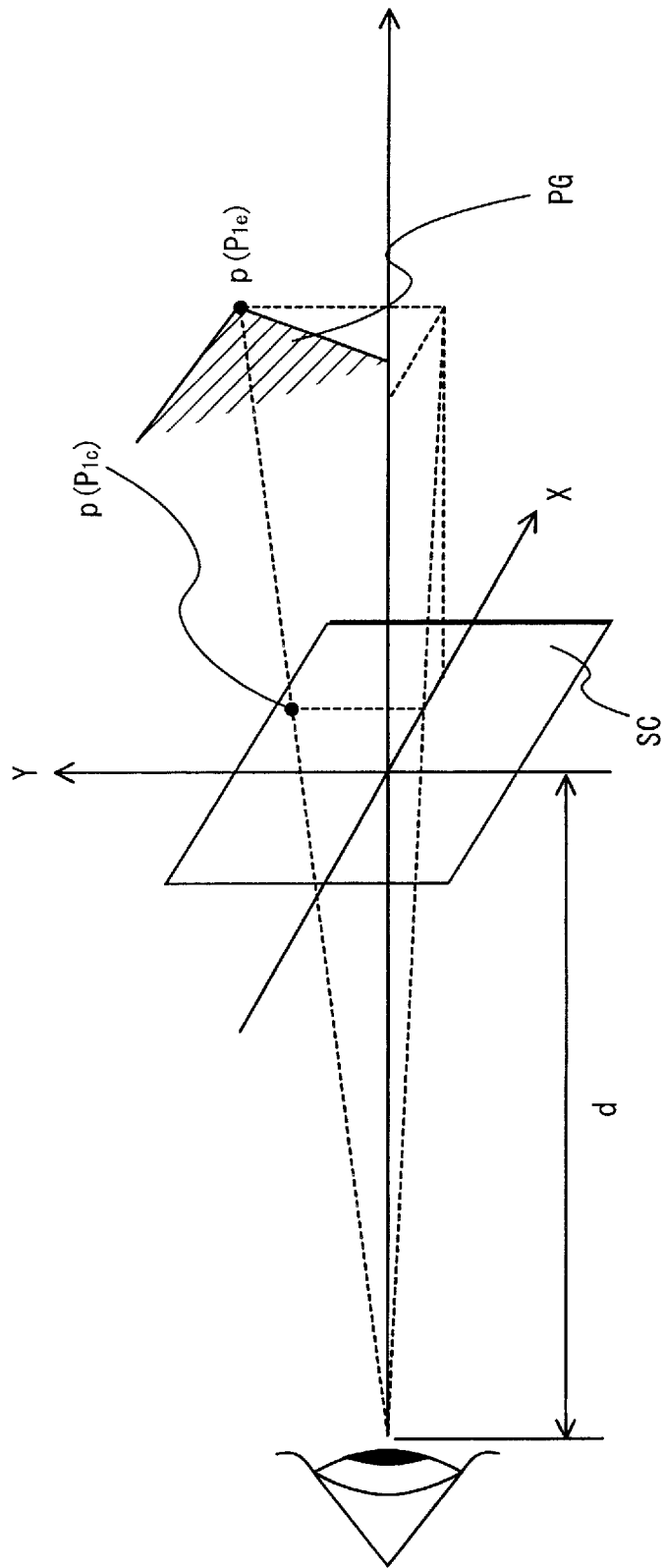
FIG. 7 shows projection conversion relating to the Embodiment 1.

<2-1-4-1> Case where Projection Conversion Matrix P is for Perspective Projection Conversion The projection conversion unit 14 calculates coordinate data (polygon data PD4) (see FIG. 2) representing vertices of a polygon PG on the view coordinate system that is projected onto a projection surface SC, as shown in FIG. 7. The projection surface SC is positioned distant by d from the view point and perpendicular to the z axis.

Here, the projection conversion unit 14 performs an operation based on an Expression (18) using the polygon data PD3 and the projection conversion matrix P to obtain the polygon data PD4.

$$Pic = \begin{pmatrix} Xic \\ Yic \\ Zic \\ Wic \end{pmatrix} = P * Ple = \qquad \text{[Expression 18]}$$

$$\begin{bmatrix} 1 & 0 & 0 & 0 \\ 0 & 1 & 0 & 0 \\ 0 & 0 & 1 & 0 \\ 0 & 0 & 1/d & 0 \end{bmatrix} \begin{pmatrix} Xie \\ Yie \\ Zie \\ 1 \end{pmatrix} = \begin{pmatrix} Xie \\ Yie \\ Zie \\ Zie/d \end{pmatrix}$$

$(i = 0, 1, 2, 3)$

Here, the value "Pic" represents coordinate data constituting the polygon data PD4. The value "Pie" represents coordinate data constituting the polygon data PD3. The value "P" represents a projection conversion matrix on which perspective projection conversion is to be performed. The sign "*" represents multiplication of a matrix and a vector.

Then, the projection conversion unit 14 further performs an operation based on an Expression (19) using the polygon data PD4 to obtain polygon data PD5 (see FIG. 2).

$$Pid = \begin{pmatrix} Xid \\ Yid \\ Zid \\ 1 \end{pmatrix} = 1/(Z1e/d) * E * Pic = \qquad \text{[Expression 19]}$$

$$\frac{1}{Zie/d} \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{pmatrix} Xie \\ Yie \\ Zie \\ Zie/d \end{pmatrix} = \begin{pmatrix} Xie/(Zie/d) \\ Yie/(Zie/d) \\ d \\ 1 \end{pmatrix}$$

$(i = 0, 1, 2, 3)$

Here, the value "Pie" represents coordinate data constituting the polygon data PD3. The value "Pid" represents coordinate data constituting the polygon data PD5. The value "d" represents a distance between the view point and the projection surface SC. The sign "*" represents multiplication of a matrix and a vector.

As shown in the Expression (19), the coordinate data Pid includes a Z component "Zie", and accordingly varies depending on the distance Zref between the view point and the polygon PG.

<2-1-4-2> Case where Projection Conversion Matrix P is for Parallel Projection Conversion The projection conversion unit 14 performs an operation based on an Expression (20) using the polygon data PD3 and the projection conversion matrix P to obtain the polygon data PD5 (see FIG. 2).

$$Pid = \begin{pmatrix} Xid \\ Yid \\ Zid \\ 1 \end{pmatrix} = P * Pie = \begin{bmatrix} 1 & 0 & 0 & 0 \\ 0 & 1 & 0 & 0 \\ 0 & 0 & 0 & 0 \\ 0 & 0 & 0 & 1 \end{bmatrix} \begin{pmatrix} Xie \\ Yie \\ Zie \\ 1 \end{pmatrix} = \qquad \text{[Expression 20]}$$

$$\begin{pmatrix} Xie \\ Yie \\ 0 \\ 1 \end{pmatrix}$$

$(i = 0, 1, 2, 3)$

Here, the value "Pid" represents coordinate data constituting the polygon data PD5. The value "Pie" represents coordinate data constituting the polygon data PD3. The value "Zrep" represents a distance between the view point and the projection surface SC. The value "P" represents a projection conversion matrix on which parallel projection conversion is to be performed. The sign "*" represents multiplication of a matrix and a vector.

As shown in the Expression (20), the coordinate data Pid does not include a Z component Zie, and accordingly does not depend on the distance Zref between the view point and the polygon PG.

Also, when generating the polygon data PD5, the projection conversion unit 14 performs viewport conversion on the generated polygon data PD5 to generate polygon data PD6.

Figure 8:
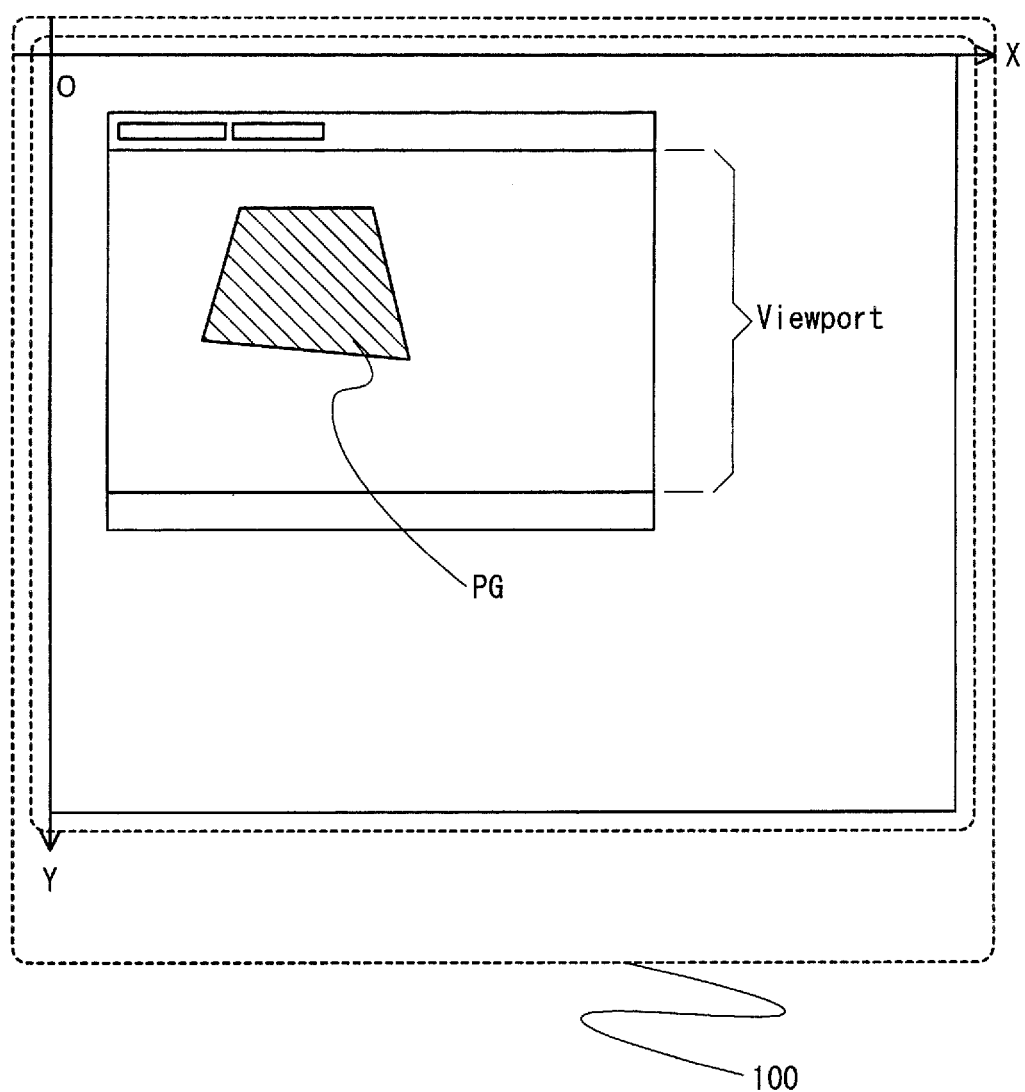
FIG. 8 shows viewport conversion relating to the Embodiment 1.

This polygon data PD6 is composed of coordinate data Piw (i=0, 1, 2, 3), which is obtained by converting the coordinate data Pid (i=0, 1, 2, 3) constituting the polygon data PD5 into a coordinate system on an actual display screen ("screen coordinate system") as shown in FIG. 8.

Also, the projection conversion unit 14 calculates brightness of each vertice p(Pid) of the polygon PG based on the Lambert model, the Phong model, or the like, using attribute information BD2 relating to a normal vector included in the polygon data PD5.

Then, the projection conversion unit 14 inputs, into the polygon rasterization unit 15, the polygon data PD6 including attribute information BD3 relating to the brightness of each vertice p(Pid).

<3-1-5> Polygon Rasterization Unit

The polygon rasterization unit 15 rasterizes a contour of the polygon PG using the polygon data PD6 input by the projection conversion unit 14, based on the DDA (Digital Differential Analyzer) method. Also, the polygon rasterization unit 15 generates frame data FD representing a raster image of the polygon PG using attribute information BD1 relating to a color value, the attribute information BD3 relating to the brightness, and the texture data TD. Note that the frame data FD is composed of color value data of each of pixels constituting the raster image of the polygon PG.

Then, the polygon rasterization unit 15 writes the generated frame data FD into the frame buffer 22.

<2-1-6> Image Display Unit

The image display unit 10*c* causes a display 100, which is connected to the outside, to display 3D image based on the frame data FD stored in the frame buffer 22.

<2-2> Projection Conversion Unit

The projection conversion matrix setup unit 14*a* is composed of a touch panel and so on. A user can select, as a projection conversion matrix P, which one of a matrix on which perspective projection conversion is to be performed and a matrix on which parallel projection conversion is to be performed. Then, the projection conversion matrix setup unit 14*a* inputs information relating to the projection conversion matrix P selected by the user, into the scaling coefficient determination unit 13 and the projection conversion unit 14.

<2-3> 2D Image Processing Apparatus

A 2D image processing apparatus 10*b* includes a processor (not shown) and a memory (not shown). The processor appropriately reads and executes a program, thereby realizing a vector data input reception unit 16, a vector data conversion unit 18, a texture generation unit 19, and a texture mapping unit 20.

<2-3-1> Vector Data Input Reception Unit

The vector data input reception unit 16 receives vector data VD input by the user via the vector data input unit 220.

<2-3-3> Vector Data Conversion Unit

When vector data VD1 is input by the vector data input reception unit 16, the vector data conversion unit 18 performs an operation so as to add 1 as a z component to each of vertice data Vi (xi,yi) (i=0, 1, . . . , 44) constituting the vector data VD1 and control point data Si (xi,yi) (i=0, 1, . . . , 42). As a result of this conversion, vector data VD2 is obtained, which is composed of vertice data Vih (xi,yi,1) (i=0, 1, . . . , 44) that is represented by the 3D coordinate system and control point data Sih (xi,yi,1) (i=0, 1, . . . , 42) (see FIG. 4).

Also, the vector data conversion unit 18 generates a scaling matrix S represented by an Expression (21), using a value α acquired from the scaling value storage unit 51 as a scaling rate (scaling value) scalex and scaley of the vector data VD2 in the X direction and the Y direction.

$$S = \begin{bmatrix} scalex & 0 & 0 \\ 0 & scaley & 0 \\ 0 & 0 & 1 \end{bmatrix} = \begin{bmatrix} \alpha & 0 & 0 \\ 0 & \alpha & 0 \\ 0 & 0 & 1 \end{bmatrix} \quad \text{[Expression 21]}$$

In this scaling value determination processing, an optimal scaling value is determined among scaling values included in the scaling value table T stored in the scaling value storage unit 51.

Also, the vector data conversion unit 18 stores therein a determination disable flag F, which is set to "1" when the scaling coefficient cannot be determined. As a result of the scaling value determination processing, when it is judged that the optimal scaling value α is not included in the scaling table T, the vector data conversion unit 18 sets the determination disable flag F to "1".

The vector data conversion unit 18 performs operations (scaling) based on Expressions (22) and (23) using the vector data VD2 and the scaling matrix S to generate vector data VD3 (second vector data) (see FIG. 4).

$$Vit = S*Vih \quad \text{[Expression 22]}$$

$$Sit = S*Sih \quad \text{[Expression 23]}$$

Here, the value "Vih" (i=0, 1, . . . , 44) represents vertice data constituting the vector data VD2. The value "Sih" (i=0, 1, . . . , 42) represents control point data constituting the vector data VD2. The value "Vit" (i=0, 1, . . . , 44) represents vertice data constituting the vector data VD3. The value "Sit" (i=0, 1, . . . , 42) represents control point data constituting the vector data VD3. The sign "S" represents a scaling matrix. The sign "*" represents multiplication of a matrix and a vector.

Also, the vector data conversion unit 18 performs scaling value determination processing for determining the optimal scaling value α from among scaling values included in the scaling value table T (see FIG. 9) stored in the scaling value storage unit 51, based on the first scaling coefficient scx and the second scaling coefficient scy input by the scaling coefficient determination unit 13. The details of the scaling value determination processing are described later.

<2-3-4> Texture Generation Unit

The texture generation unit 19 performs rasterization processing on the vector data VD3 to generate a texture to be attached onto the polygon.

The texture generation unit 19 acquires the vertice data Vit constituting the vector data VD3 and the control point data Sit. Then, the texture generation unit 19 approximates a Bezier curve, which is represented by the pex data and the control point data Sit, by an aggregate of minor straight lines to generate outline data composed of an aggregate of pieces of segment data representing the minor straight lines.

Then, the texture generation unit 19 generates texture data TD composed of color value data of each of pixels constituting the texture, based on outline data and the attribute information BD21 relating to a color value included in the vector data VD1. Then, the texture generation unit 19 stores the generated texture data TD in the texture buffer 21.

<2-3-5> Texture Mapping Unit

Figure 10:
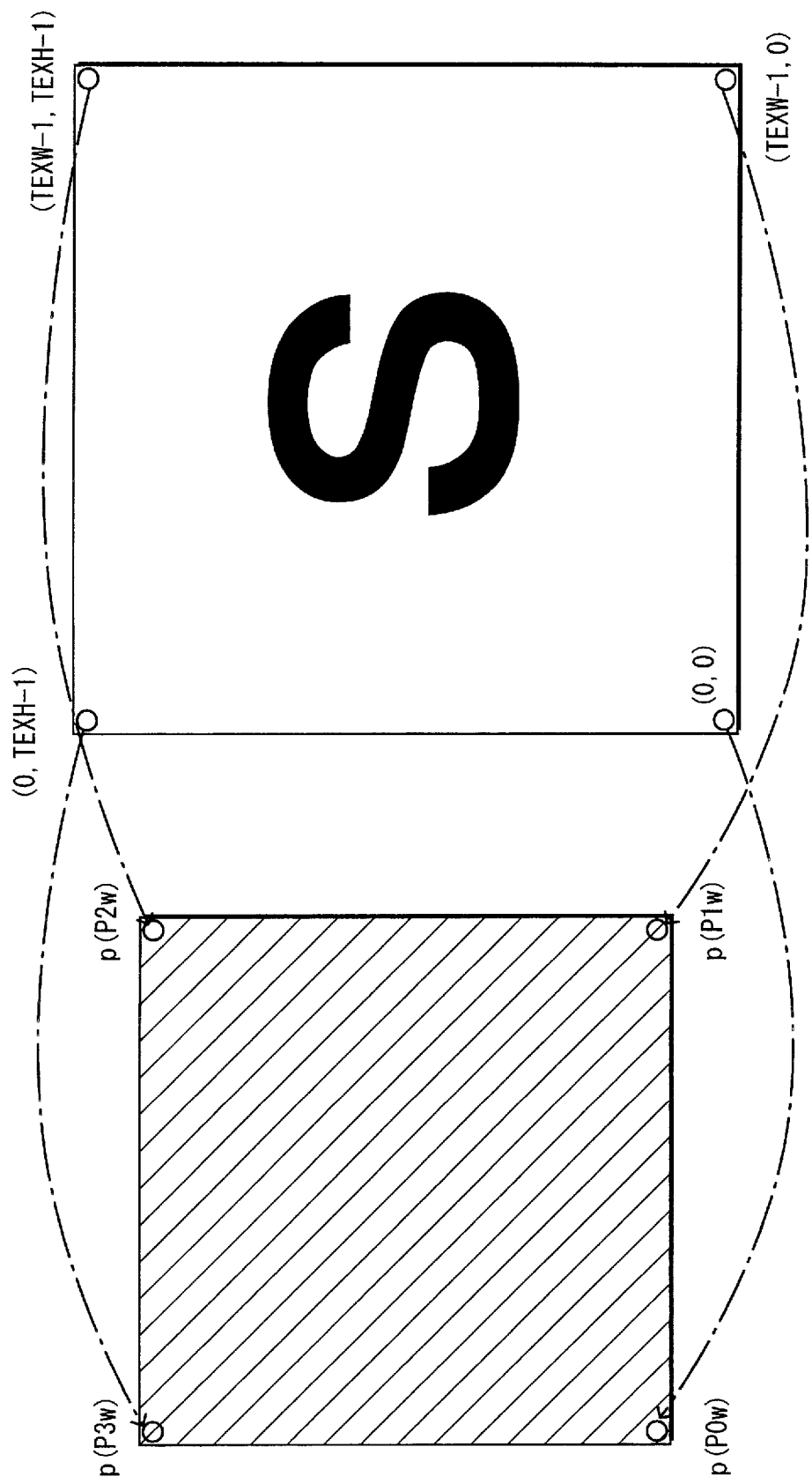
FIG. 10 shows mapping of a texture onto a polygon relating to the Embodiment 1.

The texture mapping unit 20 determines a color value of each pixel of the polygon PG onto which the texture is to be attached, based on the texture data stored in the texture buffer 21. For example, assume a case where, with respect to the texture represented by the texture data, a pixel on the bottom left is an original point (0,0), the number of pixels in the X direction is TEXW, and the number of pixels in the Y direction is TEXH, as shown in FIG. 10. In this case, the color value of each pixel constituting the raster image of the polygon PG is determined such that a pixel located on the coordinate (0,0), a pixel located on the coordinate (TEXW−1,0), a pixel located on the coordinate (TEXW−1,TEXH−1), and a pixel located on the coordinate (0,TEXH−1) are mapped onto the vertice p(P0w), the vertice p(P1w), the vertice p(P2w), and the vertice p(P3w) of the polygon PG, respectively.

Here, the texture mapping unit 20 performs perspective correction on the color value of each pixel of the texture, based on the polygon data PD6 input by the projection conversion unit 14 and the texture data. Also, when the resolution of the raster image of the polygon PG is lower than the resolution of the texture, the texture mapping unit 20 appropriately performs equalization processing to determine the color value of each pixel constituting the raster image of the polygon PG.

<3-4> Texture Buffer, Frame Buffer, and Scaling Value Storage Unit

The texture buffer 21 and the frame buffer 22 are each composed of a DRAM (Dynamic Random Access Memory) and so on, for example.

The texture buffer 21 is a buffer for storing a texture generated by the texture generation unit 19.

Also, the frame buffer 22 is a buffer for writing color data of each pixel generated by the polygon rasterization unit 15.

The scaling value storage unit 51 stores therein the scaling value table T as shown in FIG. 9.

In the case where a character texture composed of a raster image is scaled, some sort of filtering processing is applied. This tends to cause occurrence of aliasing and character crushing. Compared with this, in the case where processing is performed on vector data without being converted, it is possible to perform scaling with no loss of shape information that is originally included in character data. As a result, by using vector data, even in the case where scaling is performed, it is possible to generate a character texture having a high quality.

<3> Operations

The following describes, with respect to operations of the graphics rendering apparatus 50 relating to the present embodiment, operations of the 3D image processing apparatus and operations of the 2D image processing apparatus.

<3-1> Operations of 3D Image Processing Apparatus

Figure 11:
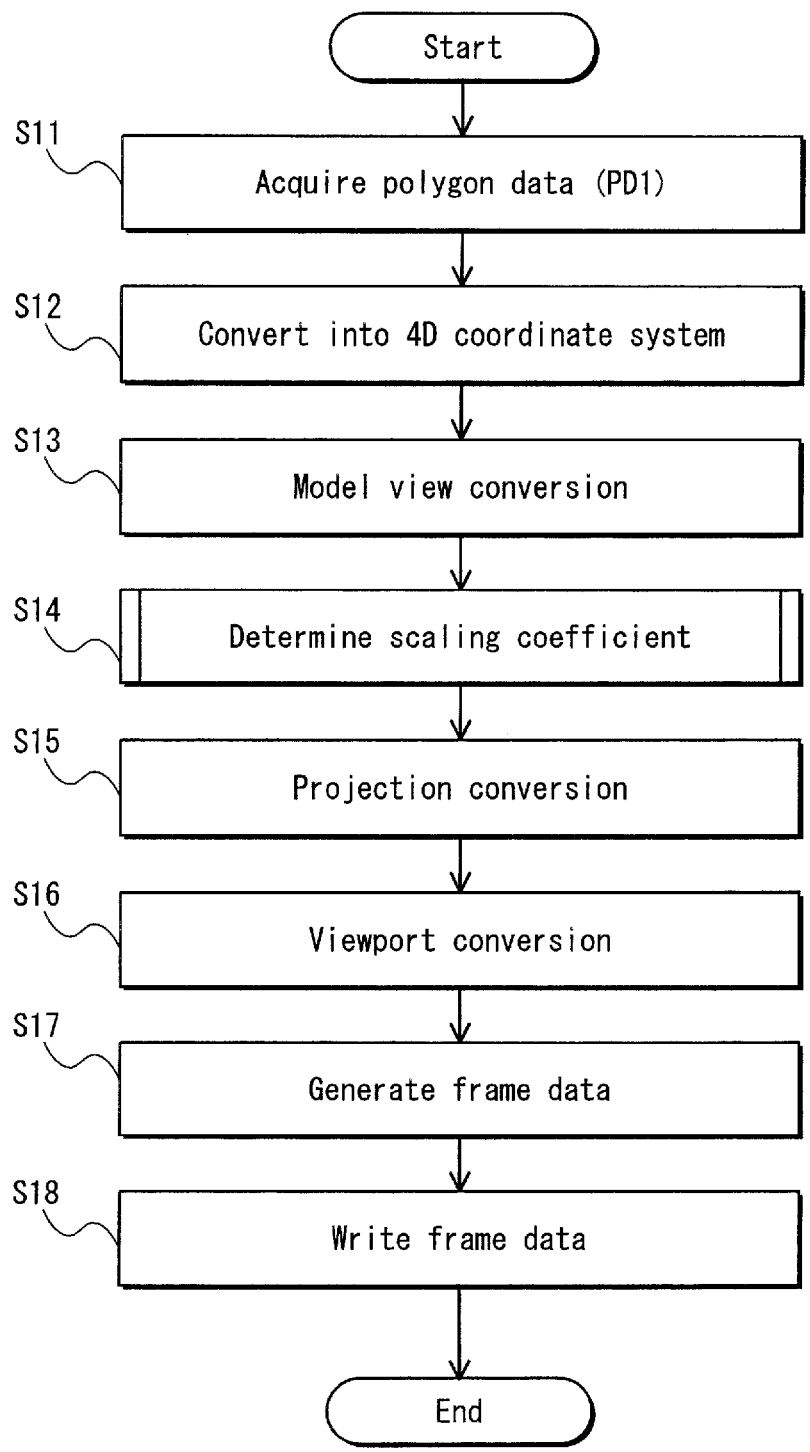
FIG. 11 is a flow chart showing operations of the graphics rendering apparatus relating to the Embodiment 1.

FIG. 11 is a flow chart showing the operation of the 3D image processing apparatus relating to the present embodiment.

Firstly, when the polygon data input reception unit 11 acquires the polygon data PD1 (Step S11), the 3D coordinate conversion unit 12 converts the polygon data PD1 into the 4D coordinate system to generate polygon data PD 2 (Step S12). Furthermore, the polygon data input reception unit 11 performs model view conversion on the polygon data PD 2 to generate polygon data PD3 (Step S13).

Then, the scaling coefficient determination unit 13 determines the first scaling coefficient scx and the second scaling coefficient scy, using the polygon data PD3 and information relating to projection conversion matrix P input by the projection conversion matrix setup unit 14a (Step S14). Then, the scaling coefficient determination unit 13 inputs the determined scx and scy into the vector data conversion unit 18 of the 2D image processing apparatus 10b.

Then, the projection conversion unit 14 performs projection conversion on the polygon data PD3 to generate polygon data PD5, which is composed of coordinate data Pid (i=0, 1, 2, 3) (Step S15), and then performs viewport conversion on the polygon data PD5 to generate polygon data PD6, which is composed of coordinate data Piw (i=0, 1, 2, 3) (Step S16). Then, the projection conversion unit 14 inputs the generated polygon data and PD6 into the polygon rasterization unit 15.

Lastly, the polygon rasterization unit 15 generates frame data FD using the polygon data PD6 and texture data TD input by the texture mapping unit 20 (Step S17), and writes the generated frame data FD into the frame buffer 22 (Step S18).

Here, before projection conversion is performed by the projection conversion unit 14 (Step S15), the scaling coefficient determination unit 13 calculates the first scaling coefficient scx and the second scaling coefficient scy. Accordingly, compared with the case of calculation of the first scaling coefficient scx and the second scaling coefficient scy using the polygon data PD5 after projection conversion is performed by the projection conversion unit 14, it is possible to increase the processing parallelism with the 2D image processing apparatus, thereby increasing the capability of the whole rendering processing.

<3-1-1> Scaling Coefficient Calculation

Figure 12:
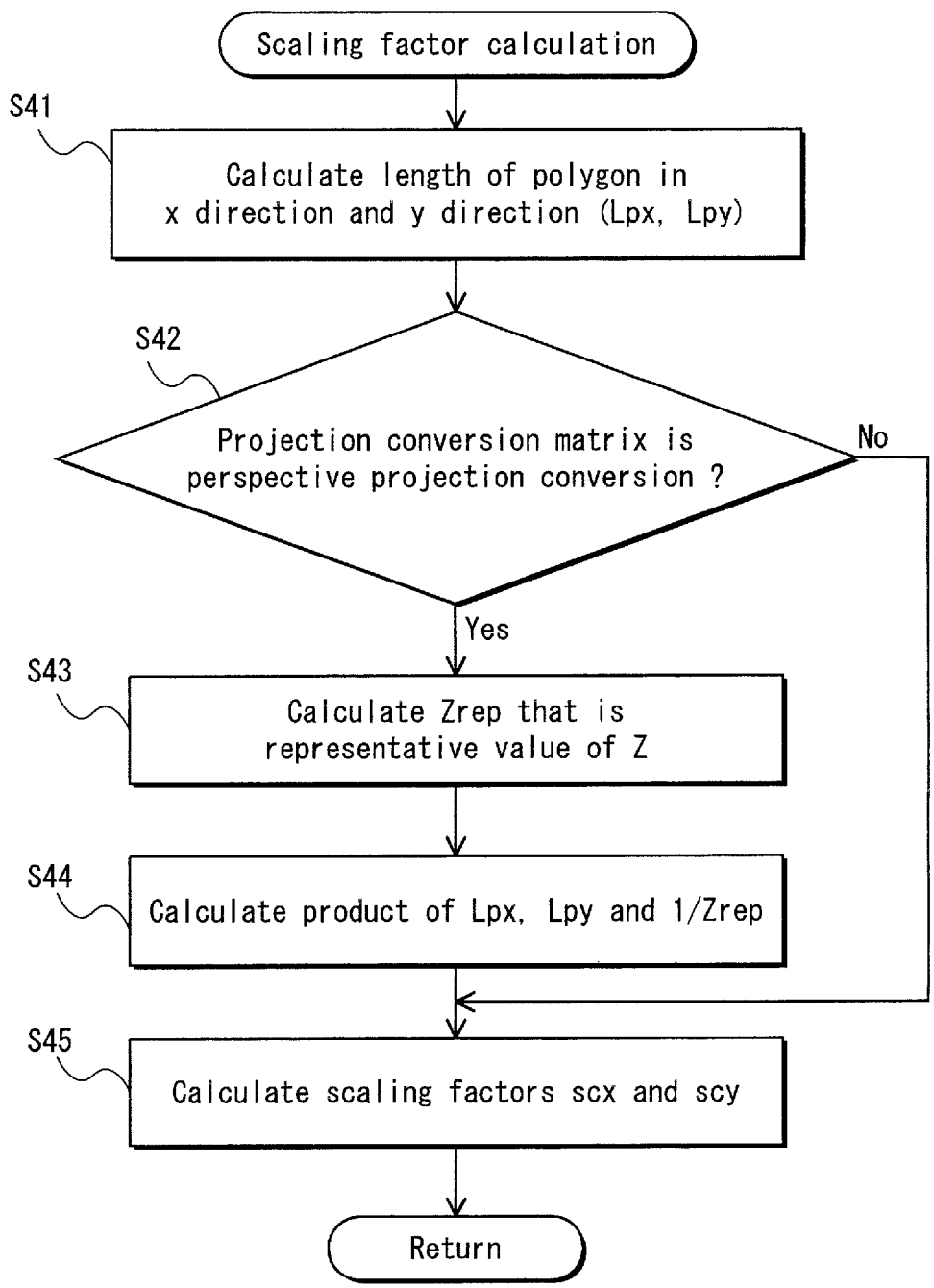
FIG. 12 is a flow chart showing scaling coefficient calculation processing relating to the Embodiment 1.

FIG. 12 is a flow chart showing operations of scaling coefficient calculation processing.

Firstly, the scaling coefficient determination unit 13 calculates, with respect to the polygon PG, the length Lx in the X direction and the length Ly in the Y direction (Step S41).

Next, the scaling coefficient determination unit 13 judges whether the information, which relates to the projection conversion matrix P input by the projection conversion matrix setup unit 14a, relates to a projection conversion matrix (perspective projection conversion matrix) on which perspective projection conversion is to be performed (Step S42). Here, the scaling coefficient determination unit 13 checks whether four components constituting the fourth row of the input projection conversion matrix P are (0,0,0,1). When checking that the four components are (0,0,0,1), the scaling coefficient determination unit 13 judges to perform parallel projection conversion. When checking that the four components are not (0,0,0,1), the scaling coefficient determination unit 13 judges not to perform perspective projection conversion.

When judging that the input relation relates to the perspective projection conversion matrix (Step S42), the scaling coefficient determination unit 13 calculates a coefficient Zrep based on the coordinate data Pie constituting the polygon data PD3 (Step S43). Here, the scaling coefficient determination unit 13 selects coordinate data P0e among the coordinate data Pie constituting the polygon data PD2, and adopts a value Z0e of a Z component of the selected coordinate data P0e as the coefficient Zrep.

Then, the scaling coefficient determination unit 13 multiplies the length Lpx of the polygon PG in the X direction by a reciprocal of the coefficient Zrep based on the Expression (14), and multiplies the length Lpy of the polygon PG in the Y direction by the reciprocal of the coefficient Zrep based on the Expression (15) (Step S44). Furthermore, the scaling coefficient determination unit 13 multiplies multiplication results of the lengths Lpx and Lpy by the coefficients A and B (A, B>0) to obtain the first scaling coefficient scx and the second scaling coefficient scy, respectively (Step S45).

On the contrary, when judging that the information does not relates to the perspective projection conversion matrix (Step S42: No), the scaling coefficient determination unit 13 performs multiplication on the coefficient A and the length Lpx of the X direction of the polygon PG based on the Expression (16), and multiplication on the coefficient B and the length Lpy of the Y direction of the polygon PG based on the Expression (17) to calculate the first scaling coefficient scx and the second scaling coefficient scy (Step S45).

<3-2> Operations of 2D Image Processing Apparatus

Figure 13:
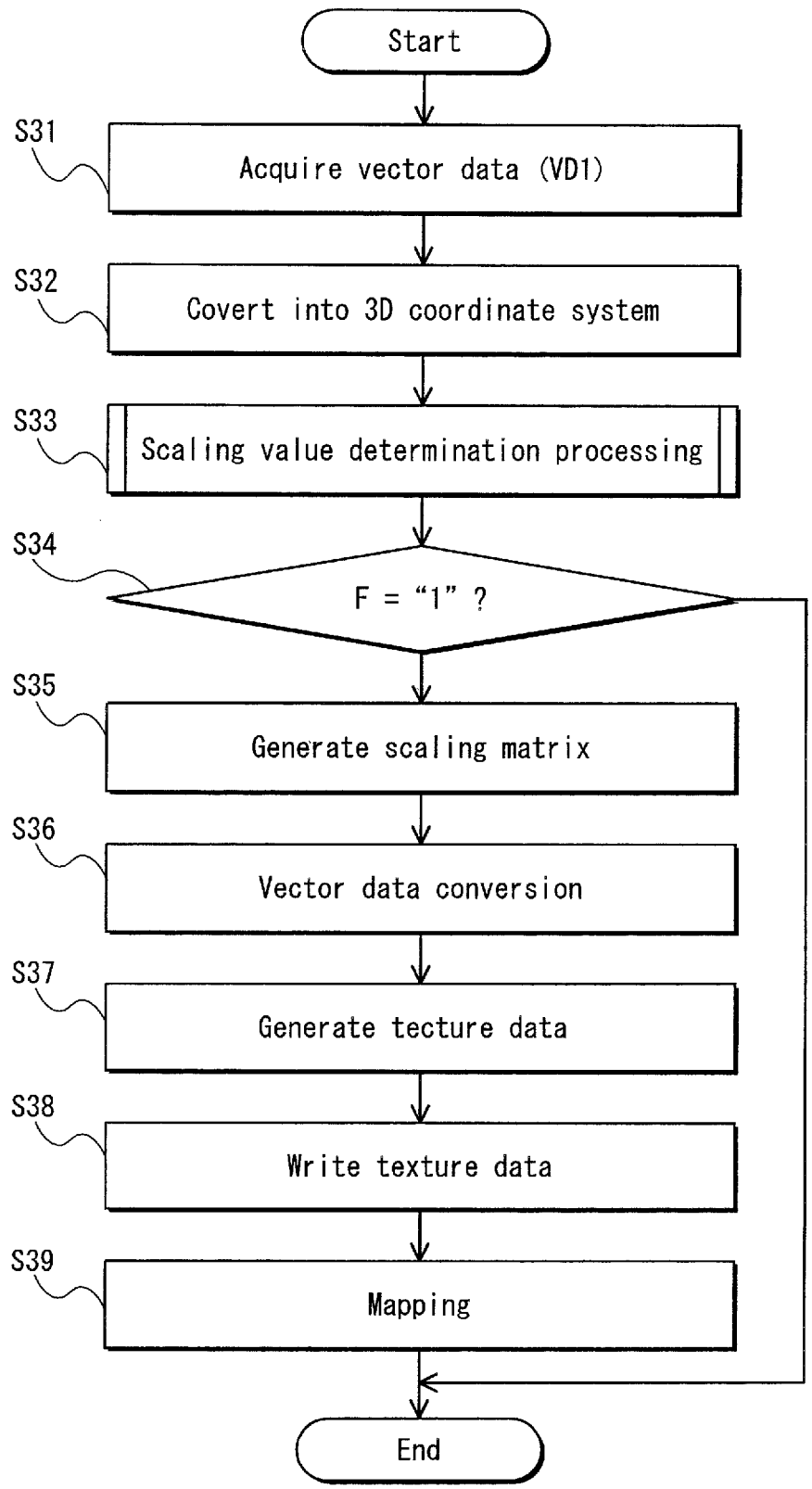
FIG. 13 is a flow chart showing operations of the graphics rendering apparatus relating to the Embodiment 1.

FIG. 13 is a flow chart showing the operation of the 2D image processing apparatus relating to the present embodiment.

Firstly, the vector data input reception unit 16 acquires vector data VD1 input by the user via the vector data input unit 220 (Step S31), and inputs the acquired vector data VD1 into the vector data conversion unit 18.

Next, the vector data conversion unit 18 converts the vector data VD1 into vector data VD2 that is represented by the 3D coordinate system (Step S32).

Then, the vector data conversion unit 18 performs scaling value determination processing, which is described later, using a value α acquired from the scaling value storage unit 51 (a candidate value for the first scaling value scalex and the second scaling value scaley), the first scaling value scalex, and the second scaling value scaley (Step S33). Then, the vector data conversion unit 18 judges whether the determination disable flag F is set to "1" based on a result of the scaling value determination processing (Step S34). When judging the determination disable flag F is set to "1" (Step S34: Yes), the processing ends.

On the contrary, when judging that the determination flag F is not set to "1" (Step S34: No), the vector data conversion unit 18 generates a scaling matrix S that is represented by an Expression (31), using the determined scaling values scalex and scaley (Step S35).

Then, the vector data conversion unit 18 performs operations on the vector data VD2 based on the Expressions (22) and (23) to convert the vector data VD2 to generate vector data VD3 (Step S36).

Then, the texture generation unit 19 performs rasterization processing using the vector data VD3 to generate texture data (Step S37), and stores the generated texture data in the texture buffer 21 (Step S38).

Next, the texture mapping unit 20 determines (maps) a color value of each pixel constituting a raster image of the polygon PG, based on the texture data stored in the texture buffer 21 (Step S39).

According to the present embodiment, comparatively soon after the 3D image processing apparatus 10a starts processing, the first scaling coefficient scx and the second scaling coefficient scy are input into the 2D image processing apparatus 10b. This enables the 2D image processing apparatus 10b to further the processing subsequent to the scaling coefficient determination processing. Accordingly, it is possible to increase the parallelism between the processing of the 3D image processing apparatus 10a and the processing of the image processing apparatus 10b, thereby increasing the processing efficiency of the whole graphics rendering apparatus 50.

<3-2-1> Scaling Value Determination Processing

Figure 14:
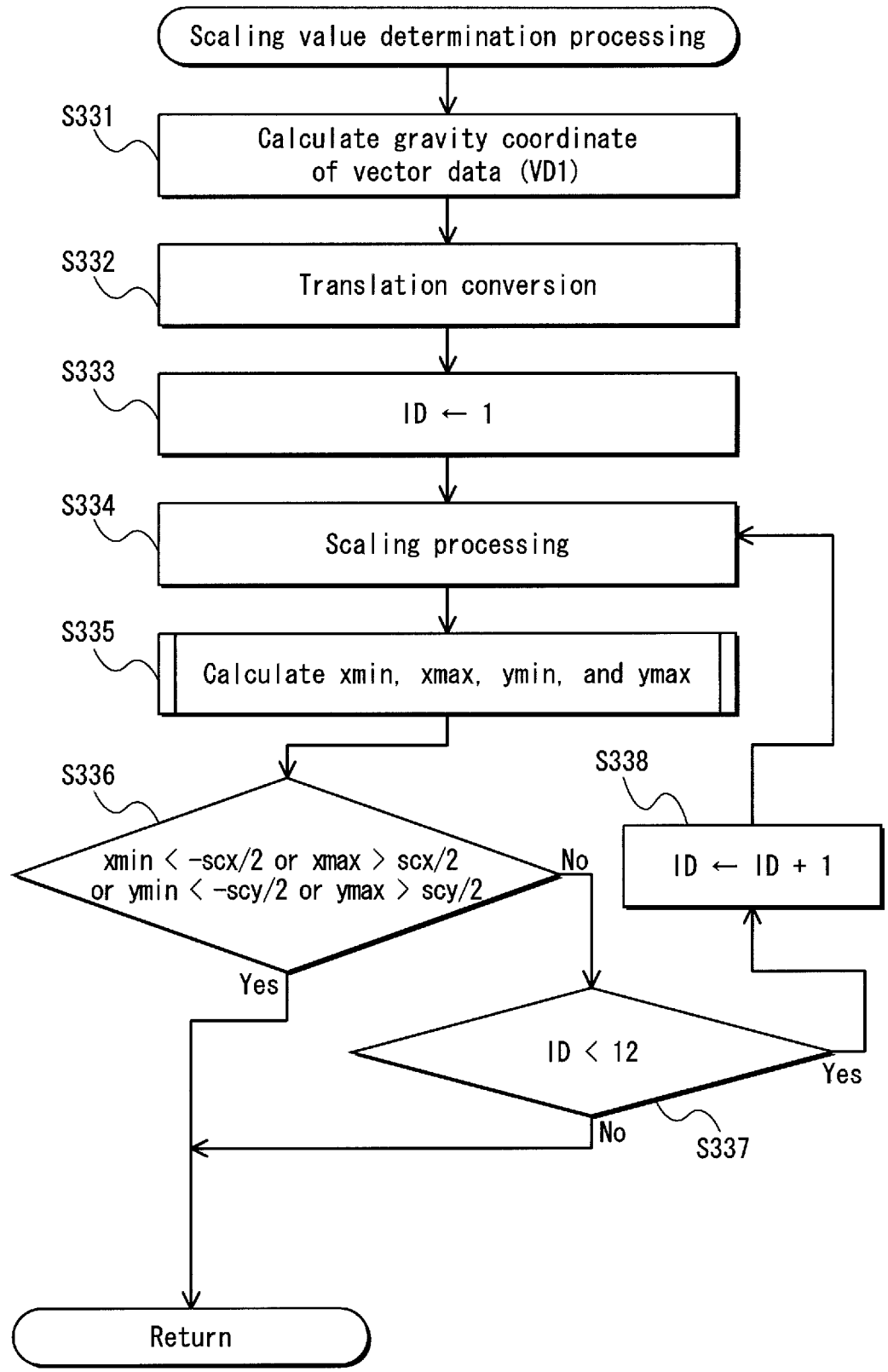
FIG. 14 is a flow chart showing scaling coefficient determination processing relating to the Embodiment 1.

FIG. 14 is a flow chart showing operations of scaling coefficient calculation processing.

Firstly, the vector data conversion unit 18 generates gravity coordinate data G (xg,yg) based on 45 pieces of vertice data Vi (xi,yi) (i=0, 1, ..., 44) constituting the vector data VD1 (Step S331).

$$xg = \left(\sum_{i=0}^{44} xi\right) / 45 \qquad \text{[Expression 24]}$$

$$yg = \left(\sum_{i=0}^{44} yi\right) / 45 \qquad \text{[Expression 25]}$$

The above expressions 24 and 25 are satisfied.

Then, the vector data conversion unit 18 performs translation conversion on the vertice data Vih such that the gravity coordinate G (xg,yg) overlaps an original point (Step S332). Here, Vih=(xi−xg,yi−yg,1) (i=0, ..., 44) is satisfied.

Then, the vector data conversion unit 18 acquires a value (α=0.5) corresponding to an ID "1" included in the scaling value table T (see FIG. 9), and performs an operation based on the Expression (19) to generate vertice data Vit (Step S333).

Then, the vector data conversion unit 18 calculates, with respect to the X coordinate of the vertice data Vit, the maximum value xmax and the minimum value xmin, and calculates, with respect to the Y coordinate of the vertice data Vit, the maximum value ymax and the minimum value ymin, using a method described in the item <3-3> later (Step S334).

Then, the vector data conversion unit 18 judges whether any of Expressions (26) to (29) is satisfied by the values xmax, xmin, ymax, and ymin, which are calculated using the method described later in the item <4-3>, and the first scaling coefficient scx and the second scaling coefficient scy, which are acquired from the scaling coefficient determination unit 13 (Step S335).

$$x\min < -scx/2 \qquad \text{[Expression 26]}$$

$$x\max > scx/2 \qquad \text{[Expression 27]}$$

$$y\min < -scy/2 \qquad \text{[Expression 28]}$$

$$y\max > scy/2 \qquad \text{[Expression 29]}$$

Here, when the vector data conversion unit 18 judges that any of the Expressions (26) to (29) is satisfied (Step S336: Yes), the scaling value determination processing ends. Here, in the case where any of the Expressions (26) to (29) is satisfied by an ID whose value is smaller by 1 than the value of the ID, which is used for the judgment, corresponding to the scaling value α, the scaling value α corresponding to the ID=5 (α=2.5)) is determined as the optimal value.

On the contrary, when judging that all of the Expressions (26) to (29) are not satisfied (Step S336: No), the vector data conversion unit 18 further judges whether the value of the ID is smaller than "12", which is its maximum value (see FIG. 9) (Step S337).

When judging that the value of the ID is smaller than "12" (Step S337: Yes), the vector conversion unit 18 acquires a scaling value (α=1.0) corresponding to an ID whose value is "2" (Step S338), and then the processing flow proceeds to Step S334.

In the subsequent processing, the vector conversion unit 18 acquires the value α corresponding to the ID (="3, 4, ..., 12") included in the scaling value table T (see FIG. 9), and performs an operation based on the Expression (19) to generate vertice data Vit and control point data Sit (Step S334). Then, the vector data conversion unit 18 calculates, with respect to the X coordinate of the vertice data Vits, the maximum value xmax and the minimum value xmin, and calculates, with respect to the Y coordinate of the vertice data Vits, the maximum value ymax and the minimum value ymin, using the method described in the item <4-3> later (Step S335).

Then, the vector data conversion unit 18 judges whether any of Expressions (45) to (48) is satisfied by the values xmax, xmin, ymax, and ymin, which are calculated using the method described later in the item <4-3>, and the first scaling coefficient scx and the second scaling coefficient scy, which are acquired from the scaling coefficient determination unit 13 (Step S336). When judging that all of the Expressions (45) to (48) are not satisfied (Step S336: No), the vector data conversion unit 18 further judges whether the value of the ID is smaller than the value "12" (Step S337). When judging that the value of the ID is smaller than the value "12" (Step S337: Yes), the vector data conversion unit 18 acquires a scaling value α corresponding to ID+1. Then, the processing flow proceeds to S334.

On the contrary, when judging that the value of the ID is equal to or greater than the value "12" (Step S336: No), the vector data conversion unit 18 sets the determination disable flag F to "1", and the processing ends.

<3-3> Calculation of Values xmax, xmin, ymax, and ymin

Figure 15:
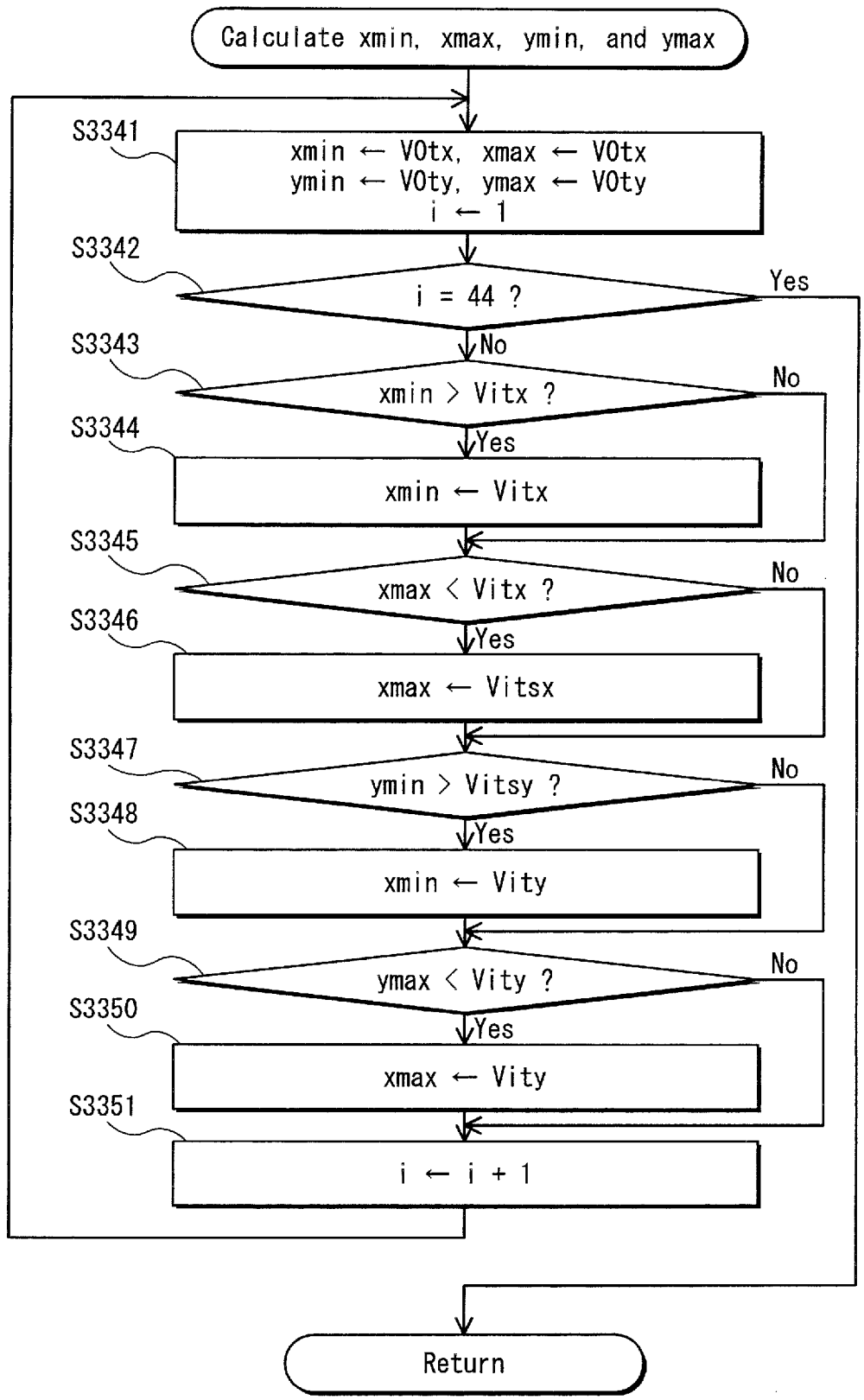
FIG. 15 is a flow chart showing scaling coefficient determination processing relating to the Embodiment 1.

FIG. 15 is a flow chart of calculation processing of the values xmax, xmin, ymax, and ymin. Here, Vitx represents an x component of the vertice data Vit, and Vity represents a y component of the vertice data Vit.

In the processing of the values xmax, xmin, ymax, and ymin, the vector data conversion unit 18 performs the following processing.

Firstly, the vector data conversion unit 18 stores α value V0tx, which represents the x component of the vertice data V0t constituting the vector data VD1 after conversion, in variables xmin and xmax defined on a memory (calculation buffer), and stores a value V0ty, which represents a y component of the vertice data V0t, in variables ymin and ymax. As a result, the vertice data V0t is initialized (Step S3341).

Then, the vector data conversion unit 18 stores a value "1" in a variable "i" defined on the calculation buffer, and then repeatedly performs the following processing until a value "44" is stored in the v variable "i" (Steps S3342 to S3351).

Firstly, the vector data conversion unit 18 compares the variable xmin with the value Vitx (Step S3343). When the variable xmin is greater than the value Vitx, the vector data conversion unit 18 stores the value Vitx in the variable xmin (Step S3344).

Next, the vector data conversion unit 18 compares the variable xmax with the value Vitx (Step S3345). When the variable xmax is smaller than the value Vitx, the vector data conversion unit 18 stores the value Vitx in the variable xmax (Step S3346).

Next, the vector data conversion unit 18 compares the variable ymin with the value Vity (Step S3347). When the variable ymin is greater than the value Vity, the vector data conversion unit 18 stores the value yi in the variable ymin (Step S3348).

Next, the vector data conversion unit 18 compares the variable ymax with the value Vity (Step S3349). When the variable ymax is smaller than the value Vity, the vector data conversion unit 18 stores the value Vity in the variable ymax (Step S3350).

Then, the vector data conversion unit 18 increments the variable "i" (Step S3351).

The variables xmin, ymin, xmax, and variable eventually held after repetitive performance of the above processing are used for performing Step S336.

Embodiment 2

<1> Data

<1-1> Polygon Data

According to the present embodiment, in the same way as in the Embodiment 1, polygon data PD1 is used, which represents a shape of a rectangular polygon PG onto which a texture is to be mapped, as shown in FIG. 1.

<1-2> Vector Data

Vector data VD1 (first vector data) is data that defines a shape of a character rendered on a 2D surface as shown in FIG. 2A, in the same way as in the Embodiment 1. As shown in FIG. 2B, the vector data VD1 is composed of coordinate data (hereinafter, "vertice data") Vi (xi,yi) (i=0, 1, . . . , 44) representing a plurality of vertices p(Vi) (45 vertices in the example shown in FIG. 3B) on a contour of the character and coordinate data (hereinafter, "control point data") Si(xi,yi) (i=0, 1, . . . , 42) representing a control point p(Si) that defines a curved line drawn between adjacent vertices p(Vi) and p(Vi+1) along the contour (see FIG. 4).

<2> Structure

Figure 16:
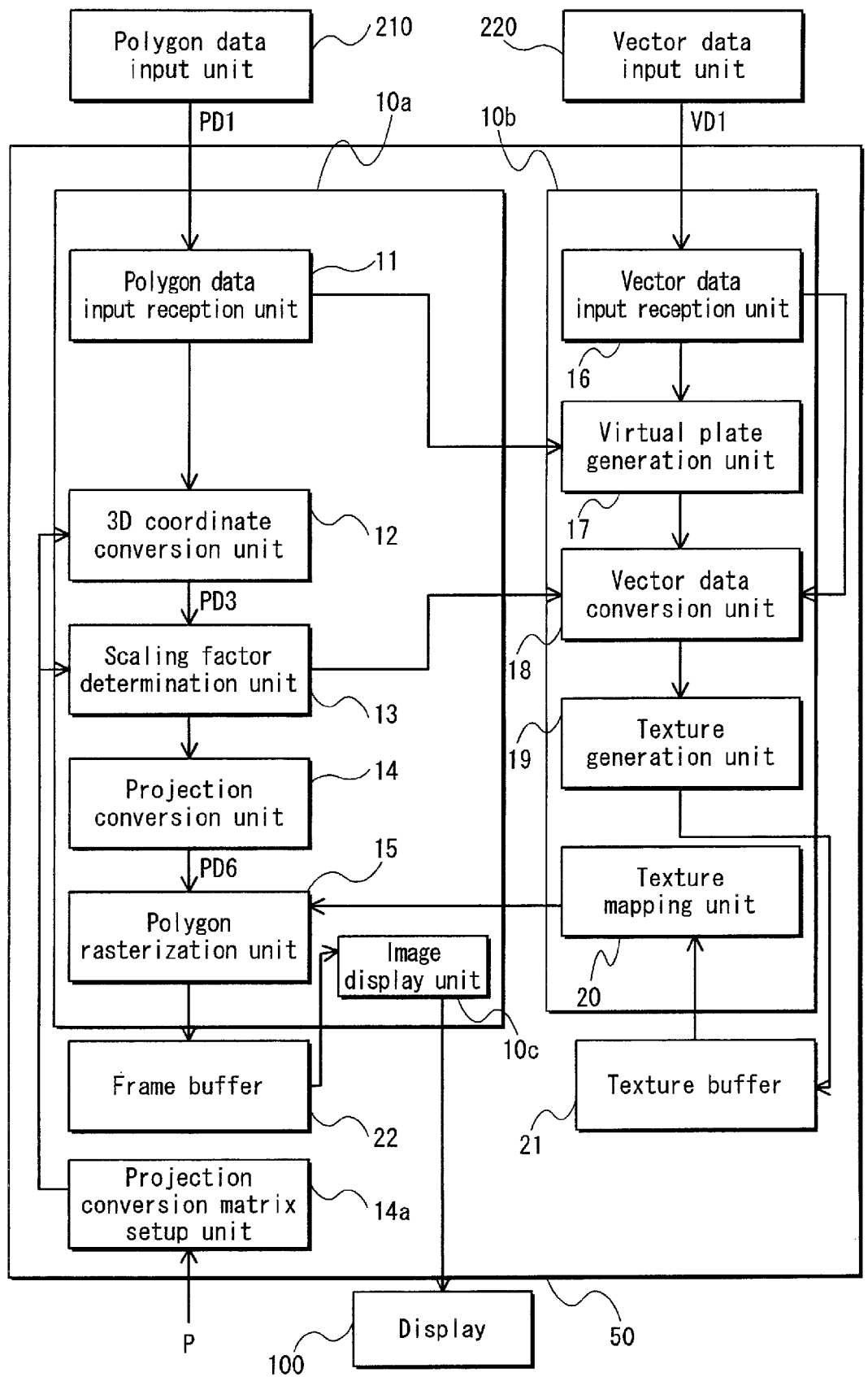
FIG. 16 shows the structure of a graphics rendering apparatus relating to an Embodiment 2.

A graphics rendering apparatus 10 relating to the present embodiment includes, as shown in FIG. 16, a 3D image processing apparatus 10a for processing polygon data PD1 input by a polygon data input unit 210, a 2D image processing apparatus 10b for processing vector data VD1 (first vector data) input by a vector data input unit 220, a frame buffer 22, a texture buffer 21, a projection conversion matrix setup unit 14a for setting up a parameter relating to a projection conversion matrix P for use by the 3D image processing apparatus 10a. Note that the projection conversion matrix setup unit 14a, the texture buffer 21, and the frame buffer 22 in the present embodiment have the same structure as those in the Embodiment 1, and accordingly descriptions thereof are omitted here.

<2-1> 3D Image Processing Apparatus

The 3D image processing apparatus 10a includes a processor (not shown) and a memory (not shown). The processor appropriately reads and executes a program, thereby realizing a polygon data input reception unit 11, a 3D coordinate conversion unit 12, a scaling coefficient determination unit 13, a projection conversion unit 14, a polygon rasterization unit 15, and an image display unit 10c for causing a display 100, which is connected to the outside, to display 3D image based on 3D image data stored in the frame buffer 22. Note that the 3D coordinate conversion unit 12, the projection conversion unit 14, the scaling coefficient determination unit 13, and the polygon rasterization unit 15 in the present embodiment have the same structure as those in the Embodiment 1, and accordingly descriptions thereof are omitted here.

The polygon data input reception unit 11 relating to the present embodiment has substantially the same structure as the polygon data input unit 11 described in the Embodiment 1, and inputs polygon data PD1 into a virtual plate generation unit 17 which is described later, in addition to the 3D coordinate conversion unit 12.

<2-2> 2D Image Processing Apparatus

A 2D image processing apparatus 10b includes a processor (not shown) and a memory (not shown). The processor appropriately reads and executes a program, thereby realizing a vector data input reception unit 16, a virtual plate generation unit 17, a vector data conversion unit 18, a texture generation unit 19, and a texture mapping unit 20. Note that the vector data input reception unit 16, the texture generation unit 19, and the texture mapping unit 20 in the present embodiment have the same structure as those in the Embodiment 1, and accordingly descriptions thereof are omitted here.

<2-2-1> Virtual Plate Generation Unit

The virtual plate generation unit 17 generates virtual plate data (see FIGS. 7A-17D) based on vector data VD1 and polygon data PD1. The virtual plate data is composed of a length Lplatex in the x direction (a length of a third side) and a length Lplatey in the y direction (a length of a fourth side) of a rectangular virtual plate Plate (FIG. 17B) and coordinate data Vplatei (i=0, 1, 2, 3) of a vertice p(Vplatei) (i=0, 1, 2, 3) of the virtual plate Plate.

Here, the virtual plate Plate includes a vector image represented by the vector data VD1.

$$\frac{Lplatex}{Lplatey} = \frac{Lx}{Ly} \quad \text{[Expression 30]}$$

The above expression is satisfied by the length Lplatex in the x direction and the length Lplatey of the length in the y direction of the virtual plate Plate and the length Lx in the x direction and the length Ly in the y direction of the polygon PG.

Also, the virtual plate generation unit 17 inputs, into the vector data conversion unit 18, the calculated coordinate data Vplatek (k=0, 1, 2, 3) of the four vertices of the rectangular virtual plate Plate and the length Lplatex in the x direction and the length Lplatey in the y direction of the virtual plate Plate.

<2-2-2> Vector Data Conversion Unit

Figure 18:
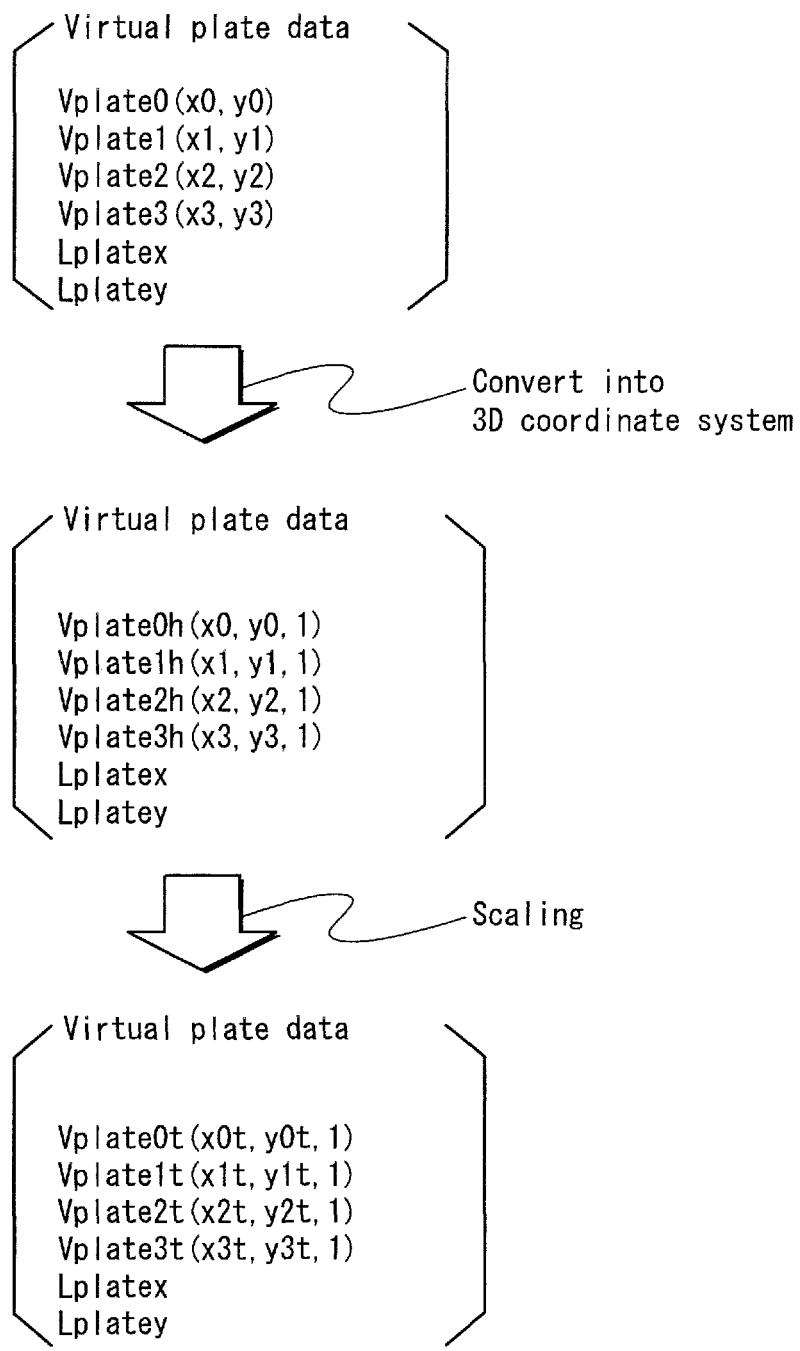
FIG. 18 is a flow chart showing operations of the graphics rendering apparatus relating to the Embodiment 2.

The vector data conversion unit 18 converts, into data represented by the three dimension coordinate system, the vertice data Vi (i=0, 1, . . . , 44) and the control point data Si (i=0, 1, . . . , 42) constituting the vector data VD1 and the coordinate data Vplatek (k=0, 1, 2, 3) of the vertices of the virtual plate Plate. As a result of the conversion, vector data VD2 (see FIG. 4), which is composed of vertice data Vih (i=0, 1, . . . , 44) and control point data Sih (i=0, 1, . . . , 42), and coordinate data Vplatekh (k=0, 1, 2, 3) (see FIG. 18) are generated.

Also, the vector data conversion unit 18 calculates a first scaling ratio (first scaling value) scalex and a second scaling ratio (second scaling value) scaley based on Expressions (31) and (32), using the length Lplatex in the x direction and the length Lplatey in the y direction of the virtual plate Plate, and the first scaling coefficient scx and the second scaling coefficient scy input by the scaling coefficient determination unit 13.

$$scalex = scx/Lplatex \quad \text{[Expression 31]}$$

$$scaley = scy/Lplatey \quad \text{[Expression 32]}$$

Then, the vector data conversion unit 18 generates a scaling matrix S represented by an Expression (33) using the calculated scaling values scalex and scaley.

$$S = \begin{bmatrix} scalex & 0 & 0 \\ 0 & scaley & 0 \\ 0 & 0 & 1 \end{bmatrix} \quad \text{[Expression 33]}$$

$$= \begin{bmatrix} scx/Lplatex & 0 & 0 \\ 0 & scy/Lplatey & 0 \\ 0 & 0 & 1 \end{bmatrix}$$

The vector data conversion unit 18 performs operations (scaling) with respect to vertice data Vih (i=0, 1, . . . , 44) and control point data Sih (i=0, 1, . . . , 42) constituting the vector data VD2 and the coordinate data Vplatekh (k=0, 1, 2, 3) of the four vertices of the virtual plate Plate, based on the Expressions (34), (35), and (36), respectively. As a result, vector data VD3 (second vector data), which is composed of vertice data Vit (i=0, 1, . . . , 44) and control point data Sit (i=0, 1, . . . , 42), and coordinate data Vplatekt are generated (see FIG. 4 and FIG. 18).

$$Vit = S * Vih \quad \text{[Expression 34]}$$

$$Sit = S * Sih \quad \text{[Expression 35]}$$

$$Vplatekt = S * Vplatekh \quad \text{[Expression 36]}$$

Here, the sign "*" represents multiplication of a matrix and a vector.

<3> Operations

The following describes operations of the graphics rendering apparatus relating to the present embodiment. Note that the operations of the 3D image processing apparatus 10*a* are the same as those relating to the Embodiment 1, and accordingly description thereof is omitted here.

<3-1> Operations of 2D Image Processing Apparatus

Figure 19:
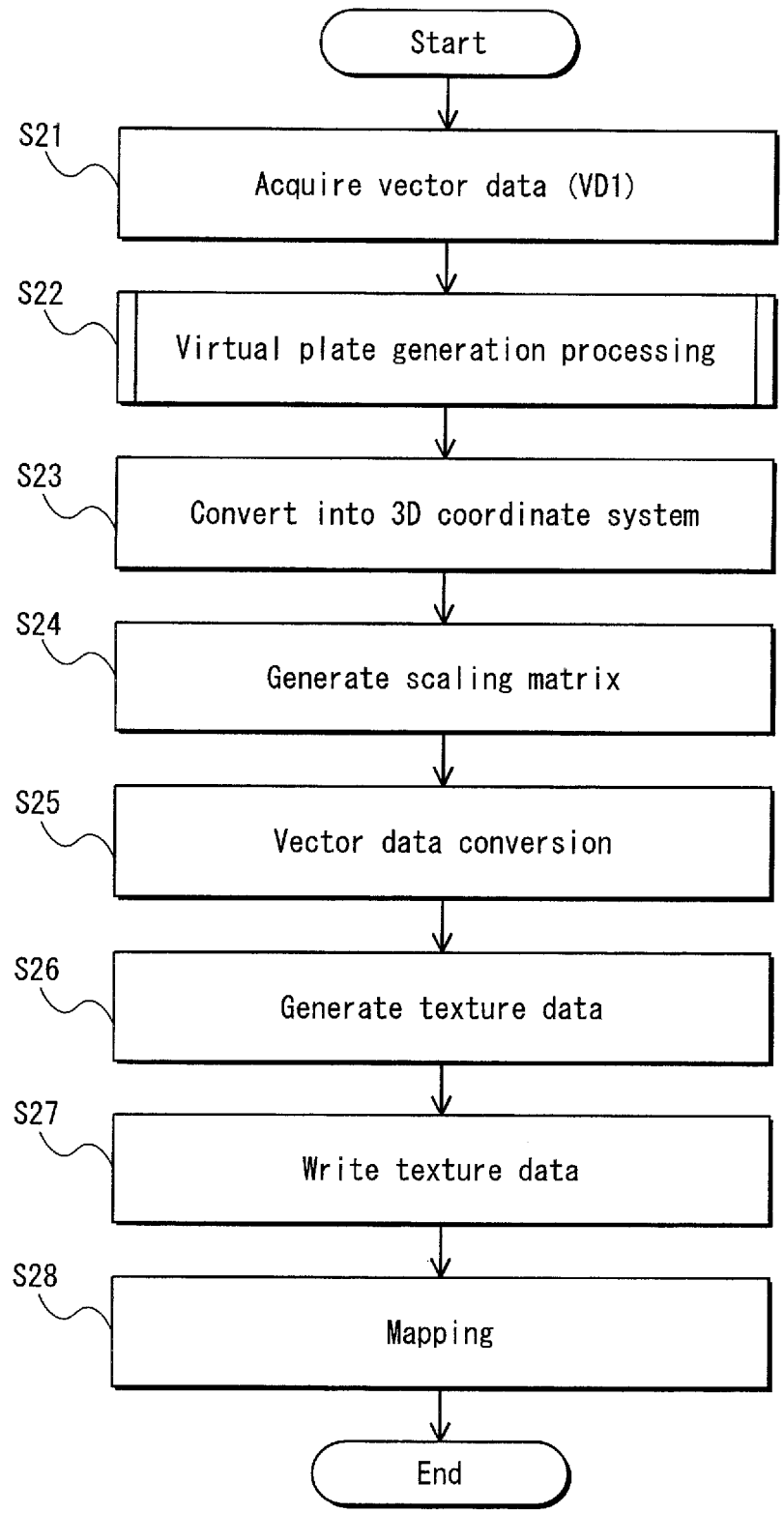
FIG. 19 is a flow chart showing virtual plate generation processing relating to the Embodiment 2.

FIG. 19 is a flow chart showing operation of the 2D image processing apparatus relating to the present embodiment.

Firstly, when the vector data input reception unit 16 acquires vector data VD1 (Step S21), the virtual plate generation unit 17 performs virtual plate generation processing, which is described later, using the vector data VD1 and polygon data PD1 input by the polygon data input reception unit 11 (Step S22). Then, the virtual plate generation unit 17 inputs, into the vector data conversion unit 18, the calculated coordinate data Vplatek (k=0, 1, 2, 3) of the vertices of the virtual plate Plate and the length Lplatex in the x direction and the length Lplatey in the y direction of the virtual plate Plate.

Then, the vector data conversion unit 18 generates vector data VD2 represented by the 3D coordinate system and coordinate data Vplatekh (k=0, 1, 2, 3) using the vector data VD1 and the coordinate data Vplatek (k=0, 1, 2, 3) of the vertices of the virtual plate Plate (Step S23).

Then, based on the Expressions (31) and (32), the vector data conversion unit 18 calculates the first scaling value scalex and the second scaling value scaley, using the length Lplatex in the x direction and the length Lplatey in the y direction of the virtual plate Plate and the first scaling coefficient scx and the second scaling coefficient scy. Then, the vector data conversion unit 18 generates a scaling matrix S represented by the Expression (33) (Step S24).

Then, the vector data conversion unit 18 performs operations on the vector data VD2 and the coordinate data Vplateih (i=0, 1, 2, 3) of the vertices of the virtual plate Plate based on the Expressions (24) to (26). The calculations result in generation of vector data VD3, which is composed of vertice data Vit (i=0, 1, . . . , 44) and control point data Sit (i=0, 1, . . . , 42), and coordinate data Vplatekt (k=0, 1, 2, 3) (Step S25). The vector data conversion unit 18 inputs the generated vector data VD3 and coordinate Vplatekt into the texture generation unit 19 (k=0, 1, 2, 3).

Then, the texture generation unit 19 performs rasterization processing using the vector data VD3 and the coordinate data Vplatekt (k=0, 1, 2, 3) representing the vertices of the virtual plate Plate to generate texture data TD (Step S26), and then writes the generated texture data into the texture buffer 21 (Step S27).

Next, the texture mapping unit 20 determines (maps) a color value of each pixel constituting a raster image of the polygon PG, based on texture data stored in the texture buffer 21 (Step S28).

<3-2-1> Virtual Plate Generation Processing

Figure 20:
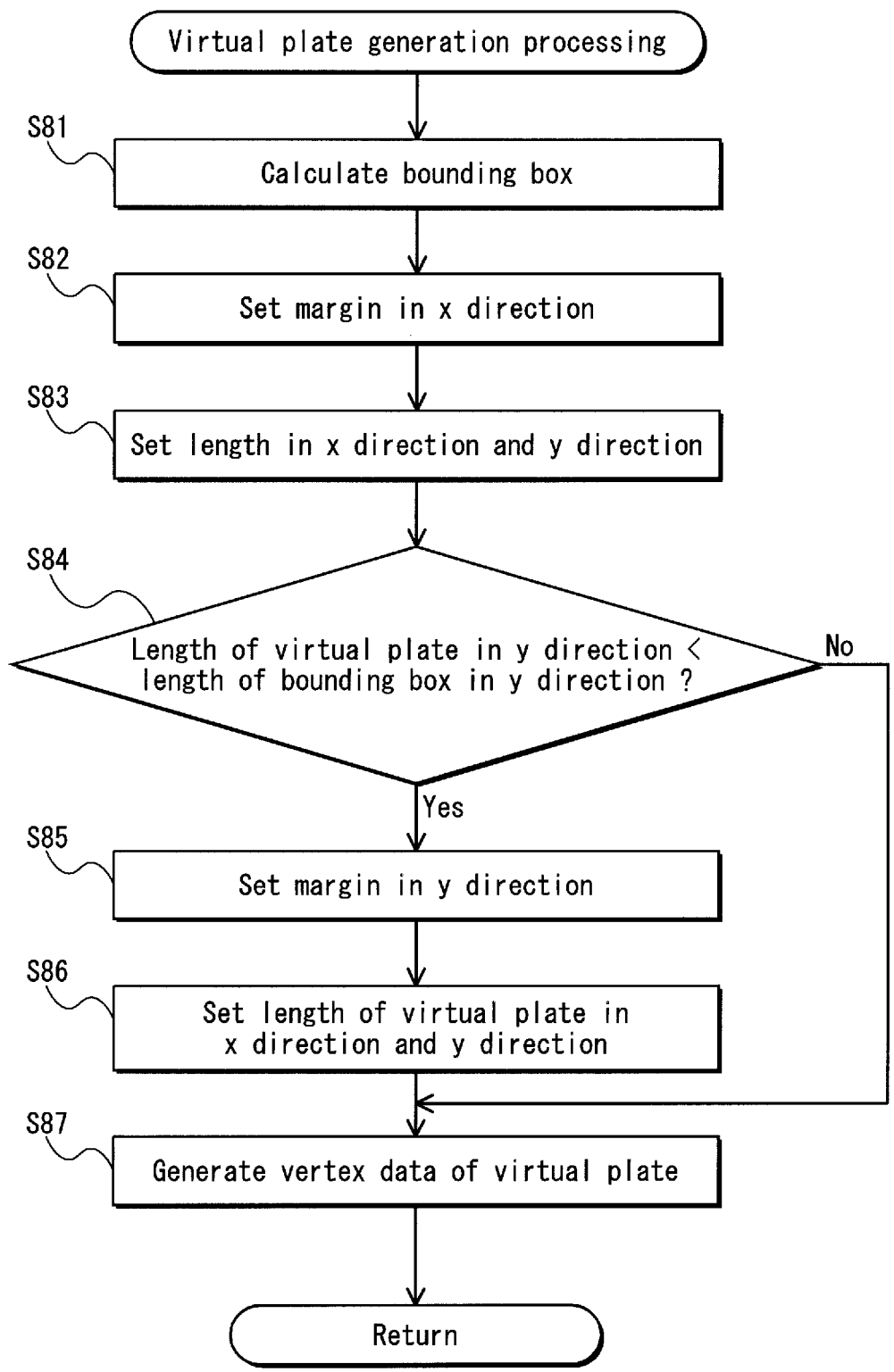
FIG. 20 shows the virtual plate generation processing relating to the Embodiment 2.

FIG. 20 is a flow chart showing operations of scaling coefficient calculation processing.

Firstly, the virtual plate generation unit 17 performs bounding box calculation processing to calculate a bounding box, which includes an aggregate of pieces of vertice data input by the vector data input reception unit 16 (Step S81).

In the bounding box calculation processing, the virtual plate generation unit 17 performs the following processing based on the method which is described in the item <4-3> in the Embodiment 1 with reference to FIG. 15. As a result, variables xmin, xmax, ymin, and ymax are obtained.

Firstly, the virtual plate generation unit 17 stores a value V0tx, which represents an x component of the vertice data V0t constituting the vector data VD1 after conversion, in variables xmin and xmax defined on the memory (calculation buffer), and stores a value V0ty, which represents a y component of the vertice data V0t, in variables ymin and ymax. As a result, the vertice data V0t is initialized (Step S3341 in FIG. 15).

Then, the virtual plate generation unit 17 stores a value "1" in a variable "i" defined on the calculation buffer, and then repeatedly performs the following processing until a value "44" is stored in the variable "i" (Steps S3342 to S3351 in FIG. 15).

Firstly, the virtual plate generation unit 17 compares the variable xmin with a value Vitx (Step S3343 in FIG. 15). When the variable xmin is greater than the value Vitx, the virtual plate generation unit 17 stores the value Vitx in the variable xmin (Step S3344 in FIG. 15).

Then, the virtual plate generation unit 17 compares the variable xmax with the value Vitx (Step S3345 in FIG. 15). When the variable xmax is smaller than the value Vitx, the virtual plate generation unit 17 stores the value Vitx in the variable xmax (Step S3346 in FIG. 15).

Next, the virtual plate generation unit 17 compares the variable ymin with the value Vity (Step S3347 in FIG. 15). When the variable ymin is greater than the value Vity, the virtual plate generation unit 17 stores the value Vity in the variable ymin (Step S3348 in FIG. 15).

Next, the virtual plate generation unit 17 compares the variable ymax with the value Vity (Step S3349 in FIG. 15). When the variable ymax is smaller than the value Vity, the virtual plate generation unit 17 stores the value Vity in the variable ymax (Step S3350 in FIG. 15).

Then, the virtual plate generation unit 17 increments the variable "i" by 1 (Step S3351 in FIG. 15).

Figure 17A:
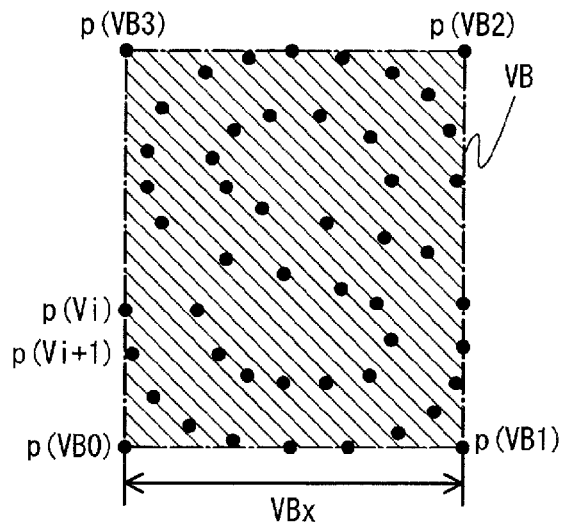
FIGS. 17A, 17B, 17C, and 17D explain virtual plate data relating to the Embodiment 2.

After repeatedly performing the above processing, the virtual plate generation unit 17 determines, as shown in FIG. 17A, as a bounding box VB, a rectangular area (hatched part in FIG. 17A) specified by four vertices p(VB0) (xmin,ymin), p(VB1) (xmax,ymin), p(VB2) (xmax,ymax), and p(VB3) (xmin,ymax), using the variables xmin, ymin, xmax, and ymax, which are eventually stored.

Next, the virtual plate generation unit 17 sets a margin mx in the x direction of the virtual plate Plate with respect to the bounding box VB to δ*VBx (Step S82). The value "VBx" represents the length in the x direction of the bounding box VB, the value "δ" represents a constant that falls within a range of 0 to 1 inclusive.

Then, the virtual plate generation unit 17 calculates the length Lplatex in the x direction and the length Lplatey in the y direction of the rectangular virtual plate Plate, using the length VBx in the x direction, the length VBy in the y direction, and the margin mx in the x direction of the bounding box VB, and the polygon data PD1 (Step S83).

Here, firstly, the virtual plate generation unit 17 calculates the length Lx in the x direction and the length Ly in the y direction of the polygon PG, using the polygon data PD1. Here, the polygon data PD1 is rearranged by the polygon data input reception unit 11. Accordingly, the virtual plate generation unit 17 calculates, as the length Lx in the x direction of the polygon, a distance between a point p(P0) and a point p(P1) (or a distance between point p(P2) and a point p(P3)). Also, the virtual plate generation unit 17 calculates, as the length Ly in the y direction of the polygon, a distance between the point p(P1) and the point p(P2) (or a distance between the point p(P0) and the point p(P3)). In other words, the virtual plate generation unit 17 calculates the length Lx in the x direction and the length Ly in the y direction of the polygon based on Expressions (37) and (38), respectively.

$$Lx=|X0-X1| \qquad \text{[Expression 37]}$$

$$Ly=|Y1-Y2| \qquad \text{[Expression 38]}$$

Figure 17B:
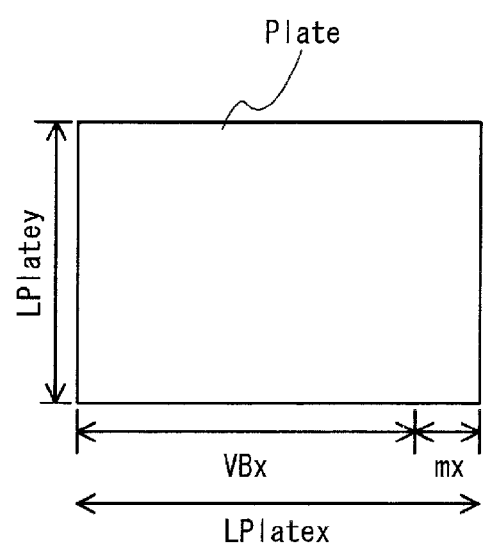
Figure 17C:
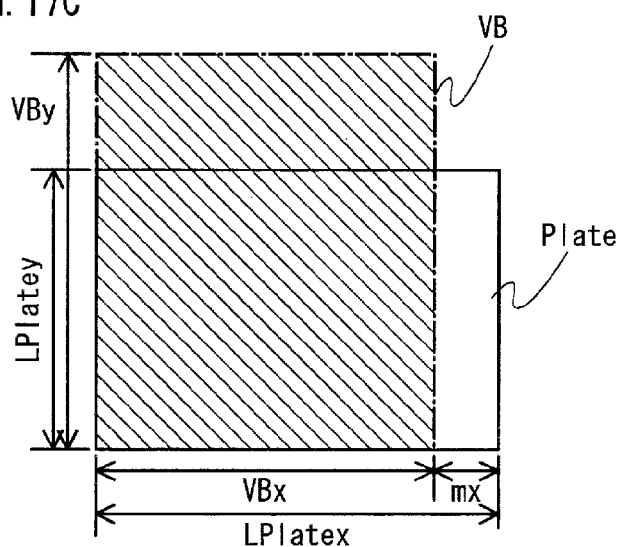

Then, the virtual plate generation unit 17 determines the length Lplatex in the x direction and the length Lplatey in the y direction of the virtual plate Plate such that Expressions (39) and (40) are satisfied, respectively, as shown in FIG. 17B.

$$Lplatex=VBx+mx=VBx(1+\delta) \qquad \text{[Expression 39]}$$

$$Lplatey=Lplatex*Ly/Lx=VBx(1+\delta)*Ly/Lx \qquad \text{[Expression 40]}$$

The virtual plate generation unit 17 judges whether the length VBy (=ymax−ymin) in the y direction of the bounding box VB is longer than the length Lplatey in the y direction of the virtual plate Plate (Step S84). Here, the judgment is performed by judging whether the virtual plate Plate is large enough to include the vector graphics represented by the vector data VD1.

When judging that the length VBy (=ymax−ymin) in the y direction of the bounding box VB is shorter than the length Lplatey in the y direction of the virtual plate Plate (Step S84: No), the virtual plate generation unit 17 generates pieces of vertice data of Vplate0 (xmin−mx/2,ymin−my/2), Vplate1 (xmax+mx/2,ymin−my/2), Vplate2 (xmax+mx/2,ymax+my/2), and Vplate3 (xmin−mx/2,ymax+my/2), which correspond to four vertices p(Vplatei) (i=0, 1, 2, 3) of the virtual plate Plate, respectively (Step S87).

On the contrary, when judging that the length VBy (=ymax−ymin) in the y direction of the bounding box VB is equal to or longer than the length Lplatey in the y direction of the virtual plate Plate (Step S84: Yes), the virtual plate generation unit 17 sets a margin my in the y direction of the virtual plate Plate to the bounding box VB to ρ*VBy (Step S85). The value VBy represents the length of the bounding box VB in the y direction, and the value ρ represents a constant that falls within a range of 0 to 1 inclusive.

Figure 17D:
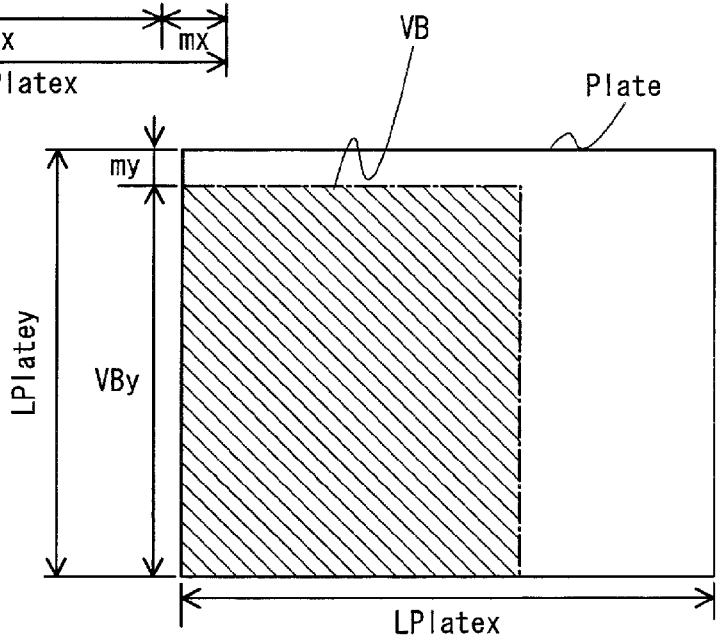

Then, the virtual plate generation unit 17 sets the length Lplatex in the x direction and the length Lplatey in the y direction of the virtual plate Plate such that Expressions (41) and (42) are satisfied, as shown in FIG. 17D (Step S86).

$$Lplatex=Lplatey*Lx/Ly=VBy(1+\rho)*Lx/Ly \qquad \text{[Expression 41]}$$

$$Lplatey=VBy+mx=VBy(1+\rho) \qquad \text{[Expression 42]}$$

Lastly, the virtual plate generation unit 17 generates four pieces of vertice data Vplate0 (xmin−mx/2,ymin−my/2), Vplate1 (xmax+mx/2,ymin−my/2), Vplate2 (xmax+mx/2,ymax+my/2), and Vplate3 (xmin−mx/2,ymax+my/2) corresponding to the four vertices p(Vplatei), respectively (Step S87).

Embodiment 3

<1> Data

<1-1> Polygon Data

The polygon data PD1 relating to the present embodiment is composed of 11 pieces of coordinate data Pi (i=0, 1, . . . , 10)

Figure 21A:
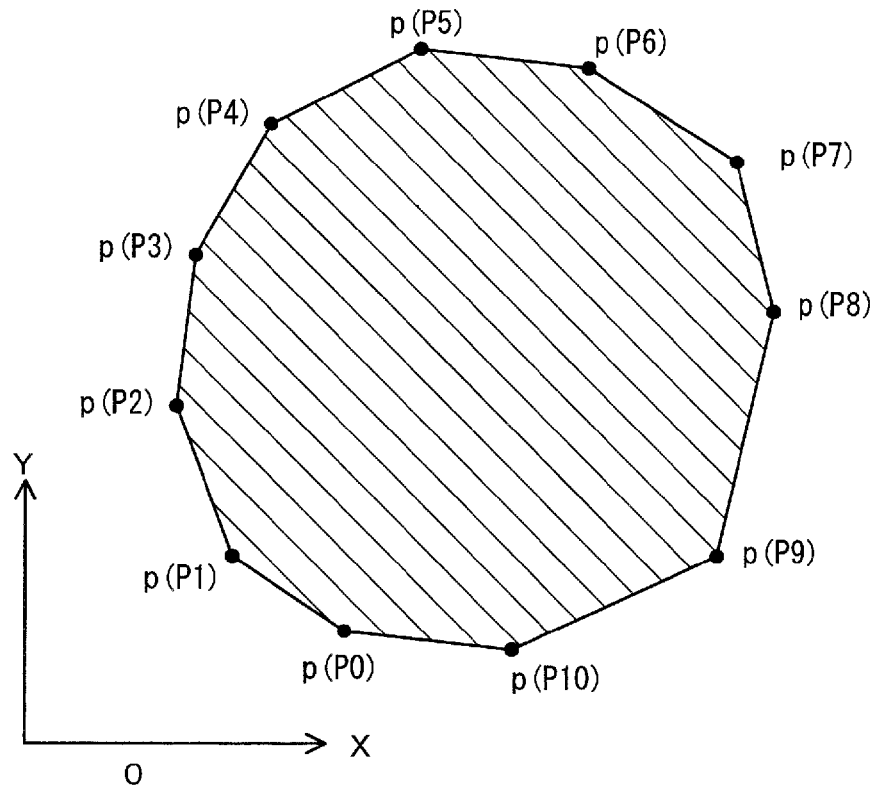
FIGS. 21A and 21B show polygon data relating to an Embodiment 3.

(see FIG. 22) representing a polygon having 11 vertices p(Pi) (i=0, 1, . . . , 10), as shown in FIG. 21A.

<1-2> Vector Data

Vector data VD1 (first vector data) defines a shape of a character rendered on a two-dimensional surface as shown in FIG. 3A, in the same way as in the Embodiment 1. As shown in FIG. 3B, the vector data VD1 is composed of a plurality of pieces (45 in the example in FIG. 3B) of coordinate data Vi (xi,yi) (i=0, 1, . . . , 44) of a vertice p(Vi) (hereinafter, "vertice data") on a contour of a character and a plurality of pieces of coordinate data Si(xi,yi) (i=0, 1, . . . , 42) of a control point p(Si) (hereinafter, "control point data") defining a curved line drawn between adjacent vertices p(Vi) and p(Vi+1) along the contour (see FIG. 4).

<2> Structure

Figure 23:
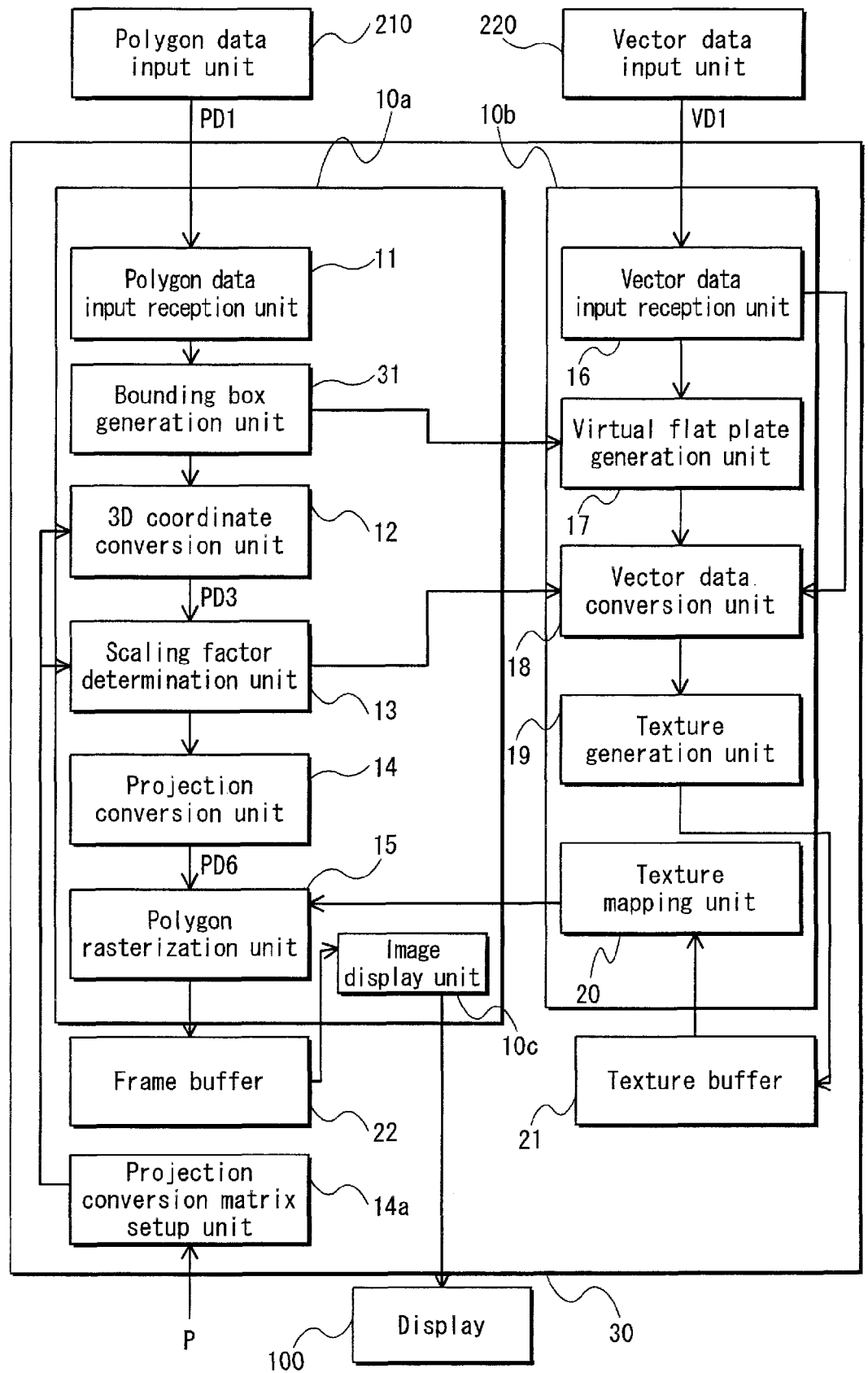
FIG. 23 shows the structure of a graphics rendering apparatus relating to the Embodiment 3.

A graphics rendering apparatus 30 relating to the present embodiment has substantially the same structure as in the Embodiment 2, as shown in FIG. 23, and differs from that in the Embodiment 2 in structure of a 3D image processing apparatus 10a for processing polygon data PD1 input by the polygon data input unit 210. Note that the compositional elements of the graphics rendering apparatus 30 that are the same those in the Embodiment 2 have the same referential numerals and descriptions thereof are omitted.

<2-1> 3D Image Processing Apparatus

The 3D image processing apparatus 10a has substantially the same structure as that in the Embodiment 2. A processor (not shown) appropriately reads a program into a memory (not shown) and executes the read program, thereby realizing a bounding box generation unit 31, a 3D coordinate conversion unit 12, a scaling coefficient determination unit 13, a projection conversion unit 14, and so on of the 3D image processing apparatus 10a. With respect to the structure of the 3D image processing apparatus 10a that is the same as that in the Embodiment 2, description is appropriately omitted.

<2-1-1> Bounding Box Generation Unit

Figure 21B:
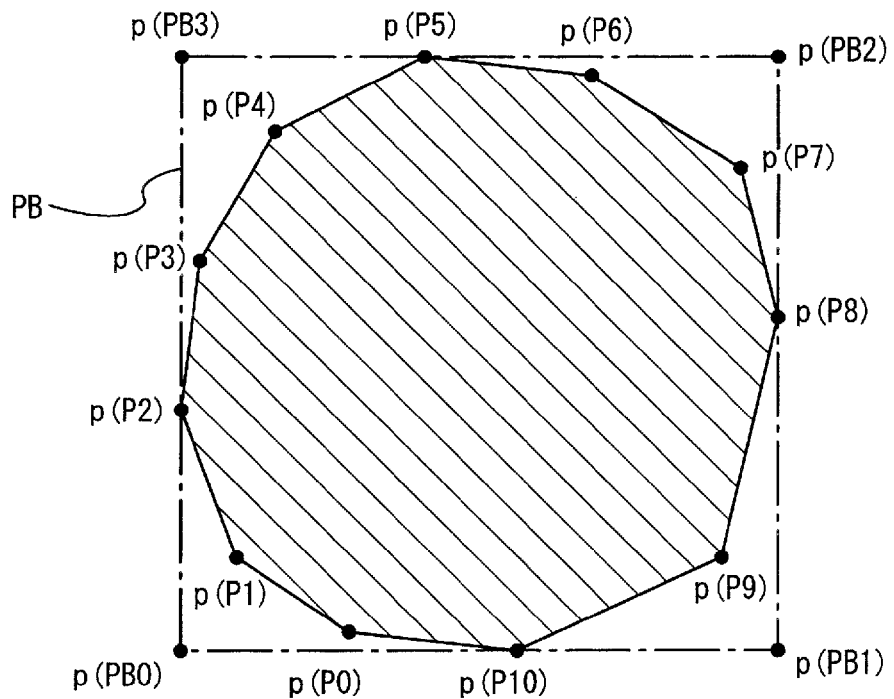

The bounding box generation unit 31 generates bounding box data PBi (i=0, 1, 2, 3) (see FIG. 22) representing vertices p(PBi) of a rectangular bounding box PB including a polygon having 11 vertices represented by polygon data PD1, as shown in FIG. 21B.

<2-1-2> 3D Image Conversion Unit

Figure 22:
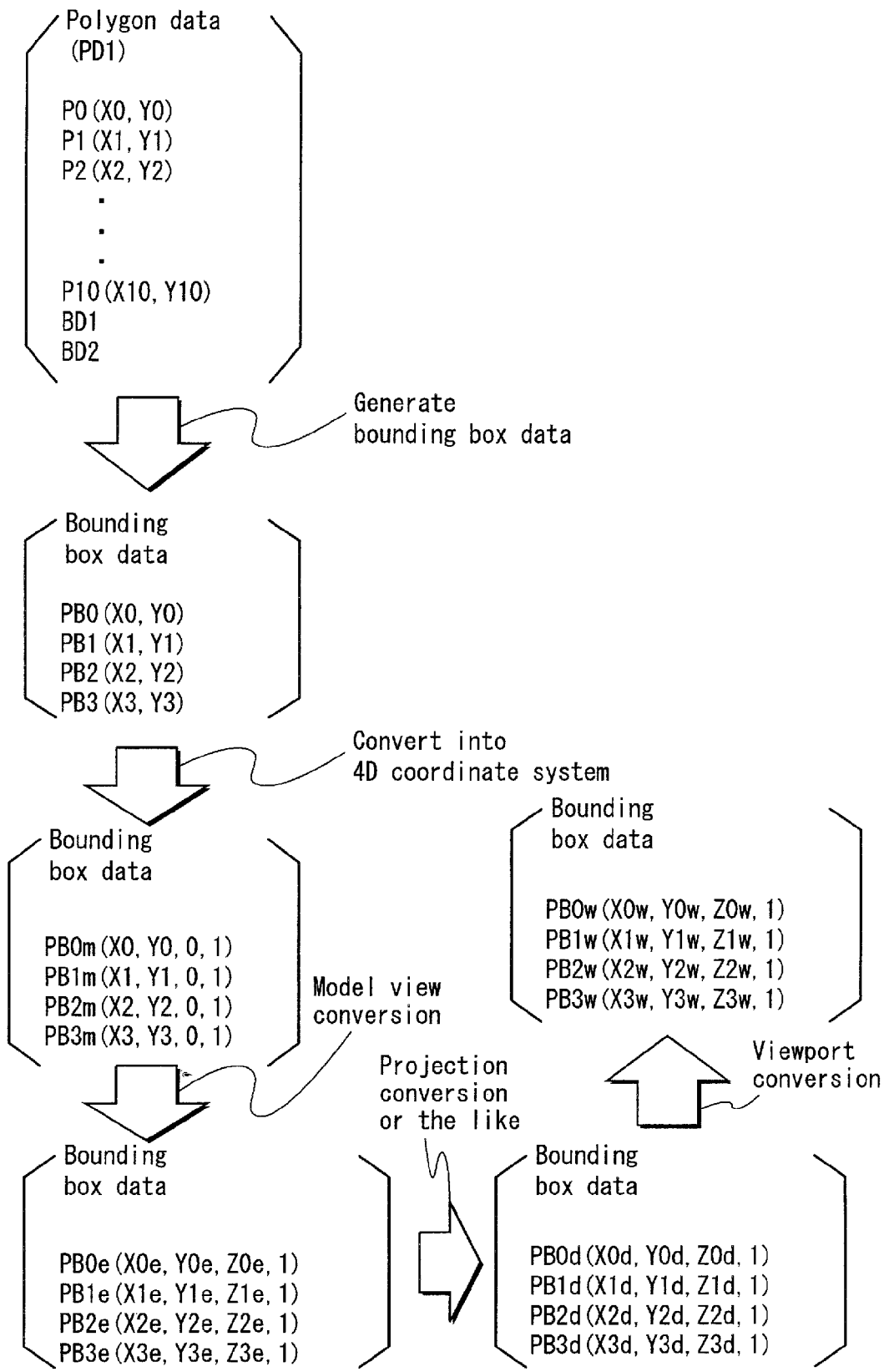
FIG. 22 shows bounding box data relating to the Embodiment 3.

The 3D coordinate conversion unit 12 converts the bounding box data PBi into data represented by a 4D coordinate system as well as the polygon data PD1 to generate bounding box data PBim (i=0, 1, 2, 3), and performs model view conversion on the bounding box data PBim to generate bounding box data PBie (i=0, 1, 2, 3) (see FIG. 22). Also, the 3D coordinate conversion unit 12 inputs the bounding box data PBie into the scaling coefficient determination unit 13.

<2-1-3> Scaling Coefficient Determination Unit

The scaling coefficient determination unit 13 determines a scaling coefficient in the same method as in the Embodiment 1, using third bounding box data PBie input by the 3D coordinate conversion unit 12. Also, the scaling coefficient determination unit 13 inputs the first scaling coefficient scx and the second scaling coefficient scy into the vector data conversion unit 18.

<2-1-4> Projection Conversion Unit

The projection conversion unit 14 performs coordinate conversion on the bounding box data PBie as well as the polygon data PD3 to calculate coordinate data of a vertice p(PBiw) (i=0, 1, 2, 3) on the screen coordinate system, and inputs the calculated coordinate data into the polygon rasterization unit 15.

<2-2> 2D Image Processing Apparatus

The 2D image processing apparatus 10b has substantially the same structure as in the Embodiment 2. A processor (not shown) appropriately reads a program into a memory (not shown) and executes the read program, thereby realizing a virtual plate generation unit 17, a texture mapping unit 20, and so on of the 2D image processing apparatus 10b. With respect to the structure of the 2D image processing apparatus 10b that is the same as that in the Embodiment 2, description is appropriately omitted.

<2-2-1> Virtual Plate Generation Unit

The virtual plate generation unit 17 generates a virtual plate in the same procedure as in the Embodiment 2, using the bounding box data PBi. Also, the virtual plate generation unit 17 inputs the virtual plate data into the 2D coordinate conversion unit 18.

<2-2-2> Texture Mapping Unit

Figure 24:
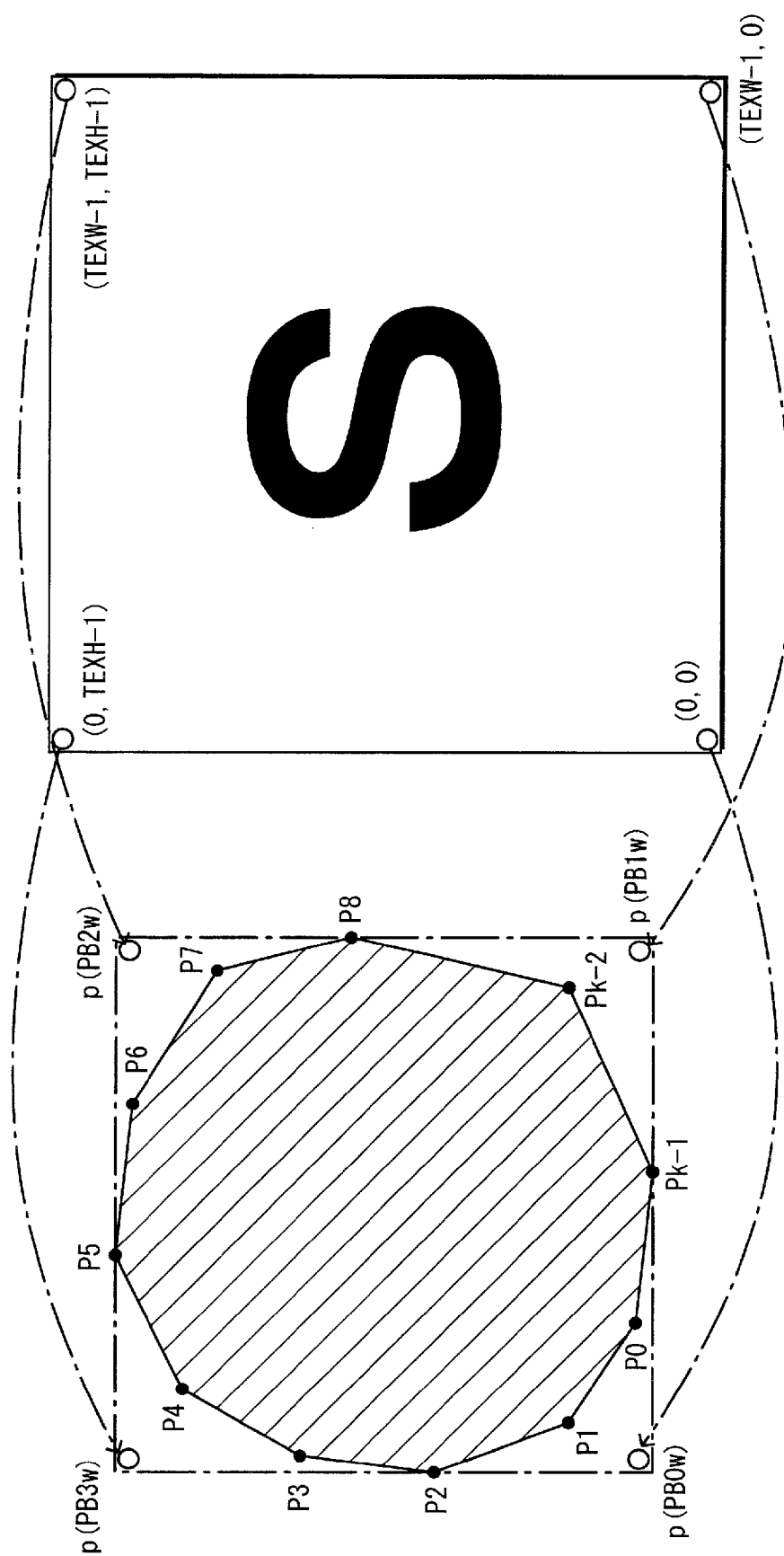
FIG. 24 shows mapping of a texture relating to the Embodiment 3.

The texture mapping unit 20 determines a color value of each pixel of the polygon PG onto which a texture is to be attached, based on texture data stored in the texture buffer 21. For example, assume a case where, with respect to the texture represented by the texture data, a pixel on the bottom left is an original point (0,0), the number of pixels in the X direction is TEXW, and the number of pixels in the Y direction is TEXH, as shown in FIG. 24. In this case, the color value of each pixel constituting the raster image of the polygon PG is determined such that a pixel located on the coordinate (0,0), a pixel located on the coordinate (TEXW−1,0), a pixel located on the coordinate (TEXW−1,TEXH−1), and a pixel located on the coordinate (0,TEXH−1) are mapped onto the vertice p(PB0w), the vertice p(PB1w), the vertice p(PB2w), and the vertice p(PB3w) of the polygon PG, respectively.

<3> Operations

The operations of the graphics rendering apparatus 30 relating to the present embodiment are substantially the same as those in the Embodiment 2. The operations of the 3D image processing apparatus 10a relating to the present embodiment differ from those in the Embodiment 2.

<3-1> Operations of 3D Image Processing Apparatus

Figure 25:
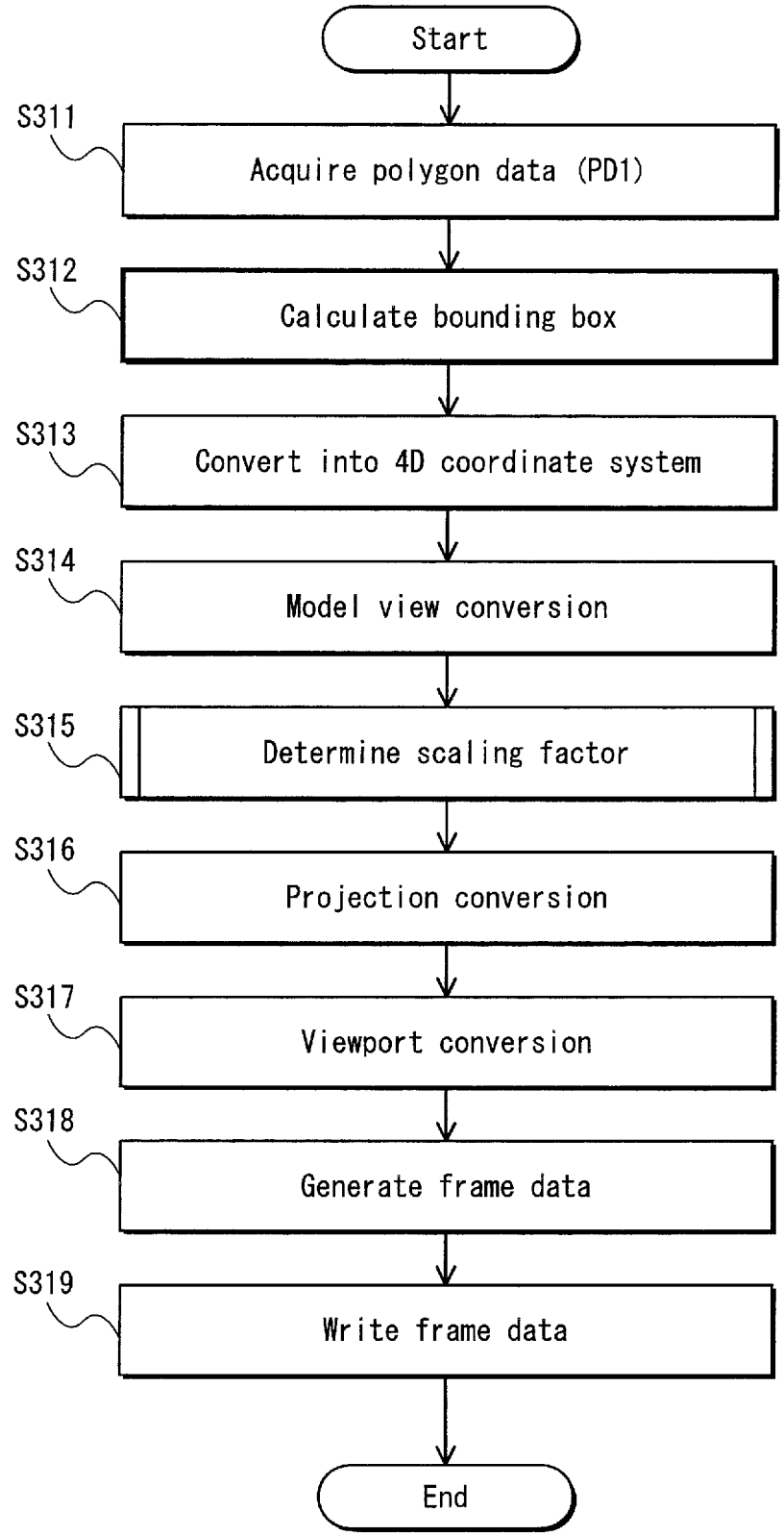
FIG. 25 is a flow chart showing operations of the graphics rendering apparatus relating to the Embodiment 3.

FIG. 25 is a flow chart showing operations of the 3D image processing apparatus relating to the present embodiment.

Firstly, when the polygon data input reception unit 11 acquires polygon data PD1 (Step S311), the bounding box generation unit 31 calculates bounding box data PBi (i=0, 1, 2, 3) representing a bounding box PB including a polygon PG represented by the polygon data PD1 (Step S312). The calculation processing of the bounding box data PBi performed by the bounding box generation unit 31 is described in detail later in the <3-2> Bounding Box Calculation.

Next, the 3D coordinate conversion unit 12 converts the bounding box data PBi into data represented by the 4D coordinate system to generate bounding box data PBim (i=0, 1, 2, 3) as shown in FIG. 22 (Step S312). Furthermore, the 3D coordinate conversion unit 12 performs model view conversion on the bounding box data PBi to generate bounding box data PBie (i=0, 1, 2, 3) (Step S313).

Then, the scaling coefficient determination unit 13 determines the first scaling coefficient scx and the second scaling coefficient scy, using the bounding box data PBie and information relating to a projection conversion matrix P input by the projection conversion matrix setup unit 14a (Step S314). Then, the scaling coefficient determination unit 13 inputs the determined scx and scy into the vector data conversion unit 18.

Then, the projection conversion unit 14 performs projection conversion or the like on the bounding box data PBie to generate bounding box data PBid (i=0, 1, 2, 3) (see FIG. 22) (Step S315). Then, the projection conversion unit 14 performs viewport conversion on the viewport bounding box data PBid to generate bounding box data PBiw (i=0, 1, 2, 3) (see FIG. 22) (Step S316), and inputs the generated bounding box data PBiw (i=0, 1, 2, 3) into the polygon rasterization unit 15.

Figure 26:
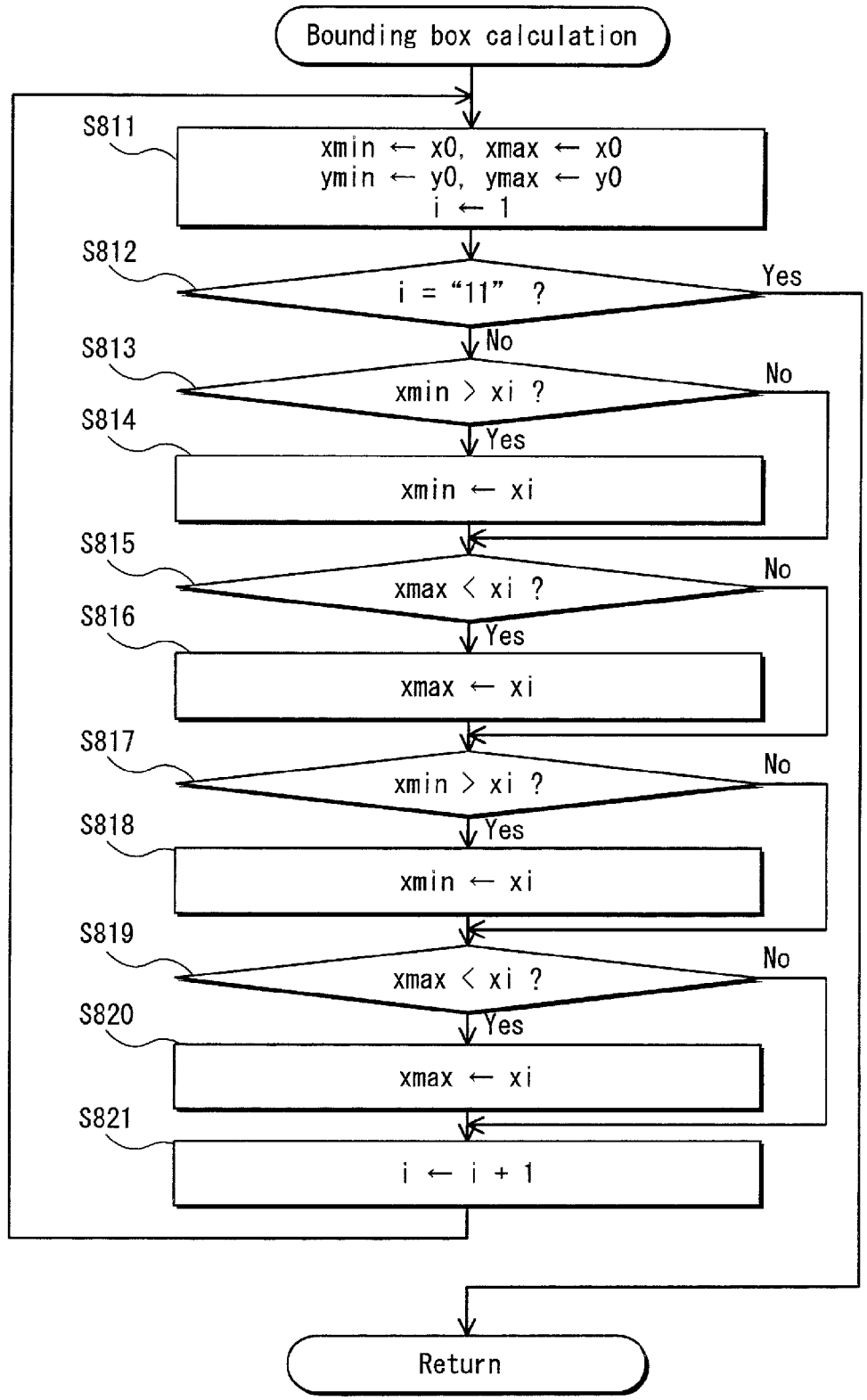
FIG. 26 is a flow chart showing bounding box calculation relating to the Embodiment 3.

Lastly, the polygon rasterization unit 15 generates frame data FD using the polygon data PD6 and texture data TD input by the texture mapping unit 20 (Step S317), and writes the generated frame data FD into the frame buffer 22 (Step S318).
<3-2> Bounding Box Calculation The following describes the operations of the bounding box calculation processing performed by the graphics rendering apparatus 30 relating to the present embodiment, with reference to the flow chart shown in FIG. 26.

Firstly, the polygon data input reception unit 11 acquires polygon data PD1 input by the user, and inputs the polygon data PD1 into the bounding box generation unit 31.

The bounding box generation unit 31 stores a value x0 on variables xmin and xmax defined on a calculation buffer, stores a value y0 on variables ymin and ymax, and stores a value "1" on a variable i to initialize the values (Step S811).

Next, the bounding box generation unit 31 judges whether a value "11" that is the total number of vertices p(Pi) is stored in the variable "i" (Step S812).

If the bounding box generation unit 31 judges that an integer "10" is stored in the variable "i" (the processing of determining four vertices of the rectangular bounding box PB completes) (Step S812: Yes), the bounding box calculation processing ends.

On the contrary, when judging that integer "10" is not stored in the variable "i" (the processing of determining four vertices of the rectangular bounding box PB does not complete) (Step S812: No), the bounding box generation unit 31 compares the variable xmin with the value xi (Step S813). When judging that the value xi is smaller than the variable xmin (Step S813: Yes), the bounding box generation unit 31 updates the variable xmin with the value xi (Step S814). On the contrary, when judging that the value xi is equal to or greater than the variable xmin (Step S813: No), the bounding box generation unit 31 does not updates the variable xmin Next, the bounding box generation unit 31 compares the variable xmax with the value xi (Step S815). When judging that the value xi is greater than the variable xmax (Step S815: Yes), the bounding box generation unit 31 updates the variable xmax with the value xi (Step S816). On the contrary, when judging that the value xi is equal to or smaller than the variable xmax (Step S815: No), the bounding box generation unit 31 does not updates the variable xmax.

Next, in Steps 817 to 820, the bounding box generation unit 31 replaces the variable xmin, the variable xmax, and the value xi with the variable ymin, the variable ymax, and the value yi, respectively, and performs processing in the same way as in Steps S813 to S816.

Then, the bounding box generation unit 31 increments the value "i" (Step S821).

After repeatedly performing the above processing, the bounding box generation unit 31 repeats the processing of Steps S812 to S821 until the variable "i" is set to the integer "10", using the variables xmin, ymin, xmax, and ymax that are eventually held therein. This results in calculation of pieces of coordinate data PB0 (xmin,ymin), PB1 (xmax,ymin), PB2 (xmax,ymax), and PB3 (xmin,ymax) of four vertices p(PBi) (i=0, 1, 2, 3) constituting the bounding box. Also, the bounding box generation unit 31 inputs the calculated coordinate data Bi (i=0, 1, 2, 3) of four vertices p(PBi) (i=0, 1, 2, 3) into the 3D coordinate conversion unit 12 and the virtual plate generation unit 17.

Next, the virtual plate generation unit 17 generates a virtual plate Plate in the same method as in the Embodiment 1, using bounding box data PBi (i=0, 1, 2, 3) instead of the vertice data Pi (i=0, 1, 2, 3) of the polygon data 23 (see <3-2-1> Virtual Plate Generation Processing in the Embodiment 1 and FIG. 20).

Embodiment 4

<1> Data

<1-1> Polygon Data

According to the present embodiment, in the same way as in the Embodiment 1, polygon data PD1 (see FIG. 2) is used, which represents a shape of a rectangular polygon PG as shown in FIG. 1.
<1-2> Vector Data Vector data VD1 (first vector data) defines a shape of a character rendered on a two-dimensional surface as shown in FIG. 3A, in the same way as in the Embodiment 1. As shown in FIG. 3B, the vector data VD1 is composed of a plurality of pieces (45 in the example in FIG. 3B) of coordinate data Vi (xi,yi) (i=0, 1, . . . , 44) of a vertice p(Vi) on a contour of a character and a plurality of pieces of coordinate data Si(xi,yi) (i=0, 1, . . . , 42) of a control point p(Si) defining a curved line drawn between adjacent vertices p(Vi) and p(Vi+1) along the contour (see FIG. 4).

<2> Structure

Figure 27:
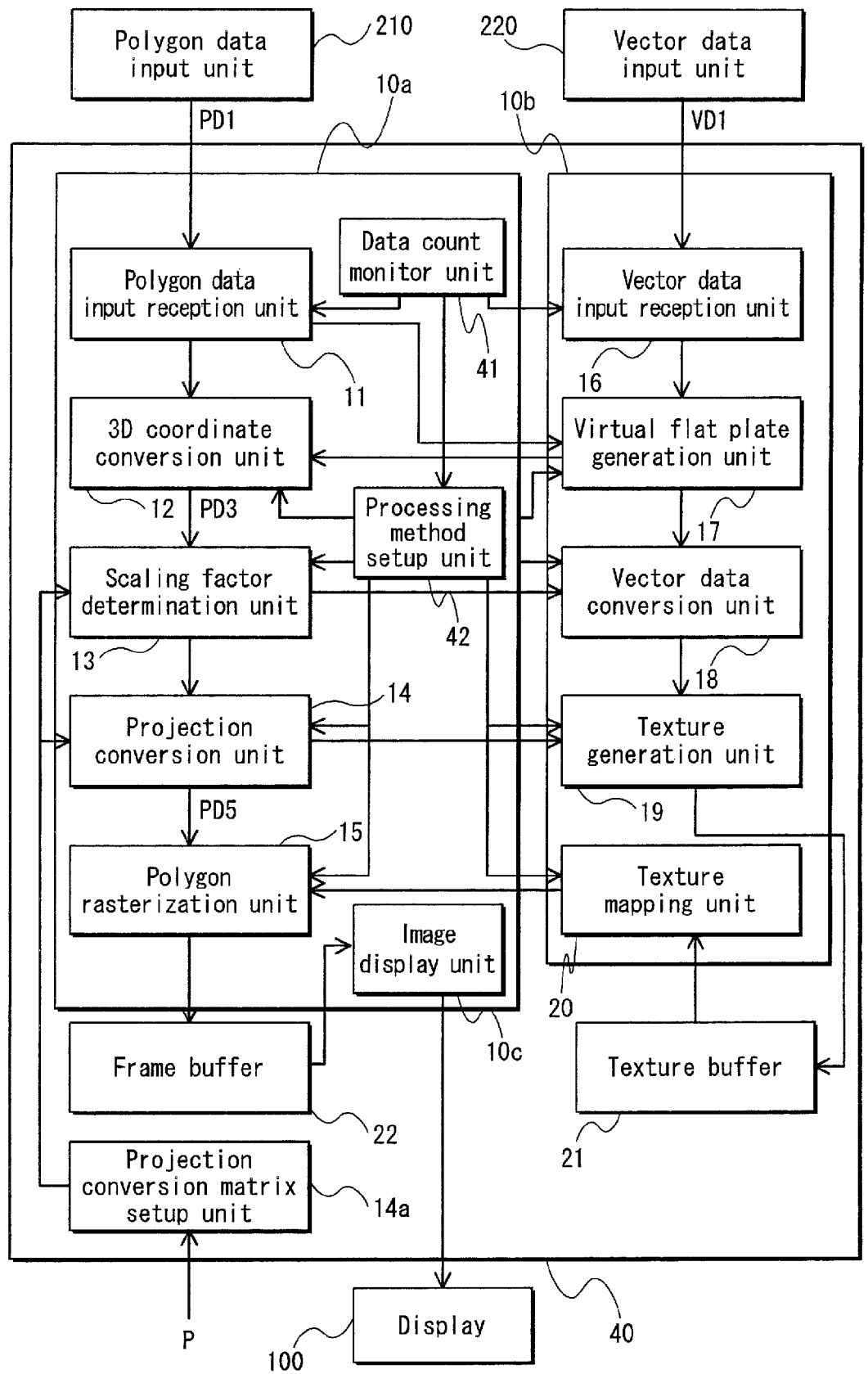
FIG. 27 shows the structure of a graphics rendering apparatus relating to an Embodiment 4.

A graphics rendering apparatus 40 relating to the present embodiment includes, as shown in FIG. 27, a 3D image processing apparatus 10a for processing polygon data PD1 input by a polygon data input unit 210, a 2D image processing apparatus 10b for processing vector data VD1 (first vector data) input by a vector data input unit 220, a frame buffer 22, a texture buffer 21, a projection conversion matrix setup unit 14a for setting up a parameter relating to a projection conversion matrix P for use by the 3D image processing apparatus 10a. Note that a projection conversion matrix setup unit 14a, a texture buffer 21, and a frame buffer 22 relating to the present embodiment have the same structure as those in the Embodiment 1, and accordingly descriptions thereof are omitted.
<2-1> 3D Image Processing Apparatus The 3D image processing apparatus 10a have substantially the same structure as that in the Embodiment 2. A processor (not shown) appropriately reads a program into a memory (not shown) and executes the read program, thereby realizing a polygon data input reception unit 11, a 3D coordinate conversion unit 12, a scaling coefficient determination unit 13, a projection conversion unit 14, a polygon rasterization unit 15, an image display unit 10c for causing a display 100, which is connected to the outside, to display 3D image based on 3D image data stored in the frame buffer 22, a data count monitor unit 41, and a processing method setup unit 42. With respect to the structure of the 3D image processing apparatus 10a that is the same as that in the Embodiment 2, description is appropriately omitted.
<2-1-1> 3D Coordinate Conversion Unit The 3D coordinate conversion unit 12 calculates a matrix T0, a scaling matrix SC, and a matrix T1. The matrix T0 is for performing translation conversion on the virtual plate Plate such that the vertice p(Vplate0m) of the virtual plate Plate coincides with the original point. The scaling matrix SC is for scaling the virtual plate Plate so as to coincide in size with the polygon PG. The matrix T1 is for performing translation conversion on the virtual plate Plate so as to be back to the original position. Note that the scaling matrix SC is represented by an Expression (43).

$$SC = \begin{bmatrix} Lx/Lplatex & 0 & 0 & 0 \\ 0 & Ly/Lplatey & 0 & 0 \\ 0 & 0 & 1 & 0 \\ 0 & 0 & 0 & 1 \end{bmatrix} \quad \text{[Expression 43]}$$

<2-1-2> Data Count Monitor Unit

The data count monitor unit 41 includes a first counter (not shown) for counting the number of pieces of data constituting the polygon data PD1 input by the polygon data input reception unit 11 and a second counter (not shown) for counting the number of data constituting the vector data VD1 (first vector data) input by the vector data input reception unit 16. Also, the data count monitor unit 41 inputs a count value CP of the first counter and a count value CV of the second counter into the processing method setup unit 42.

<2-1-3> Processing Method Setup Unit

The processing method setup unit 42 changes a processing method based on the number of pieces of data CP constituting the polygon data PD1 input by the data count monitor unit 41 and the number of pieces of data CV constituting the vector data VD1 (first vector data).

The processing method setup unit 42 reads the counter values CP and CV at predetermined intervals. Here, the processing method setup unit 42 determines to adopt which of two processing methods depending on whether an Expression (44) is satisfied by the counter values CP and CV.

$$\beta*CP<CV \quad \text{[Expression 44]}$$

Here, the value CP represents the number of pieces of data constituting the polygon data PD. The value CV represents the number of pieces of data constituting the vector data VD1 (first vector data). The value $\beta$ represents a constant that is equal to or greater than 1. The processing methods are described in detail later in <3> Operations. Also, the processing method setup unit 42 notifies the compositional elements included in the 3D image processing apparatus 10a and the 2D image processing apparatus 10b of the determined processing method.

<2-2> 2D Image Processing Apparatus

The 2D image processing apparatus 10b has substantially the same structure as that in the Embodiment 2. A processor (not shown) appropriately reads a program into a memory (not shown) and executes the read program, thereby realizing a vector data input reception unit 16, a virtual plate generation unit 17, a vector data conversion unit 18, a texture generation unit 19, and a texture mapping unit 20 of the 2D image processing apparatus 10b. With respect to the structure of the 2D image processing apparatus 10b that is the same as that in the Embodiment 2, description is appropriately omitted.

<3> Operations

<3-1> Operations of 3D Image Processing Apparatus

Figure 28:
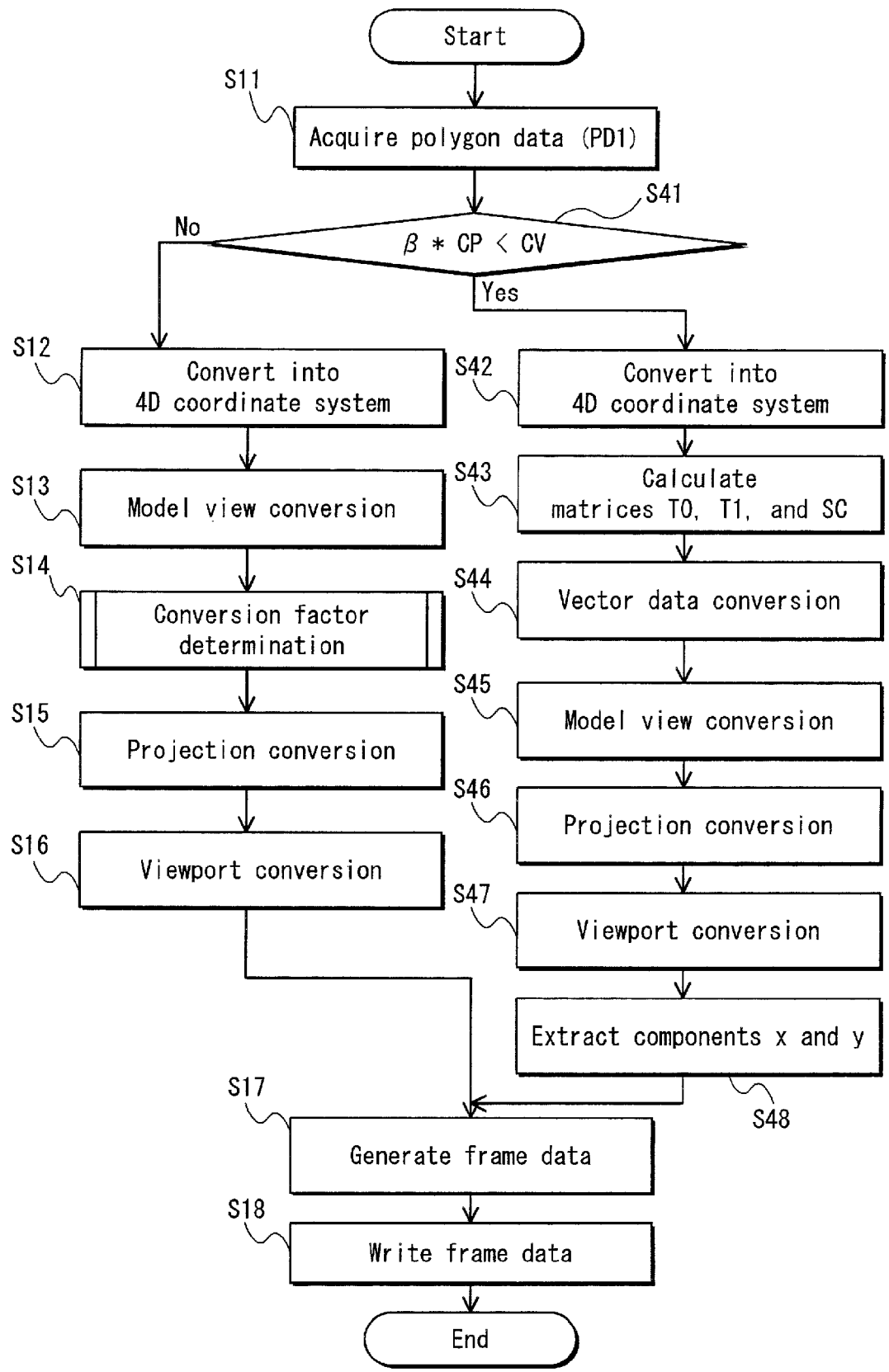
FIG. 28 is a flow chart showing operations of the graphics rendering apparatus relating to the Embodiment 4.

FIG. 28 is a flow chart showing operations of the 3D image processing apparatus relating to the present embodiment.

Firstly, the polygon data input reception unit 11 acquires polygon data PD1 input by the user via the polygon data input unit 210 (Step S11).

Next, the processing method setup unit 42 determines whether the Expression (44) is satisfied by counter values CP and CV.

When the 3D coordinate conversion unit 12 judges that the processing method setup unit 42 judges that the Expression (44) is not satisfied by the counter values CP and CV (Step S41: No), the 3D coordinate conversion unit 12 converts the polygon data PD1 into data represented by the 4D coordinate system (Step S12). The subsequent processing in Steps S13 to S18 is the same as that in the Embodiment 1, and accordingly description thereof is omitted.

On the contrary, when the processing method setup unit 42 judges that the Expression (44) is satisfied by the counter values CP and CV (Step S41: Yes), the 3D coordinate conversion unit 12 converts the polygon data PD1 into data represented by the 4D coordinate system to generate polygon data PD2.

Figure 29:
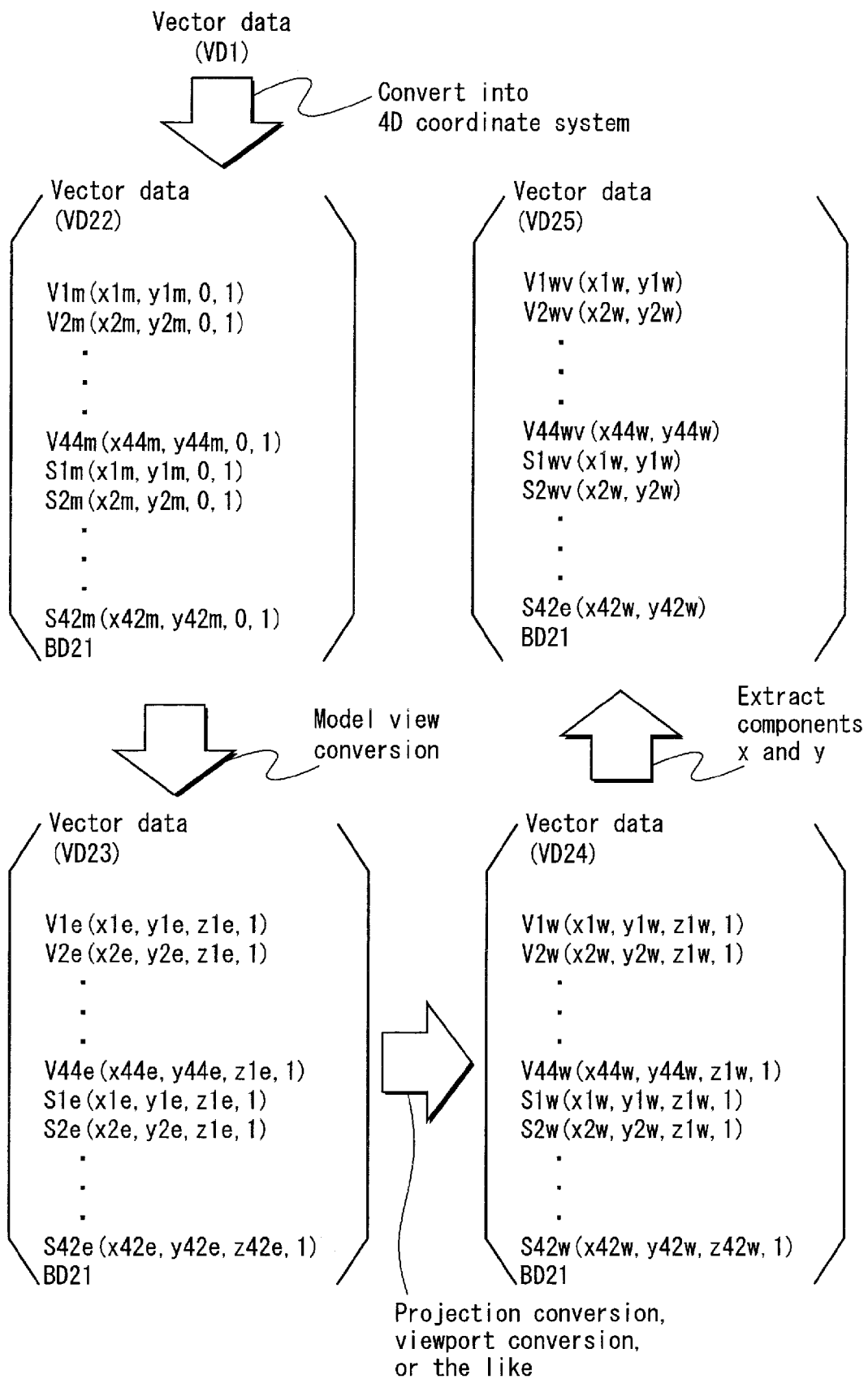
FIG. 29 shows vector data relating to the Embodiment 4.

Here, the 3D coordinate conversion unit 12 converts, into data represented by the 4D coordinate system, the vertice data Vi and the control point data Si (see FIG. 4 and FIG. 29) that constitute the vector data VD1 and the coordinate data Vplatek (k=0, 1, 2, 3) (see FIG. 30) of the vertice of the virtual plate Plate. This results in generation of vector data VD22 (see FIG. 29) composed of vertice data Vim (i=0, 1, ..., 44) and control point data Sim (i=0, 1, ..., 42), and coordinate data Vplatekm (k=0, 1, 2, 3) (see FIG. 30) (Step S42).

Next, the 3D coordinate conversion unit 12 calculates matrices T0, SC, and T1 that are to be used for performing conversion for superimposing the vertice Vplatekm (k=0, 1, 2, 3) of the virtual plate Plate on the vertice Pim (i=0, 1, 2, 3) of the polygon PG (Step S43).

Then, the 3D coordinate conversion unit 12 performs model view conversion on the polygon data PD2 and performs an operation for dividing each of the x, y, and z components by the w component (see Expression (17)), to generate polygon data PD5. The 3D coordinate conversion unit 12 performs vector data conversion by multiplying each of the coordinate data Vplatekm (k=0, 1, 2, 3) and the vector data VD2 by each of the matrices T0, SC, and T1 (Step S44), and then performs model view conversion on each of the coordinate data Vplatekm (k=0, 1, 2, 3) and the vector data VD2 (Step S45). Then, the 3D coordinate conversion unit 12 performs an operation for dividing each of the x, y, and z components by the w component (see Expression (17)), to generate vector data VD23 (see FIG. 29) composed of the vertice data Vie (i=0, 1, ..., 44) and the control point data Sie (i=0, 1, ..., 42), and coordinate data Vplateie (i=0, 1, 2, 3) (see FIG. 30) (Step S46).

Then, the projection conversion unit 14 performs viewport conversion on each of the polygon data PD5, the vector data VD3, and the virtual plate data Vplateie to generate polygon data PD6. Also, the projection conversion unit 14 generates vecor data VD24 (see FIG. 29) composed of vertice data Viw (i=0, 1, ..., 44) and control point data Siw (i=0, 1, ..., 42), and coordinate data Vplateiw (i=0, 1, 2, 3) (see FIG. 30) represented by the screen coordinate system (Step S47).

Figure 30:
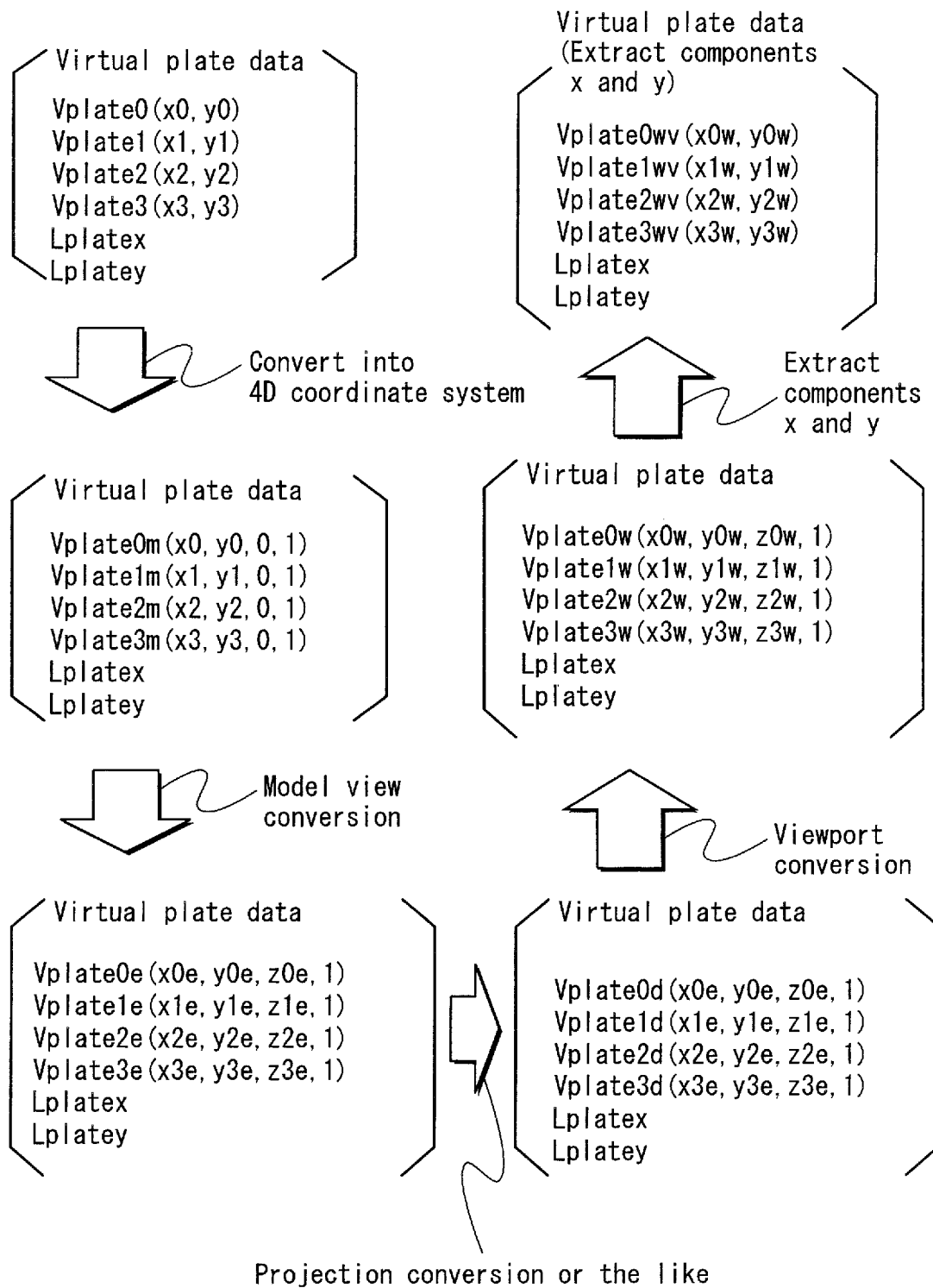
FIG. 30 shows virtual plate generation processing relating to the Embodiment 4.

Then, the projection conversion unit 14 extracts x and y components with respect to each of the vector data VD4 and the coordinate data Vplateiw (i=0, 1, 2, 3) to generate vector data VD25 (see FIG. 29) composed of vertice data Viwv (xiw,yiw) (i=0, 1, ..., 44) and Siwv (xiw,yiw) (i=0, 1, ..., 42) and coordinate data Vplateiwv (xplateiw,yplateiw) (i=0, 1, 2, 3) (see FIG. 30). Then, the projection conversion unit 14 inputs the generated vector data VD25 and coordinate data Vplateiwv into the texture generation unit 19 (Step S48).

Lastly, the polygon rasterization unit 15 generates frame data FD using the polygon data PD6 and texture data TD input by the texture mapping unit 20 (Step S17), and writes the generated frame data FD into the frame buffer 22 (Step S18).

<3-2> Operations of 2D Image Processing Apparatus

Figure 31:
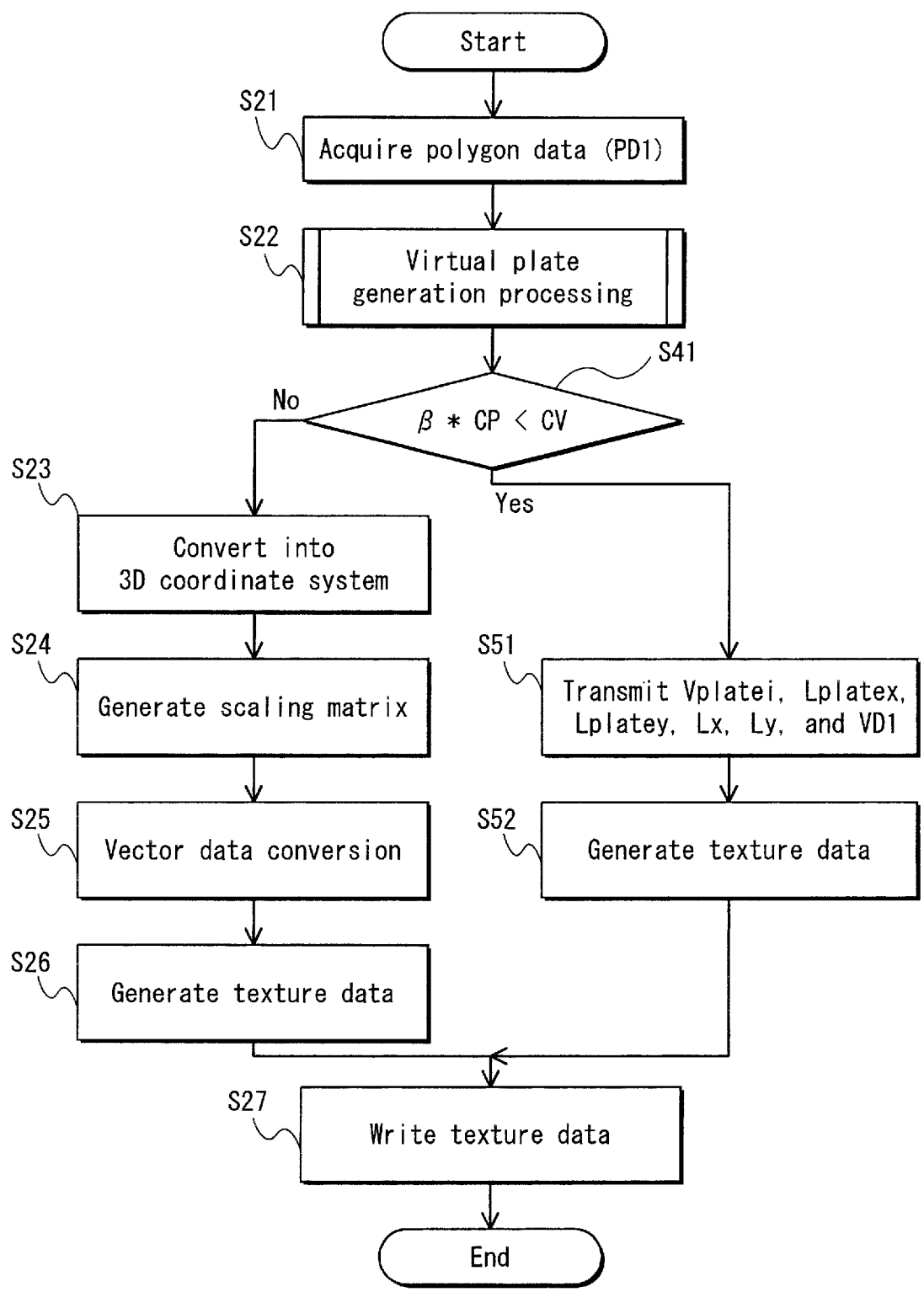
FIG. 31 is a flow chart showing operations of the graphics rendering apparatus relating to the Embodiment 4.

FIG. 31 is a flow chart showing operations of the 2D image processing apparatus relating to the present embodiment.

Firstly, the vector data input reception unit 16 acquires vector data VD1 (Step S21). Then, the virtual plate generation unit 17 performs virtual plate generation processing using the vector data VD1 and the polygon data PD1 to calculate the coordinate data Vplatek (k=0, 1, 2, 3) of the vertice of the virtual plate Plate and the length Lplatex in the x direction and the length Lplatey in the y direction of the virtual plate Plate (Step S22). The virtual plate generation processing relating to the present embodiment is the same as that in the Embodiment 1, and accordingly the description thereof is omitted.

Next, the processing method setup unit 42 determines whether the relational expression (44) is satisfied by counter values CP and CV (Step S41).

When the processing method setup unit 42 judges that the relational expression (44) is not satisfied by the counter values CP and CV (Step S41: No), the 3D coordinate conversion unit 12 converts the vector data VD1 into data represented by the 4D coordinate system (Step S23). The subsequent processing in Steps 24 to S27 is the same as that in the Embodiment 1, and accordingly description thereof is omitted.

On the contrary, when the processing method setup unit 42 judges that the relational expression (44) is satisfied by the counter values CP and CV (Step S41: Yes), the virtual plate generation unit 17 inputs, into the 3D coordinate conversion unit 12, the coordinate data Vplatei (i=0, 1, 2, 3) of the vertice of the virtual plate Plate, the length Lplatex in the x direction and the length Lplatey in the y direction of the virtual plate Plate, and the length Lx in the x direction and the length Ly in the y direction of the polygon PG (Step S51).

Then, when the coordinate data of the vertice of the virtual plate Plate Vplateiwv (xplateiwv,yplateiwv) (i=0, 1, 2, 3) and the vector data VD5 are input by the projection conversion unit 14, the virtual plate generation unit 17 generates texture data using the input data (Step S52), and writes the generated texture data into the texture buffer 21 (Step S27).

Modification Examples (1) The above Embodiments 1 to 4 have described the example where the polygon data PD1, which is represented by the 2D coordinate system, is input by the polygon data input reception unit 11. The present invention is not limited to this example. Alternatively, the polygon data PD2, which is composed of coordinate data on the 4D coordinate system, may be directly input by the polygon data input reception unit 11.

In the present modification example, the polygon data input reception unit 11 extracts only x and y components from each of piece of coordinate data constituting the polygon data PD2, and inputs the extracted x and y components into the virtual plate generation unit 17.

According to the present modification example, the 3D coordinate conversion unit 12 does not need to perform processing for converting the polygon data PD1 represented by the 2D coordinate system into the polygon data PD2 represented by the 4D coordinate system.

(2) The above Embodiments 2 to 4 have described the example where the vector data VD1, which is represented by the 2D coordinate system, is input by the vector data input reception unit 16. The present invention is not limited to this example. Alternatively, the vector data VD2, which is composed of coordinate data on the 3D coordinate system, may be directly input by the vector data input reception unit 16.

In the present modification example, the vector data input reception unit 11 extracts only x and y components from each of piece of vertice data Vih constituting the vector data VD2, and inputs the extracted x and y components into the virtual plate generation unit 17.

According to the present modification example, the vector data conversion unit 18 does not need to perform processing for converting the vector data VD1 represented by the 2D coordinate system into the vector data VD2 represented by the 3D coordinate system.

(3) The above Embodiments 1 to 4 have described the example where $Z0e$ that is the Z component of the vertice $p(P0e)$ of the polygon PG is adopted as Zrep. The present invention is not limited to this example. Alternatively, a Z component of the coordinate data Pie corresponding to the vertice p(Pie), which is nearest to the view point in the Z axis direction among the four vertices constituting the polygon PG, may be adopted as Zrep.

Also, in the present modification example, it may be possible to employ an example where an average value of Z components of the pieces of the coordinate data Pie (i=0, 1, 2, 3) one-to-one corresponding to the four vertices constituting the polygon PG is adopted as Zrep.

$$Zrep = \frac{Z0e + Z1e + Z2e + Z3e}{4} \quad \text{[Expression 45]}$$

In this case, the above Expression 45 is satisfied.

Furthermore, the present modification example has provided the case where the polygon PG is rectangular. However, the present invention is not limited to this. Alternatively, assume that the number of vertices of the polygon PG is K.

$$Zrep = \frac{\sum_{i=0}^{K-1} Zie}{K} \quad \text{[Expression 46]}$$

In this case, the above Expression 46 is satisfied.

(4) The above Embodiment 2 has provided the example where the virtual plate generation unit 17 calculates the bounding box VB using one piece of vector data VD1. However, the present invention is not limited to this example. Alternatively, one bounding box may be calculated using a plurality of pieces of vector data.

(5) The above Embodiment 2 has provided the example where the virtual plate generation unit 17 sets the margin mx in the x direction to δ*PBx (PBx: the length of the bounding box in the x direction). However, the present invention is not limited to this example. Alternatively, where the margin mx may be set to a fixed value ϵ1, regardless of the length PBx in the x direction of the bounding box. Further alternatively, another method may be appropriately employed.

Further alternatively, the margin my in the y direction also may be set to a fixed value ϵ2, regardless of the length PBy in the y direction of the bounding box.

(6) The above Embodiment 2 has provided the example where the bounding box is calculated based on the vector data VD1. However, the present invention is not limited to this example.

Alternatively, when information corresponding to the bounding box relating to the Embodiment 2 is included beforehand in the vector data VD1 as attribute information of a font, the data may be used as the bounding box without performing any conversion.

As a result, it is possible to omit the bounding box calculation processing in the virtual plate generation processing. This can improve the processing efficiency.

Figure 32:
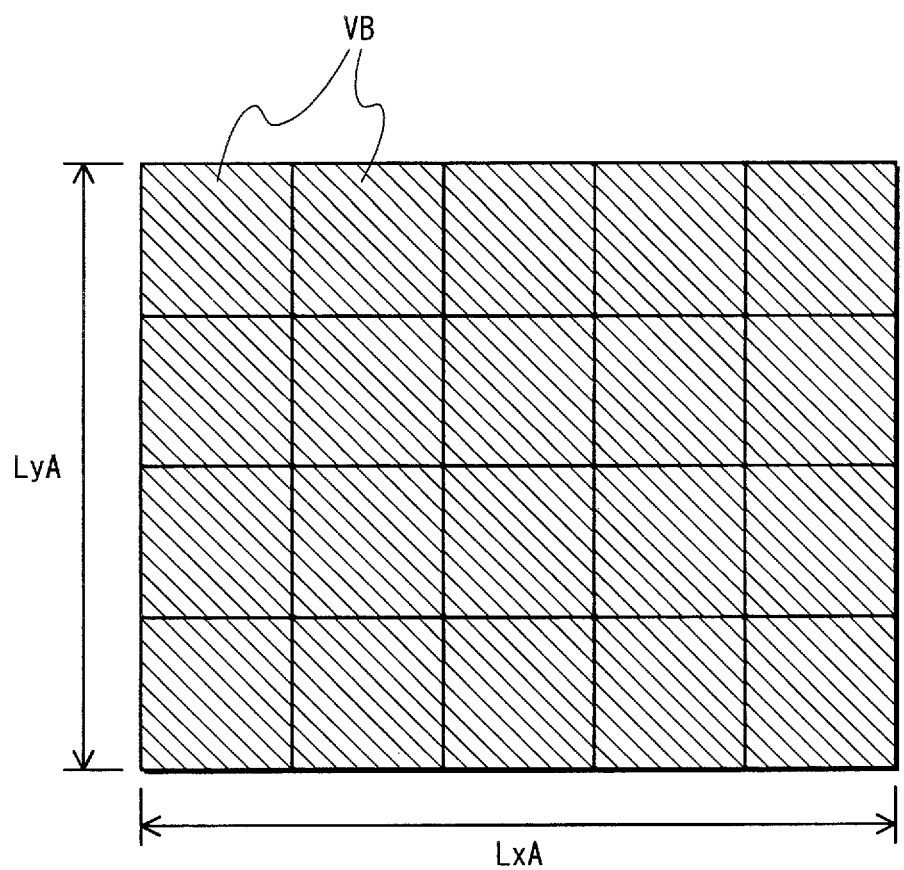
FIG. 32 shows operations of a graphics rendering apparatus relating to a modification example.

(7) The above Embodiment 2 has provided the example where the bounding box is calculated based on the vector data VD1 representing one character. However, the present invention is not limited to this example. Alternatively, as shown in FIG. 32, a bounding box may be generated with respect to each of a plurality of pieces of vector data representing a string of characters, to generate a virtual plate Plate including the generated plurality of bounding boxes.

In the present modification example, the following may be employed. With respect to each of the pieces of vector data representing a character, the length Lx in the x direction and the length Ly in the y direction of the bounding box are calculated. Then, the sum LxA of the lengths in the x direction with respect to the plurality of bounding boxes and the sum LyA of the lengths in the y direction with respect to the plurality of bounding boxes are calculated. A rectangular virtual plate having the length LxA in the x direction and the length LyA in the y direction is determined as a bounding box.

Here, there is a case where each of the pieces of vector data constituting the string of characters includes attribute information relating to an offset length (Escapement or Advanced Width) between adjacent characters. In this case, it is only necessary to add the sum of Escapement included in the pieces of vector data to one of the length LxA in the x direction and the length LyA in the y direction of the bounding box.

(8) The above Embodiment 3 has provided the example where the polygon data PD1 represents a polygonal polygon composed of 11 vertices p(Pi) (i=0, 1, . . . , 10) as shown in FIG. 21. However, the present invention is not limited to this example. Alternatively, the polygon data PD1 may represent a polygon composed of a plurality of vertices such as a circular polygon, a polygonal polygon having less than 10 vertices, or a polygonal polygon having more than 11 vertices.

(9) The above Embodiment 1 has provided the example where the discrete scaling rate (scaling value) α is stored in the scaling value storage unit 51 to determine the optimal scaling value. However, the present invention is not limited to this example. Alternatively, it may be possible to set an objective function such as shown in an Expression (47) and continuously vary the scaling value, and set the scaling value α corresponding to the least value of the objective function.

$$obj(\alpha)=-f(\alpha)+\text{Penalty} \quad \text{[Expression 47]}$$

Figure 33A:
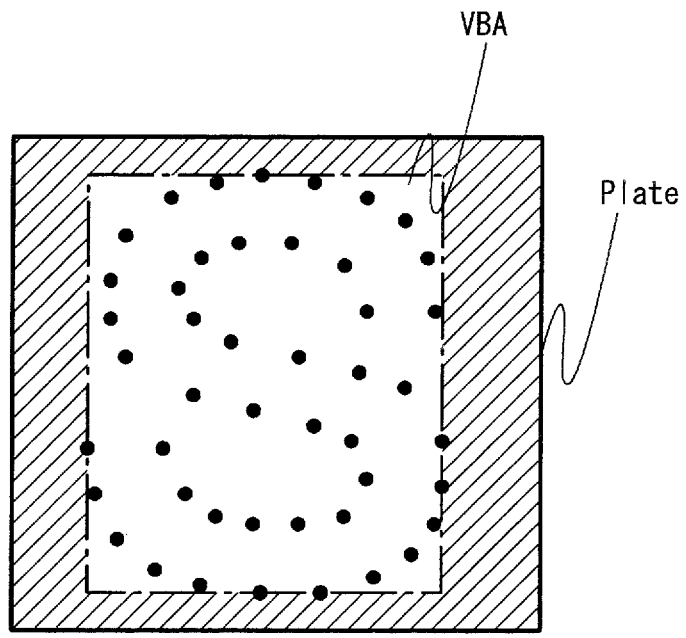
FIGS. 33A and 33B show operations of a graphics rendering apparatus relating to a modification example.
Figure 33B:
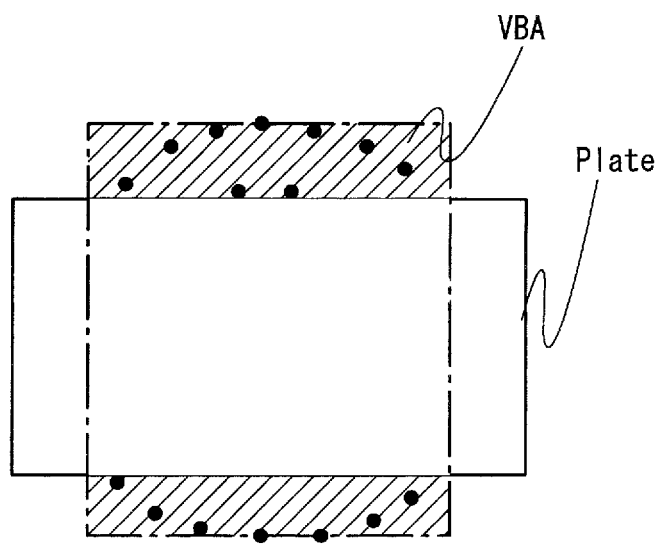
Figure 35:
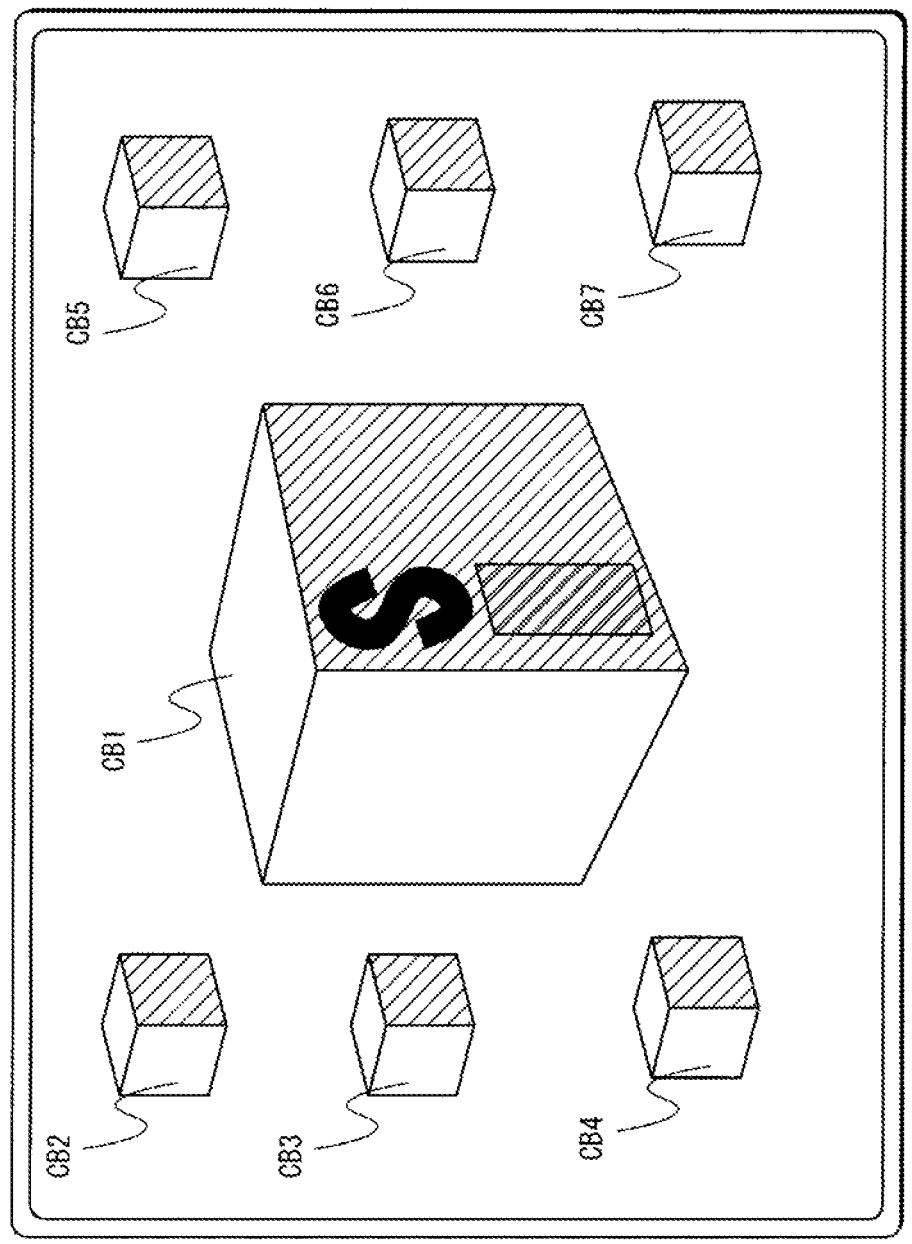
FIG. 35 shows the outline of a conventional example.

Here, the value obj(α) represents an objective function. The value f(α) represents a function of an area of a rectangular bounding box VBA including a vector graphics represented by the vector data VD2 on which scaling has been performed, as shown in FIGS. 3A and 33B. Here, scaling is performed using the first scaling value scalex and the second scaling value scaley as the value α.

The value Penalty represents a function (penalty function) as shown in FIGS. 3A and 33B. A bounding box VBA and a rectangular region Plate, which has lengths in the x direction and the y direction that are equal to the first scaling coefficient scx and the second scaling coefficient scy, respectively, are overlapped with each other, such that the bounding box VBA and the rectangular region Plate have the same center. The penalty function is proportional to an area of a region where the bounding box VBA and the rectangular region Plate are not overlapped with each other (hatched part).

As described in the Embodiment 1, the vector data conversion unit 18 performs translation conversion such that the gravity coordinate G of the vertice data Vi (i=0, 1, . . . , 44) overlaps with the view point (original point), thereby to generate vertice data Vih (i=0, 1, . . . , 44). Then, the vector data conversion unit 18 calculates a value of the objective function obj(α) based on the Expression (47) using the vector data composed of the vertice data Vih and the value α.

Then, the vector data conversion unit 18 determines, as the optimal value, the value α corresponding to the minimum value of the value obj(α) that is continuously varied within a predetermined range (such as a range of 0.5 to 100 inclusive).

The steepest descent method or the like may be employed for calculating the minimum value of the value obj(α).

(10) The Embodiment 4 has provided the example where the processing method setup unit 42 changes the processing method based on information input by the data count monitor unit 41. However, the present invention is not limited to this.

<Supplementary Explanations>

(1) The graphics rendering apparatus relating to the present invention is typically realized as an LSI that is a semiconductor integrated circuit. The compositional elements of the graphics rendering apparatus may be separately integrated into one chip, or integrated into one chip including part or all of the compositional elements. Although the system LSI is used here, the system LSI may be called an IC, a system LSI, a super LSI, or an ultra LSI, depending on the integration degree.

Also, a method of forming integrated circuits is not limited to LSIs, and may be realized using a dedicated circuit or a general-purpose processor. Furthermore, it may be possible to use an FPGA (Field Programmable Gate Array) programmable after manufacturing LSIs or a reconfigurable processor in which connection and setting of a circuit cell inside an LSI can be reconfigured.

Furthermore, when new technology for forming integrated circuits that replaces LSIs becomes available as a result of progress in semiconductor technology or semiconductor-derived technologies, functional blocks may be integrated using such technology. One possibility lies in adaptation of biotechnology.

Furthermore, by combining a semiconductor chip which is formed by integrating the graphics rendering apparatus relating to the present invention and a display for rendering images, it is possible to structure a rendering apparatus applicable to various purposes. It is possible to utilize the present invention as an information rendering unit for use in a portable phone, a TV, a digital video recorder, a digital video camera, a car navigation system, and so on. In order to realize such a display, it is possible to combine, with the present invention, a various types of flat displays such as cathode-ray tube (CRT), liquid crystal, PDP (plasma display panel), and organic EL displays, and a projection display exemplified by a projector, and so on.

The graphics rendering apparatus relating to the present invention is available for various purposes. The graphics rendering apparatus has a high utility value as an information display unit for menu display, Web browser, editor, EPG, and map display in a battery-driven portable display terminal such as a portable phone, a portable music player, a digital camera, and a digital video camera, and a high-resolution information display apparatus such as a TV, a digital video recorder, and a car navigation system, and so on.

| Reference Signs List | |
|---|---|
| 10, 30, 40, and 50: | graphics rendering apparatus |
| 10a: | 3D image processing apparatus |
| 10b: | 2D image processing apparatus |
| 10c: | image display unit |
| 11: | polygon data input reception unit |
| 12: | 3D coordinate conversion unit |
| 13: | scaling coefficient determination unit |
| 14: | projection conversion unit |
| 15: | polygon rasterization unit |
| 16: | vector data input reception unit |
| 17: | virtual plate generation unit |
| 18: | vector data conversion unit |
| 19: | texture generation unit |
| 20: | texture mapping unit |
| 21: | texture buffer |
| 22: | frame buffer |
| 31: | bounding box generation unit |
| 41: | data count monitor unit |
| 42: | processing method setup unit |
| 51: | scaling value storage unit |
| PD1, PD2, PD3, PD4, PD5, and PD6: | polygon data |
| T: | scaling value table |
| VD1, VD2, VD3, VD4, and VD5: | vector data |

The invention claimed is:

1. A graphics rendering apparatus, comprising:
a scaling coefficient determination unit operable to determine, based on polygon data representing a polygon onto which a texture is to be mapped, a scaling coefficient that is a basis for scaling first vector data from which the texture is to be generated;
a vector data conversion unit operable to generate second vector data by scaling the first vector data based on the scaling coefficient;
a texture generation unit operable to generate a texture based on the second vector data;
a texture mapping unit operable to map the texture generated by the texture generation unit onto the polygon; and
a virtual plate generation unit operable to generate, based on the polygon data and the first vector data, virtual plate data representing a virtual plate that includes a vector image represented by the first vector data, wherein
the vector data conversion unit performs the scaling based on the virtual plate data,
the polygon is rectangular, and has a first side of one pair of opposite sides having a length Lx and a second side of the other pair of opposite sides having a length Ly,
the scaling coefficient determination unit determines, as the scaling coefficient, a first scaling coefficient scx that corresponds to scaling in a direction along the first side and a second scaling coefficient scy that corresponds to scaling in a direction along the second side, such that expressions 1 and 2 are satisfied, respectively, $$scx = C1 * Lx (0 < C1), \quad \text{[Expression 1]}$$

and $$scy = C2 * Ly (0 < C2), \quad \text{[Expression 2]}$$

the virtual plate is rectangular, and has a third side of one pair of opposite sides having a length Lplatex and a fourth side of the other pair of opposite sides having a length Lplatey, and
the vector data conversion unit performs the scaling, based on a first scaling rate scalex with respect to scaling in a direction along the third side and a second scaling rate scaley with respect to scaling in a direction along the fourth side that are determined such that expressions 3 and 4 are satisfied, respectively, $$scalex = scx / Lplatex, \quad \text{[Expression 3]}$$

and $$scaley = scy / Lplatey \quad \text{[Expression 4]}.$$

2. The graphics rendering apparatus of claim 1, wherein
when a rectangular bounding box including the vector image has one pair of opposite sides each having a length VBx and the other pair of opposite sides each having a length VBy, at least either of expressions 5 or 6 is satisfied and an expression 7 is also satisfied, $$Lplatex = VBx(1 + \phi) \ (0 < \phi < 1), \quad \text{[Expression 5]}$$

$$Lplatey = VBy(1 + \psi) \ (0 < \psi < 1), \quad \text{[Expression 6]}$$

and $$\frac{Lplatex}{Lplatey} = \frac{Lx}{Ly}. \quad \text{[Expression 7]}$$

3. The graphics rendering apparatus of claim 1, further comprising
a bounding box generation unit operable to generate a rectangular bounding box that includes the polygon based on the polygon data.

4. The graphics rendering apparatus of claim 3, wherein
when a rectangular bounding box including the bounding box polygon has one pair of opposite sides each having a length PBx and the other pair of opposite sides each having a length PBy, and a rectangular bounding box including the vector image has one pair of opposite sides each having a length VBx and the other pair of opposite sides each having a length VBy, at least either of expressions 8 or 9 is satisfied and an expression 10 is also satisfied, $$Lplatex = VBx(1 + \phi) \ (0 < \phi < 1), \quad \text{[Expression 8]}$$

$$Lplatey = VBy(1 + \psi) \ (0 < \psi < 1), \quad \text{[Expression 9]}$$

and $$\frac{Lplatex}{Lplatey} = \frac{PBx}{PBy}. \quad \text{[Expression 10]}$$

5. The graphics rendering apparatus of claim 1, wherein the virtual plate includes a plurality of rectangular bounding boxes each including a vector image.

6. A graphics rendering apparatus, comprising:
a scaling coefficient determination unit operable to determine, based on polygon data representing a polygon onto which a texture is to be mapped, a scaling coefficient that is a basis for scaling first vector data from which the texture is to be generated;
a virtual plate generation unit operable to generate, based on the polygon data and the first vector data, virtual plate data representing a virtual plate that includes a vector image represented by the first vector data;
a vector data conversion unit operable to generate second vector data by scaling the first vector data based on the scaling coefficient and the virtual plate data;

a texture generation unit operable to generate a texture based on the second vector data;

a texture mapping unit operable to map the texture generated by the texture generation unit onto the polygon;

a 3D image processing unit operable to process the input polygon data and including the scaling coefficient determination unit;

a 2D image processing unit operable to process the input first vector data and including the vector data conversion unit;

a data number counting unit operable to count the number of polygon data pieces input by the 3D image processing unit and the number of first vector data pieces input by the 2D image processing unit; and a processing method setup unit operable to set a processing method based on the number of polygon data pieces and the number of first vector data pieces counted by the data number counting unit, wherein when an expression 11 is satisfied, the processing method setup unit changes an output destination of the virtual plate data from the vector data conversion unit to the texture generation unit, and the texture generation unit generates the texture based on the input virtual plate data, $$\beta * CP > CV \qquad \text{[Expression 11]}$$

where, β represents a constant that is equal to or greater than 1, CP represents the number of polygon data pieces, and CV represents the number of first vector data pieces.

7. A graphics rendering method to be executed by a computer, the graphics rendering method comprising:

a scaling coefficient determining step of determining, based on polygon data representing a polygon onto which a texture is to be mapped, a scaling coefficient that is a basis for scaling first vector data from which the texture is to be generated;

a vector data converting step of generating second vector data by scaling the first vector data based on the scaling coefficient;

a texture generating step of generating a texture based on the second vector data;

a texture mapping step of mapping the texture generated in the texture generating step onto the polygon; and a virtual plate generating step of generating, based on the polygon data and the first vector data, virtual plate data representing a virtual plate that includes a vector image represented by the first vector data, wherein the vector data converting step performs the scaling based on the virtual plate data, the polygon is rectangular, and has a first side of one pair of opposite sides having a length Lx and a second side of the other pair of opposite sides having a length Ly, the scaling coefficient determining step determines, as the scaling coefficient, a first scaling coefficient scx that corresponds to scaling in a direction along the first side and a second scaling coefficient scy that corresponds to scaling in a direction along the second side, such that expressions 1 and 2 are satisfied, respectively, $$scx = C1 * Lx (0 < C1) \qquad \text{[Expression 1]}$$

$$scy = C2 * Ly (0 < C2) \qquad \text{[Expression 2]}$$

the virtual plate is rectangular, and has a third side of one pair of opposite sides having a length Lplatex and a fourth side of the other pair of opposite sides having a length Lplatey, and the vector data converting step performs the scaling, based on a first scaling rate scalex with respect to scaling in a direction along the third side and a second scaling rate scaley with respect to scaling in a direction along the fourth side that are determined such that expressions 3 and 4 are satisfied, respectively, $$scalex = scx / Lplatex \qquad \text{[Expression 3]}$$

$$scaley = scx / Lplatey \qquad \text{[Expression 4]}.$$

8. A non-transitory recording medium having recorded therein a graphic rendering program for causing a computer to execute graphics rendering processing, the graphics rendering processing comprising:

a scaling coefficient determining step of determining, based on polygon data representing a polygon onto which a texture is to be mapped, a scaling coefficient that is a basis for scaling first vector data from which the texture is to be generated;

a vector data converting step of generating second vector data by scaling the first vector data based on the scaling coefficient;

a texture generating step of generating a texture based on the second vector data;

a texture mapping step of mapping the texture generated in the texture generating step onto the polygon; and a virtual plate generating step of generating, based on the polygon data and the first vector data, virtual plate data representing a virtual plate that includes a vector image represented by the first vector data, wherein the vector data converting step performs the scaling based on the virtual plate data, the polygon is rectangular, and has a first side of one pair of opposite sides having a length Lx and a second side of the other pair of opposite sides having a length Ly, the scaling coefficient determining step determines, as the scaling coefficient, a first scaling coefficient scx that corresponds to scaling in a direction along the first side and a second scaling coefficient scy that corresponds to scaling in a direction along the second side, such that expressions 1 and 2 are satisfied, respectively, $$scx = C1 * Lx (0 < C1) \qquad \text{[Expression 1]}$$

$$scy = C2 * Ly (0 < C2) \qquad \text{[Expression 2]}$$

the virtual plate is rectangular, and has a third side of one pair of opposite sides having a length Lplatex and a fourth side of the other pair of opposite sides having a length Lplatey, and the vector data converting step performs the scaling, based on a first scaling rate scalex with respect to scaling in a direction along the third side and a second scaling rate scaley with respect to scaling in a direction along the fourth side that are determined such that expressions 3 and 4 are satisfied, respectively, $$scalex = scx / Lplatex \qquad \text{[Expression 3]}$$

$$scaley = scx / Lplatey \qquad \text{[Expression 4]}.$$

9. An integrated circuit for graphics rendering, comprising:

a scaling coefficient determination unit operable to determine, based on polygon data representing a polygon onto which a texture is to be mapped, a scaling coefficient that is a basis for scaling first vector data from which the texture is to be generated;

a vector data conversion unit operable to generate second vector data by scaling the first vector data based on the scaling coefficient;

a texture generation unit operable to generate a texture based on the second vector data;

a texture mapping unit operable to map the texture generated by the texture generation unit onto the polygon; and a virtual plate generation unit operable to generate, based on the polygon data and the first vector data, virtual plate data representing a virtual plate that includes a vector image represented by the first vector data, wherein the vector data conversion unit performs the scaling based on the virtual plate data, the polygon is rectangular, and has a first side of one pair of opposite sides having a length Lx and a second side of the other pair of opposite sides having a length Ly, the scaling coefficient determination unit determines, as the scaling coefficient, a first scaling coefficient scx that corresponds to scaling in a direction along the first side and a second scaling coefficient scy that corresponds to scaling in a direction along the second side, such that expressions 1 and 2 are satisfied, respectively, $scx = C1 * Lx (0 < C1)$ [Expression 1]

$scy = C2 * Ly (0 < C2)$ [Expression 2]

the virtual plate is rectangular, and has a third side of one pair of opposite sides having a length Lplatex and a fourth side of the other pair of opposite sides having a length Lplatey, and the vector data conversion unit performs the scaling, based on a first scaling rate scalex with respect to scaling in a direction along the third side and a second scaling rate scaley with respect to scaling in a direction along the fourth side that are determined such that expressions 3 and 4 are satisfied, respectively, $scalex = scx / Lplatex$ [Expression 3]

$scaley = scx / Lplatey$ [Expression 4].

* * * * *